US009877080B2

(12) United States Patent
Cheon et al.

(10) Patent No.: US 9,877,080 B2
(45) Date of Patent: Jan. 23, 2018

(54) DISPLAY APPARATUS AND METHOD FOR CONTROLLING THEREOF

(71) Applicant: Samsung Electronics Co., Ltd., Suwon-si, Gyeonggi-do (KR)

(72) Inventors: Ka-won Cheon, Seoul (KR); Choon-kyoung Moon, Yongin-si (KR); Seong-hoon Kang, Suwon-si (KR); Hark-joon Kim, Ansan-si (KR); Hyun-jin Kim, Seoul (KR); Min-kyoung Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/496,383

(22) Filed: Sep. 25, 2014

(65) Prior Publication Data

US 2015/0095953 A1  Apr. 2, 2015

(30) Foreign Application Priority Data

Sep. 27, 2013 (KR) .................. 10-2013-0115391
Jul. 29, 2014 (KR) .................. 10-2014-0096746

(51) Int. Cl.
| | |
|---|---|
| *H04N 5/445* | (2011.01) |
| *H04N 21/482* | (2011.01) |
| *G06F 3/0484* | (2013.01) |
| *H04N 5/44* | (2011.01) |
| *H04N 21/431* | (2011.01) |

(Continued)

(52) U.S. Cl.
CPC ....... *H04N 21/4828* (2013.01); *G06F 1/3231* (2013.01); *G06F 3/017* (2013.01); *G06F 3/0425* (2013.01); *G06F 3/04842* (2013.01); *G06F 3/04883* (2013.01); *G06F 3/04886* (2013.01); *H04N 5/4403* (2013.01); *H04N 5/44591* (2013.01); *H04N 21/4122* (2013.01); *H04N 21/4312* (2013.01); *H04N 21/4314* (2013.01); *H04N 21/482* (2013.01); *H04N 21/4223* (2013.01); *H04N 21/44218* (2013.01); *Y02B 60/1289* (2013.01)

(58) Field of Classification Search
CPC ................................................. H04N 21/4126
See application file for complete search history.

(56) References Cited

U.S. PATENT DOCUMENTS

| | | | |
|---|---|---|---|
| 8,441,441 B2 | 5/2013 | Tsai et al. | |
| 2006/0268363 A1* | 11/2006 | Meinders | .............. G06F 3/1423 358/453 |

(Continued)

FOREIGN PATENT DOCUMENTS

| | | |
|---|---|---|
| KR | 10-2007-0040651 A | 4/2007 |
| KR | 10-2009-0076273 A | 7/2009 |

(Continued)

*Primary Examiner* — Junior Mendoza
(74) *Attorney, Agent, or Firm* — Jefferson IP Law, LLP

(57) ABSTRACT

A display apparatus and a method for controlling thereof are provided. The display apparatus includes a first display configured to display content, a second display configured to display an image at an outer area of the first display, and a controller configured to, in response to input of a user command while content is displayed on the first display, display a User Interface (UI) to control the display apparatus on the second display, and control content of the display by using the UI to control the display apparatus.

27 Claims, 80 Drawing Sheets

(51) Int. Cl.
*H04N 21/41* (2011.01)
*G06F 1/32* (2006.01)
*G06F 3/01* (2006.01)
*G06F 3/042* (2006.01)
*G06F 3/0488* (2013.01)
*H04N 21/4223* (2011.01)
*H04N 21/442* (2011.01)

(56) References Cited

U.S. PATENT DOCUMENTS

| | | |
|---|---|---|
| 2007/0126938 A1* | 6/2007 | Tan et al. .................. 348/739 |
| 2008/0235749 A1 | 9/2008 | Jain et al. |
| 2009/0225065 A1* | 9/2009 | Overes ............... H05B 37/0218 345/207 |
| 2010/0125874 A1* | 5/2010 | Ahn et al. ................... 725/41 |
| 2010/0153996 A1* | 6/2010 | Migos et al. ............... 725/39 |
| 2011/0113445 A1 | 5/2011 | Lee |
| 2011/0119638 A1 | 5/2011 | Forutanpour |
| 2011/0313775 A1* | 12/2011 | Laligand et al. ............ 704/275 |
| 2012/0038542 A1* | 2/2012 | Miyashita ............. G06F 1/1626 345/7 |
| 2012/0038592 A1 | 2/2012 | Shyu et al. |
| 2012/0113030 A1 | 5/2012 | Park et al. |
| 2012/0194742 A1 | 8/2012 | Barnes et al. |
| 2012/0223885 A1 | 9/2012 | Perez |
| 2012/0304229 A1 | 11/2012 | Choi et al. |
| 2014/0125692 A1 | 5/2014 | Cheon et al. |

FOREIGN PATENT DOCUMENTS

| | | |
|---|---|---|
| KR | 10-2010-0133703 A | 12/2010 |
| KR | 10-2012-0132054 A | 12/2012 |
| KR | 10-1239971 B1 | 3/2013 |
| KR | 10-2014-0057087 A | 5/2014 |

* cited by examiner

FIG. 5A

| Function | Description | | Gesture |
|---|---|---|---|
| Pointing | MOVE A PONTER TO A LOCATION A USER WANTS |  | MOVE A POINTER TO MOVE THE HAND IN A DIRECTION A USER WANTS |
| Enter | EXECUTE OR SELECT A SELECTED ITEM |  | FOLD FIST |
| Up / Down / Left / Right or Scrolling | MOVE UP AND DOWN A LIST/SCROLL |  | MOVE UP AND DOWN WHILE FOLDING THE FIST |
| | IN THE DETAIL VIEW SCREEN, MOVE TO RIGHT AND LEFT DIRECTIONS/SCROLL TO NEXT CONTENT |  | MOVE LEFT OR RIGHT WHILE FOLDING FIST IN VERTICAL DIRECTION |
| Return | MOVE TO PREVIOUS MENU |  | DRAW CIRCLE BY HOLD + RORATING BY THE HAND |

FIG. 5B

| Function | Description | Touch | | |
|---|---|---|---|---|
| Pointing | MOVE HIGHLIGHT TO A LOCATION A USER WANTS |  | | MOVE HIGHLIGHT TO A DIRECTION A USER WANTS ON A TOUCH PAD |
| Enter | EXECUTE OR SELECT A SELECTED ITEM |  | | PRESS A TOUCH PAD |
| Scrolling | SCROLL UP/DOWN /LEFT/RIGHT ON LIST OR VIEW STATE |  | | SCROLL UP/DOWN ON LEFT/RIGHT BOUNDARY, SCROLL LEFT/RIGHT ON UP/DOWN BOUNDARY |
| Flicking | MOVE HIGHLIGHT | 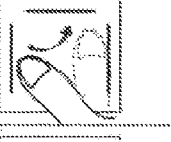 | | FLICT TO A DIRECTION A USER WANTS, MOVE FOCUS OR SCROLL TO A DIRECTION A USERWANTS ACCORDING TO FLICK OR FLICK SPEED |
| Pressing and Holding | DISPLAY CHANNEL LIST OR DISPLAY HIDE FUNCTION | 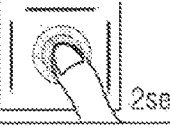 | 2sec | HOLD FOR 2 SECONDS OR MORE WHILE PRESSING |

FIG. 5C

| Function | Description | Button |
|---|---|---|
| TV | TV On/Off | ⏻ |
| Volume | CHANGE VOLUME | +/− VOL |
| Mute | MUTE SOUND | ⊠ Mute |
| Channel | CHANGE CHANNEL (OPERATION NOT EFFECTED BY MENU) | ∧ CH ∨ |
| Navigation | MOVE HIGHLIGHT IN UP, DOWN, LEFT, RIGHT DIRECTIONS | ▲ ▼ ◀ ▶ |
| Enter | EXECUTE OR SELECT THE SELECTED ITEM | ↵ |
| Smart Hub | MAIN MENU CHANGE MODE OF SMART HUB (SMART HUB MENU PROVIDED IN ALL THE STATES) | ⬡ |
| Return | RETURN TO PREVIOUS FUNCTION, SCREEN, OR MENU | ↶ Return |
| Info | DISPLAY SOFTWARE VERSION | Info |
| Exit | TERMINATE OSD(ON SCREEN DISPLAY) | Exit |
| A, B, C, D | APPLY AND EXECUTE CERTAIN FUNCTION ACCORDING TO DEMO STATE | A B C D |

DISPLAY APPARATUS AND METHOD FOR CONTROLLING THEREOF

CROSS-REFERENCE TO RELATED APPLICATION S

This application claims the benefit under 35 U.S.C. § 119(a) of a Korean patent application filed on Sep. 27, 2013 in the Korean Intellectual Property Office and assigned Serial number 10-2013-0115391, and of a Korean patent application filed on Jul. 29, 2014 in the Korean Intellectual Property Office and assigned Serial number 10-2014-0096746, the entire disclosure of each of which is hereby incorporated by reference.

TECHNICAL

The present disclosure relates to a display apparatus and a method for controlling thereof. More particularly, the present disclosure relates to a display apparatus which includes a second display to display a UI to control the display apparatus at an outer area of the first display.

BACKGROUND

A display apparatus has recently provided various functions to a user. For example, the display apparatus has provided diverse functions such as a broadcasting content providing function, a web browsing function, a Social Networking Service (SNS) function, a Video On Demand (VOD) providing function, and/or the like.

In order to provide various functions to the user, the display apparatus displays a User Interface (UI) to provide various functions of the display apparatus. For example, the display apparatus can display a content search UI to search various image content and a UI for changing setting to change setting of the display apparatus.

However, according to the related art, when displaying a UI to provide functions of the display apparatus, content which is currently reproduced is removed from a display screen, and the UI to provide the functions of the display apparatus is displayed. Accordingly, there has been a drawback that a user cannot watch content which is currently reproduced, in order to execute various functions of the display apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus and a method for controlling the display apparatus, when a user command is input while content is displayed on a first display, in which a second display which displays an image at an outer area of the first display displays a User Interface (UI) to control the display apparatus.

In accordance with an aspect of the present disclosure, a display apparatus is provided. The display apparatus includes a first display configured to display content, a second display configured to display an image at an outer area of the first display, and a controller configured to, in response to input of a user command while content is displayed on the first display, display a UI to control the display apparatus on the second display, and control content of the display by using the UI to control the display apparatus.

In accordance with another aspect of the present disclosure, the controller, in response to input of a user command while content is displayed on the first display, may control the second display to display a content search UI to search content on an upper area of the second display.

In accordance with another aspect of the present disclosure, the content search UI may include at least one display item corresponding to a first content type, wherein the content search UI comprises at least one display item corresponding to a first content type, wherein the controller, in response to input of a certain user command while at least one display item corresponding to the first content type is displayed, controls the second display to display at least one display item corresponding to the second content type on the content search UI.

In accordance with another aspect of the present disclosure, the controller, in response to input of a certain user command while the content search UI is displayed, may control the second display to display highlight on one of the at least one display item displayed on the content search UI and to display information on content corresponding to the highlighted display item nearby the highlighted display item.

In accordance with another aspect of the present disclosure, the controller, in response to selection of one of the at least one display item displayed on the content search UI, may control the first display to display a content list corresponding to the selected display item.

In accordance with another aspect of the present disclosure, the controller, in response to selection of one of a plurality of content displayed on the content list, may control to display a screen corresponding to the selected content on the first display, and to display a screen corresponding to a part of the non-selected content on the second display.

In accordance with another aspect of the present disclosure, the controller, in response to input of a certain user command while the screen corresponding to the selected content is displayed on the first display and the screen corresponding to a part of the non-selected content is displayed on the second display, may control to move a screen corresponding to one of the content displayed on the second display to the first display, and may control to move a screen corresponding to content displayed on the first display to the second display.

In accordance with another aspect of the present disclosure, the controller, in response to input of a user command while a broadcasting content is displayed on the first display, may control the second display to display a channel search UI to search another channel on a left or right area of the second display.

In accordance with another aspect of the present disclosure, the channel search UI may include at least one display item corresponding to at least one channel, wherein the controller controls the second display to display a broadcasting program respectively corresponding to at least one display item.

In accordance with another aspect of the present disclosure, the controller, in response to input of a certain user command while content is displayed on the first display, may display a pointer on a display screen, and in response to input of a user command for moving the pointer to the second display, provide a preview function which displays only an area at which the pointer is located from among UIs to control the display apparatus.

In accordance with another aspect of the present disclosure, the controller, in response to input of a user command while content is displayed on the first display, may control the second display to display a UI for changing setting to change setting of the display apparatus.

In accordance with another aspect of the present disclosure, the second display may be a projector display.

In accordance with another aspect of the present disclosure, a method for controlling a display apparatus is provided. The method includes first displaying to display content on a first display, in response to receiving a user command while content is displayed on the first display, second displaying to display a UI to control the display apparatus on the second display which displays an image at an outer area of the first display, and controlling content of the first display by using a UI to control the display apparatus.

In accordance with another aspect of the present disclosure, the second displaying may include, in response to receiving the user command, displaying a content search UI to search content on an upper area of the second display.

In accordance with another aspect of the present disclosure, the content search UI may include at least one display item corresponding to a first content type, wherein the second displaying comprises, in response to receiving a certain user command while at least one display item corresponding to the first content type is displayed, displaying at least one display item corresponding to the second content type on the content search UI of the second display.

In accordance with another aspect of the present disclosure, the second displaying, in response to receiving a certain user command while the content search UI is displayed, may include displaying highlight on one of the at least one display item displayed on the content search UI, and displaying information on content corresponding to the highlighted display item nearby the highlighted display item.

In accordance with another aspect of the present disclosure, the method as claimed in claim 14 may include, selecting one of the at least one display item displayed on the content search UI, wherein the second displaying includes, in response to the selecting of the one of the at least one display item displayed on the content search UI, displaying a content list corresponding to the selected display item on the first display.

In accordance with another aspect of the present disclosure, may include selecting one of a plurality of content displayed on the content list, and the second displaying may include, in response to the selecting of the one of a plurality of content displayed on the content list, displaying a screen corresponding to the selected content on the first display, and displaying a screen corresponding to a part of the non-selected content on the second display.

In accordance with another aspect of the present disclosure, the second displaying may include, in response to receiving a certain user command while a screen corresponding to the selected content is displayed on the first display, and a screen corresponding to a part of the non-selected content is displayed on the second screen, moving a screen corresponding to one of content displayed on the second display to the first display, and moving a screen corresponding to content displayed on the first display to the second display.

In accordance with another aspect of the present disclosure, the second displaying may include, in response to receiving a user command while a broadcasting content is displayed on the first display, displaying a channel search UI to search another channel on a left or right area of the second display.

In accordance with another aspect of the present disclosure, the channel search UI may include at least one display item corresponding to at least one channel, wherein the second displaying comprises displaying a broadcasting program respectively corresponding to at least one display item on the second display.

In accordance with another aspect of the present disclosure, the second displaying may include, in response to receiving a certain user command while content is displayed on the first display, displaying a pointer on a display screen, and in response to receiving a user command for moving the pointer to the second display, providing a preview function which displays only an area at which the pointer is located from among UIs to control the display apparatus.

In accordance with another aspect of the present disclosure, the second displaying may include, in response to receiving a user command while content is displayed on the first display; displaying a UI for changing setting to change setting of the display apparatus on the second display.

In accordance with another aspect of the present disclosure, the second display may be a projector display.

In accordance with an aspect of the present disclosure, a user, while keeping watching content which the user currently watches, can control a display apparatus e.g., searching content and changing setting of the display apparatus, and/or the like.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C are views to explain an input method of a display apparatus according to an embodiment of the present disclosure.

Throughout the drawings, it should be noted that like reference numbers are used to depict the same or similar elements, features, and structures.

DETAILED DESCRIPTION

Figure 1:
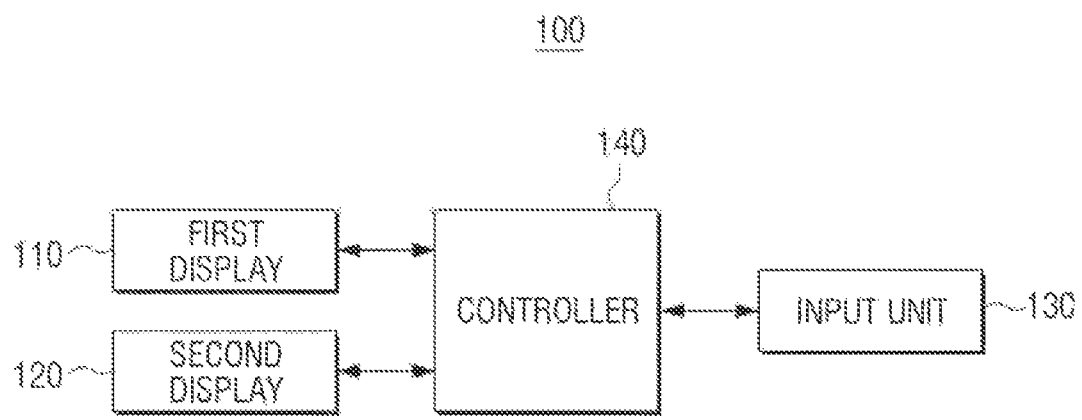
FIG. 1 is a block diagram illustrating the configuration of a display apparatus in brief according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments. However, various embodiments can be practiced without those specifically defined matters. In addition, well-known functions or constructions are not described in detail because such descriptions would obscure the application with unnecessary detail.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (FDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a block diagram illustrating the configuration of a display apparatus in brief according to an embodiment of the present disclosure.

Referring to FIG. 1, a display apparatus 100 includes a first display 110, a second display 120, an input unit 130, and a controller 140.

The first display 110 outputs an image data by control of the controller 140. In particular, the first display 110 may display an image content as a main display. For example, the first display 110 may display an image content such as a broadcasting content, a Video On Demand (VOD) content, and/or the like.

Particularly, the first display 110 may be embodied as a Liquid Crystal Display (LCD), but this is merely an example, and may also be a display of a Cathode-Ray Tube (CRT), a Plasma Display Panel (PDP), an Organic Light-Emitting Diode (OLED), and/or the like.

The second display 120 may be located at an outer area of the first display 110. The second display 120 may output an image data. Particularly, the second display 120 may display a UI to control the display apparatus 100. For example, the second display 120 may display a content search UI to search content and a UI for changing setting to change setting of the display apparatus 100.

Figure 2:
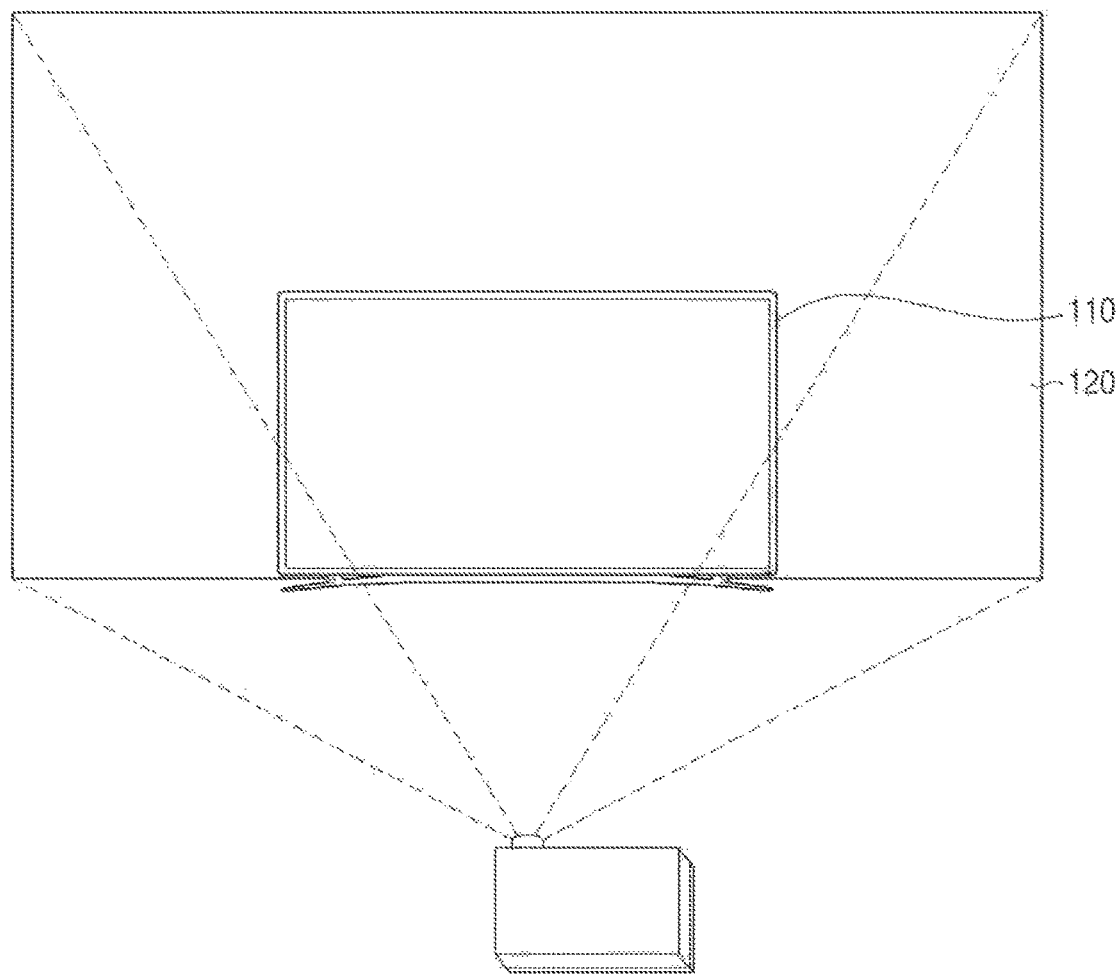
FIG. 2 is a view to explain a first display and a second display according to an embodiment of the present disclosure.

FIG. 2 is a view to explain a first display and a second display according to an embodiment of the present disclosure.

Referring to FIG. 2, the second display 120 may be embodied as a projector display to display an image at an outer area the first display 110, but this is merely an example, and may also be embodied as various display apparatuses such as a transparent display, and/or the like.

The input unit 130 receives a user command to control the display apparatus 100. For example, the input unit 130 may receive a user command to display a UI to control the display apparatus 100 on the second display 120, a user command for moving a pointer, a user command to select a display item, and/or the like.

According to various embodiments of the present disclosure, the input unit 130 may be embodied as a motion input unit which detects a hand motion of a user, but this is merely an example, and also may be embodied as various input apparatuses such as a remote controller with a touch panel or a button, a pointing device, a mouse, and/or the like.

The controller 140 controls the display apparatus 100 according to a user command input through the input unit 130. According to various embodiments of the present disclosure, when a user command is input while content is displayed on the first display 110 through the input unit 130 (e.g., in response to input of an appropriate user command), the controller 140 may control the second display 120 to display a UI to control the display apparatus 100 on the second display 120.

According to various embodiments of the present disclosure, when a user command is input through the input unit 130 while content is displayed on the first display 110 (e.g., in response to input of an appropriate user command while content is displayed on the first display 110), the controller 140 may control the second display 130 to display a content search IA to search content at an upper area of the first display 100.

The content search UI may include at least one display item corresponding to the first content type. For example, the content search UI may include at least one display item corresponding to the broadcasting content.

When a certain user command is input through the input unit 130 while at least one item corresponding to the first content type is displayed (e.g., in response to input of the certain user command), the controller 140 may control the second display 120 to display at least one display item corresponding to the second content type on the content search UI. For example, when a certain user command is input through the input unit 130 while at least one display item corresponding to a broadcasting content is displayed on the content search UI, the controller 140 may control the second display 120 to display at least one display item corresponding to a VOD content.

According to various embodiments of the present disclosure, when a certain user command is input through the input unit 130 while the content search UI is displayed (e.g., in response to input of the certain user command), the controller 140 displays highlight on one of at least one display item displayed on the content search UI, and controls the second display 120 to display information on content corresponding to the highlighted display item nearby the highlighted display item. For example, when a confirm button is selected while the content search UI is displayed (e.g., in response to selection of the confirm button), the controller 140 may display highlight on a display item corresponding to broadcasting program "A" from among at least one display item included in the content search UI, and control the second display 120 to display summary information (e.g., title, channel, broadcasting time, and/or the like) of broadcasting program "A" at a lower part of the highlighted display item.

According to various embodiments of the present disclosure, when one of at least one display item included in the content search UI displayed in the second display 120 is selected using the input unit (e.g., in response to selection of one of the at least one display item included in the control search UI), the controller 140 may control the first display 110 to display a content list corresponding to the selected display item.

For example, when a display item corresponding to "latest movie" is selected from among display items included in the content search UI displayed in the second display 120 (e.g., in response to selection of "latest movie"), the controller 140 may control the first display 110 to display the latest movie list.

When one of a plurality of content displayed in a content list is selected (e.g., in response to selection of one of the plurality of content), the controller 140 may display a screen corresponding to the selected content on the first display 110, and a screen corresponding to a part of the non-selected content on the second display 120. For example, when the first movie content is selected from among a plurality of movie content listed in the latest movie list (e.g., in response to selection of the first movie content), the controller 140 may display a guide screen on the first movie content on the first display 110, display a guide screen on the second movie content from among a plurality of the movie content on a left area of the second display 120, and display a guide screen on the third movie content on a right area of the second display 120.

According to various embodiments of the present disclosure, when a certain user command is input through the input unit 130 while a screen corresponding to the selected content is displayed on the first display 110, and while a screen corresponding to a part of the non-selected content is displayed on the second display 120 (e.g., in response to selection of the certain user command), the controller 140 may move a screen corresponding to one of content displayed on the second display 120 to the first display 110, and move a screen corresponding to content displayed on the first display 110 to the second display 120. For example, when a command for moving to left direction is input while a guide screen on the first movie content is displayed on the first display 110 (e.g., in response to input of the command for moving to the left direction), a guide screen on the second movie content is displayed on the left area of the second display 120, a guide screen on the third movie content is displayed on the right area of the second display 120, the controller 130 may move a guide screen on the first movie content which was displayed on the first display 110 to a left area of the second display 120, display a guide screen on the third movie content which was displayed on the right area of the second display 120 on the first display 110, and display a guide screen on the new fourth movie content on the right area of the second display 120.

For example, as described above, upon a user command, the first display 110 and the second display 120 may be operated in interlock.

According to various embodiments of the present disclosure, when a user command is input through the input unit 130 while a broadcasting content is displayed on the first display 110 (e.g., in response to input of the user command), the controller 140 may control the second display 120 to display the channel search UI to search another channel on a left or right area of the first display 110.

The channel search UI may include at least one display item corresponding to at least one channel, and the controller 140 may control the second display 120 to display a broadcasting program corresponding respectively to at least one display item on a real-time basis.

According to various embodiments of the present disclosure, when a certain user command is input through the input unit 130 while content is displayed on the first display 110

(e.g., in response to input of the certain user command), the controller 140 displays a pointer on a display screen. In addition, when a user command for moving a pointer to the second display 120 through the input unit 130 is input (e.g., in response to input of the user command for moving the pointer), the controller 140 may provide a preview function to display only an area at which a pointer is located from among UIs to control the display apparatus 100.

According to various embodiments of the present disclosure, while content is displayed on the first display 110, the second display 120 does not display an image. In this case, when a user command is input to generate a pointer (e.g., in response to input of the user command to generate the pointer), the controller 140 may display a pointer on an arbitrary area of a display screen including the first display 110 and the second display 120.

According to various embodiments of the present disclosure, when a user command for moving a pointer to the second display 120 through the input unit 140 is input (e.g., in response to input of the user command for moving the pointer to the second display 120), the controller 140 moves a pointer to the second display 120. In this case, the controller 140 may control the second display 120 so as to display a UI to control the display apparatus 100 only at an area at which a pointer is moved. For example, the controller 140, by displaying an image on an area at which the pointer is located by a preview type, may provide a user with a preview function on a UI to control the display apparatus 100.

When a preset user command (e.g., a command to select a confirm button, and/or the like) is input while a preview function is performed by using the pointer (e.g., in response to confirmation of the selection of the confirm button), the controller 140 may control the second display 120 to display a UI on the second display 120 to control the display apparatus 100.

According to various embodiments of the present disclosure, when a user command is input thorough the input unit 130 while content is displayed on the first display 110 (e.g., in response to input of an applicable user command), the controller 140 may control the second display 120 to display a UI for changing setting to change setting of the display apparatus 100. For example, the controller 140 may control the second display 120 to display a UI to change audio volume setting of the display apparatus 100 on the second display 120.

According to various embodiments of the present disclosure, the controller 140, according to a user command input through a UI to control the display apparatus 100, may control content of the first display 110. For example, the controller 140, by using the content search UI, may change content of the first display 1110 to another content. In addition, the controller 110, by using the UI for changing setting, may change setting of content of the first display 110.

According to various embodiments of the present disclosure, a user may search content or change a setting of a display apparatus while keeping watching content which the user is currently watching, by using an electronic apparatus such as the electronic apparatus (e.g., the display apparatus 100) described above.

Hereinbelow, referring to FIGS. 3-18C, the display apparatus 100 will be further explained below.

Figure 3:
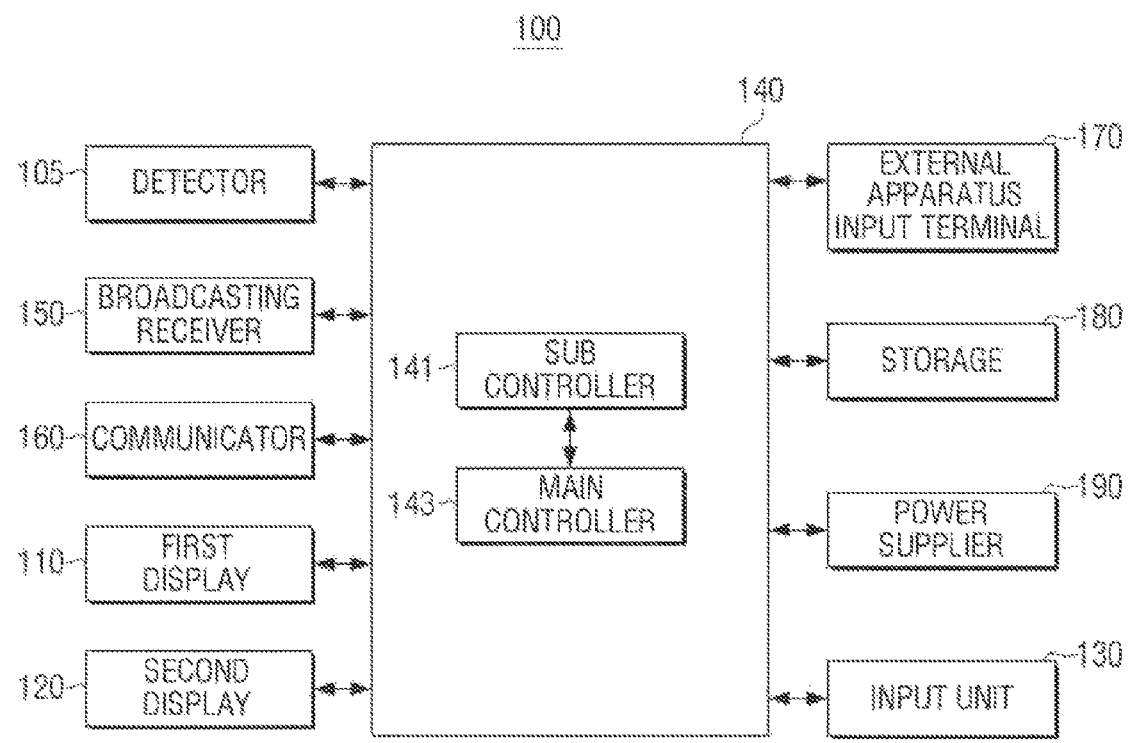
FIG. 3 is a block diagram illustrating the configuration of a display apparatus in detail according to an embodiment of the present disclosure.

FIG. 3 is a block diagram illustrating the configuration of a display apparatus in detail according to an embodiment of the present disclosure.

Referring to FIG. 3, the display apparatus 100 includes a detector 105, the first display 110, the second display 120, the input unit 130, the controller 140, a broadcasting receiver 150, a communicator 160, an external apparatus input terminal 170, a storage 180, a power supplier 190, and/or the like.

FIG. 3 illustrates various elements by taking an example according to which the display apparatus 100 is an apparatus equipped with various functions such as a content providing function, a user recognition function, and a display function, and/or the like. Therefore, according to various embodiments of the present disclosure, some of the elements illustrated in FIG. 3 may be omitted or changed, or other elements may be added.

The detector 110 detects whether or not a user approaches the display apparatus 100. For example, the detector 110 may film a preset area around the display apparatus 100 by using a camera. When a person is detected while filming the preset area (e.g., in response to detecting a person), the detector 110 may determine that a user approaches the display apparatus 100.

The determining by the detector 110 of whether or not a user approaches the display apparatus 100 is merely an example, and determination as to whether or not a user approaches the display apparatus 100 may be determined by using at least one of a short-distance communication module, an infrared sensor, an audio sensor, and/or the like.

When a user is determined to approach the display apparatus 100 through the detector 110 (e.g., in response to determining that a user approaches the display apparatus 110), the controller 140 may control the second display 120 to display at least one display item to control the display apparatus 100 on the second display 120.

The controller 140 may include a sub-controller 141 and a main controller 143. According to various embodiments of the present disclosure, the controller 140 may be configured to provide power to the sub-controller 141 when the display apparatus 100 is in a sleep or inactive state and to restrict power to the main controller 143 when the display apparatus 100 is in a sleep or inactive state. According to various embodiments of the present disclosure, the detector may provide an instruction to the sub-controller 141 to activate the sub-controller 141 and/or the display apparatus in response to detecting a user (or an approach thereof) when the display apparatus 110 is in a sleep or an inactive state.

The broadcasting receiver 150 may receive a broadcasting content on a real-time basis from an external broadcasting station. For example, the broadcasting receiver 150 may tune a broadcasting channel selected by a user, and receive a broadcasting program of a tuned broadcasting channel.

The communicator 160 may perform communication with various external apparatuses according to various types of communication methods. The communicator 160 may include various communication chips such as a Wi-Fi chip, a Bluetooth chip, a Near Field Communication (NFC) chip, a wireless communication chip, and/or the like. In this case, the Wi-Fi chip, the Bluetooth chip, the NFC chip respectively perform communication by using Wi-Fi, Bluetooth, and NFC. The NFC chip may correspond to a chip which operates with the Near Field Communication (NFC) method using 13.56 Mhz, from among various RF-ID frequency bands such as 135 kHz, 13.56 MHz, 433 MHz, 860~960 MHz, and 2.45 GHz, and/or the like. In case of using the Wi-Fi chip or the Bluetooth chip, various connection information such as a Service Set Identification (SSID), a session key, and/or the like may be transceived first, and by using the connection information, communication is connected, and then various information may be transceived. A wireless communication chip may correspond to a chip Which performs communication according to various communication specification such as IEEE, ZigBee, 3rd Generation (3D), 3rd Generation Partnership Project (3GPP), Long Term Evolution (LTE), and/or the like.

The first display 110 outputs an image data according to control of the controller 140. In particular, the first display 110 may display an image content received from the broadcasting receiver 150, the communicator 160, the external apparatus input terminal 170, and/or the like.

The second display 120 may display an image data at an outer area of the first display 110. For example, the second display 110 may display a UI to control the display apparatus 100 such as a UI for changing setting to change setting of the display apparatus 100 and the content search UI to search content.

Figure 4:
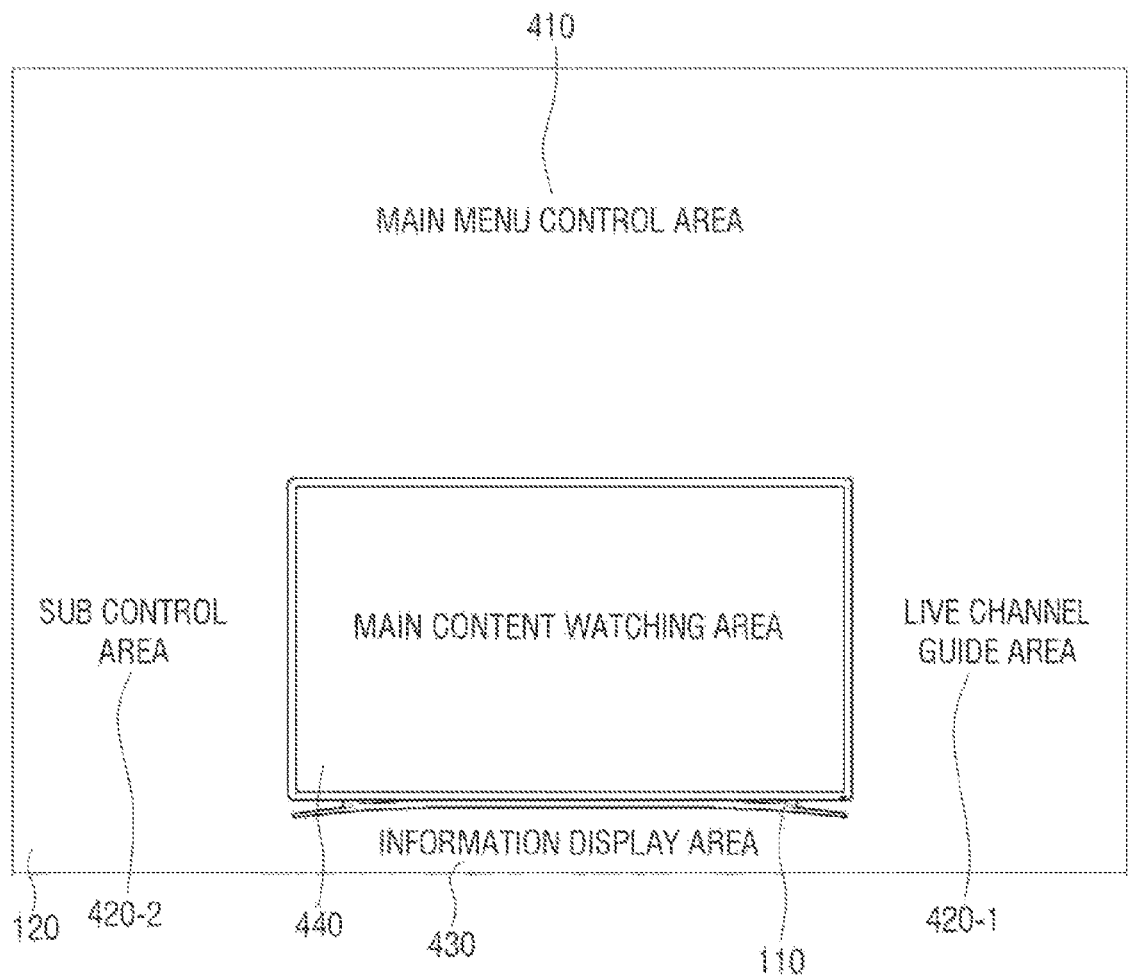
FIG. 4 is a view to explain a first display and a second display according to an embodiment of the present disclosure.

FIG. 4 is a view to explain a first display and a second display according to an embodiment of the present disclosure.

Referring to FIG. 4, the first display 110 and the second display 120 may divide a display area. Specifically, the first display 110 may be divided as a main content watching area 440, and an upper area of the second display 120 may be divided into a main menu control area 410, a right area of the second display 120 is divided as a live channel guide area 420-1, a left area of the second display 120 is divided into a sub control area 420-2, and a lower area of the second display 120 may be divided as an information display area 430.

The first display 110 may be embodied as an LCD, but this is merely an example, and also may be embodied as a display as a CRT, a PDP, an OLED, and/or the like. As illustrated in FIG. 2, the second display 120 may be embodied as a projector display to display an image at an outer area of the first display 110, but this is merely an example, and also may be embodied as various display apparatuses.

The external apparatus input terminal 170, in connection with an external apparatus, receives an image content from the external apparatus. In addition, the external apparatus input terminal 170 may transmit a user command input through the input unit 130 to the external apparatus.

The storage 180 stores various modules to operate the display apparatus 100. For example, in the storage 180, software including a base module, a detecting module, a communication module, a presentation module, a web browser module, a service module, and/or the like may be stored. The base module corresponds to a module which processes a signal delivered from hardware included in the display apparatus 100 and delivers such signal to an upper layer module. The detecting module corresponds to a module which collects information from various sensors and analyzes/manages collected information, which may include a face recognition module, a voice recognition module, a motion recognition module, an NFC recognition module, and/or the like. The presentation module corresponds to a module to compose a display screen which may include a multimedia module to reproduce and output a multimedia content, a UI rendering module which processes a UI and graphic. The communication module corresponds to a module to perform communication with an outer area. The web browser module corresponds to a module which performs web browsing and access to a web server. The service module corresponds to a module including various applications to provide various services.

As described above, the storage 180 may include various program modules, but the various program modules may be surely modified, omitted, or added according to type and the features of the display apparatus 100. For example, when the above-specified display apparatus 100 is embodied as smart phone, the base module may further include a location determination module to determine GPS-based location, and/or the like, and the detecting module may further include a detecting module Which detects operations of a user, and/or the like.

The power supplier 190 supplies power to the configuration of the display apparatus 100. In particular, while the display apparatus 100 maintains a stand-by mode, the power supplier 190 may supply power to the detector 110 only, and cannot supply power to other configurations. When a user is detected through the detector 110 (e.g., in response to detecting a user), the power supplier 190 may supply power to the controller 140, and activate the controller 140. According to various embodiments of the present disclosure, during a normal mode according to which a display apparatus operates normally, the power supplier 190 may supply power to the overall configurations of the display apparatus 100.

The input unit 130 receives a user command to control the display apparatus 100. According to various embodiments of the present disclosure, the input unit 130 may be embodied as a motion input unit which uses a hand gesture of a user and inputs a user command.

According to various embodiments of the present disclosure, the input unit 130 may divide an image (e.g., successive frames) corresponding to a user motion which is input through a camera into surrounding environment and the hands (e.g., unfolding the fingers or folding fingers and clenching fists) areas by using a motion recognition module, and recognize successive movements of the hands.

According to various embodiments of the present disclosure, when a user motion is filmed, the input unit 130 detects an object (e.g., hands of a user) which is a target of a user motion by using the received image. The input unit 130 extracts an object by detecting at least one of shape, color, movement included in a frame.

The input unit 130 may trace the movements of the extracted object by using location of each Object included in a plurality of frames.

The input unit 130 determines the motions according to the shape and movement of the traced object. For example, the input unit 130 determines a user motion by using at least one of change, speed, location, direction, and the like of the object. The user motion includes a grab, which corresponds to a motion to grab the hands, a pointing move, which corresponds to a motion to move an indicated cursor by the hands, a slap, which corresponds to a motion to move the hands in one direction over certain speed, a shake, which corresponds to a motion to shake the hands in a left/right directions or up/down directions, and a rotation, which corresponds to a motion to rotate the hands. The technical features of the present disclosure may be applied to other motions in addition to the above-specified embodiments. For example, a spread, which corresponds to a motion to unfold the folded hand may be further included.

In order to determine whether a user motion is moving of a pointing or a slap, the input unit 130 (or the controller 140 using, for example, information from the input unit 130) determines whether or not an object has got out of (e.g., exited) the determined area (e.g., a rectangular of 40 cm×40 cm) within the determined time (e.g., 800 ms).

When an object does not get out of (e.g., exit) the determined area within the determined time, the input unit 130 may determine a user motion as moving of pointing.

When an object gets out of the determined area within the determined time, the input unit 130 may determine a user motion as a slap. As another example, when a speed of an object is determined to be equal to or less than the preset speed (e.g., 30 cm/s), the input unit 130 determines a user motion to be a moving of pointing. When a speed of an object is determined to be greater than the preset speed, the input unit 130 determines a user motion as a slap. According to various embodiments of the present disclosure, the input unit 130 performs the function or task of the display apparatus 100, by using the recognized hand gesture.

FIGS. 5A, 5B, and 5C are views to explain an input method of a display apparatus according to an embodiment of the present disclosure. For example, FIGS. 5A, 5B, and 5C are views to explain the function of the display apparatus in accordance with hand gesture.

Referring to FIG. 5A, the hand gesture of unfolding and moving the hands may locate a pointer to a location which a user wants, the hand gesture of folding fists may select an item, and the hand gesture of moving in up or down direction while folding fists, or moving in right or left direction while folding fists in a vertical direction may perform scroll function. In addition, the hand gesture of rotating the hands may go back to the previous menu.

However, as described above, inputting a user command by the input unit 130 by using the hand gesture of a user is merely an example, and a user command may be input by using various input apparatuses such as a pointing device, a voice recognizer, a mouse, a touch panel, a remote controller, and/or the like.

Referring to FIG. 5B, the input unit 130 may receive various user commands by using a touch panel in a remote controller. Referring to FIG. 5C, the input unit 130 may receive various user commands by using a plurality of buttons in a remote controller or other external input device.

According to various embodiments of the present disclosure, the input unit 130 may receive a user command for moving a pointer. At this time, the controller 140, according to a user command input through the input unit 130, may locate a pointer on at least one of the first display 110 and the second display 120. A method for displaying a pointer by the controller 140 will be explained with reference to FIGS. 6A and 6B.

Figure 6A:
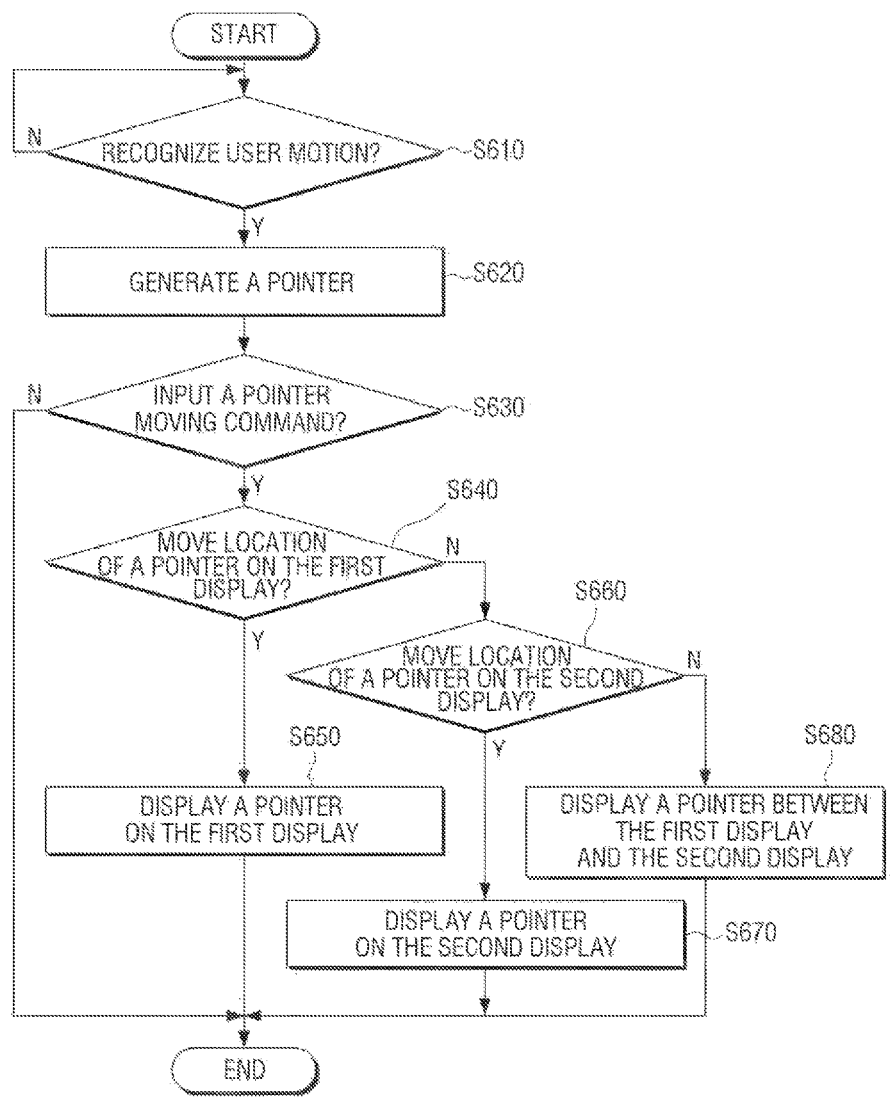
FIGS. 6A and 6B are views to explain a method for determining a pointer location according to an embodiment of the present disclosure.
Figure 6B:
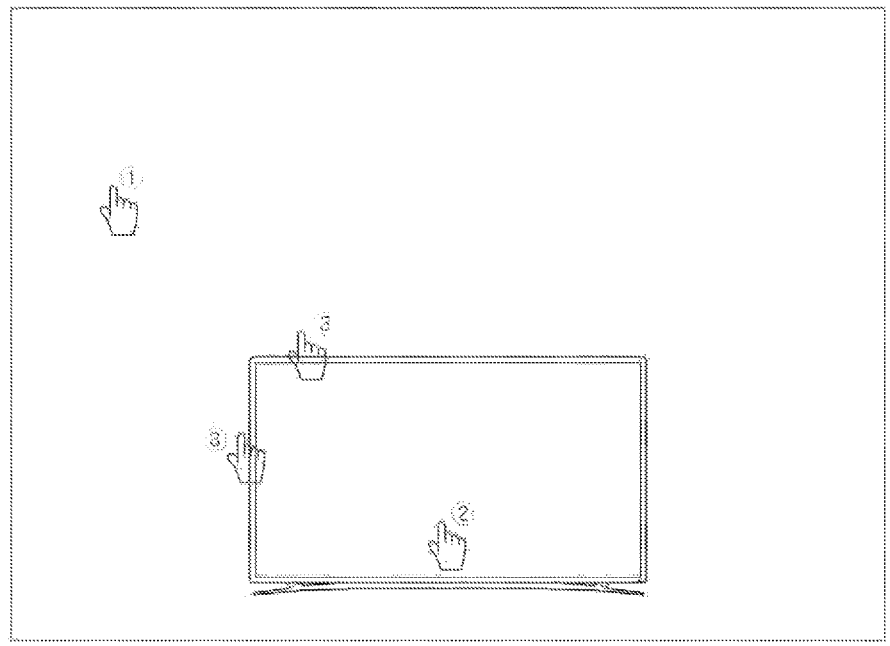

FIGS. 6A and 6B are views to explain a method for determining a pointer location according to an embodiment of the present disclosure.

Referring to FIG. 6A, at operation S610, the controller 140 determines whether a user motion is recognized. In this case, a user motion may be a hand gesture (e.g., the hand gesture of a user of shaking the hands by three times or more in right and left directions) of the user to generate a pointer.

If the controller 140 determines that a user motion is not recognized at operation S610, then the controller 140 may continue to poll for an indication that a user motion is recognized.

In contrast, if the controller 140 determines that a user motion is recognized at operation S610, then the controller 140 may proceed to operation S620 at which the controller 140 generates a pointer on a display screen. In this case, the controller 140 may display a pointer on one of the first display 110 and the second display 120.

At operation S630, the controller 140 determines whether a pointer moving command is input. At this time, a command for moving a pointer may be a hand gesture of unfolding and moving the hand.

If the controller 140 determines that the pointer moving command is not input at operation S630, then the controller 140 may end the method for determining the pointer location.

In contrast, if the controller 140 determines that a command for moving a pointer is input at operation S630, then the controller 140 may proceed to operation S640 at which the controller 140 determines whether a pointer according to a command for moving a pointer is located on the first display 110. For example, the controller 140 determines whether the pointer is moved on or otherwise located on the first display.

If the controller 140 determines that a pointer is located on the first display 110 at S640, then the controller 140 may proceed to operation S650 at which the controller 140 displays a pointer on the first display 110. For example, referring to FIG. 6B, the controller 140 may control the first display 110 so as to display a pointer on location of ②.

If the controller 140 determines that a pointer is not located on the first display 110 at operation S640, then the controller 140 may proceed to operation S660 at which the controller 140 determines whether a pointer is located on the second display 110.

If the controller 140 determines that a pointer is located on the second display 110 at operation S660, then the controller 140 may proceed to operation S670 at which the controller 140 displays a pointer on the second display 120. For example, referring to FIG. 6B, the controller 140 may control the second display to display a pointer on location ①.

In contrast, if the controller 140 determines that a pointer is not located on the second display 120 at operation S660, then the controller 140 may proceed to operation S680 at which the controller 140 may control the first display 110 and the second display 120 to display a pointer on a boundary of the first display 110 and the second display 120. For example, referring to FIG. 6B, the controller 140 may control the first display 110 and the second display 120 to display a pointer on location of ③. In this case, the controller 140, according to a user command, may adjust a ratio of a pointer which is displayed on the first display 110 and on the second display 120 differently.

By the above-described method for deciding location of a pointer, the display apparatus 100 may locate a pointer at one of the first display 110 and the second display 120.

The controller 140 controls overall operations of the display apparatus 100 according to a user command input through the input unit 130. For example, when a user command is input through the input unit 130 (e.g., in response to input of the user command), the controller 140 may control the second display 120 to display a UI to control the display apparatus 100 on the second display 120.

FIGS. 7A, 7B, 7C, 7D, 7E, 7F, 7G, 7H, 7I, 7J, 7K, 8A, 8B, 8C, 8D, 9A, 9B, 9C, 9D, 9E, 9F, 9G, 9H, 9I, 10A, 10B, 10C, 10D, 10E, 11A, 11B, 11C, 11D, 11E, 11F, 11G, 12A, 12B, 13A, 13B, 13C, 14A, 14B, 14C, 15A, 15B, 16A, 16B, 16C, 17A, 17B, 17C, 18A, 18B, and 18C are views to explain various embodiments of a UI to control a display apparatus displayed in the second display according to various embodiments of the present disclosure.

Figure 7A:
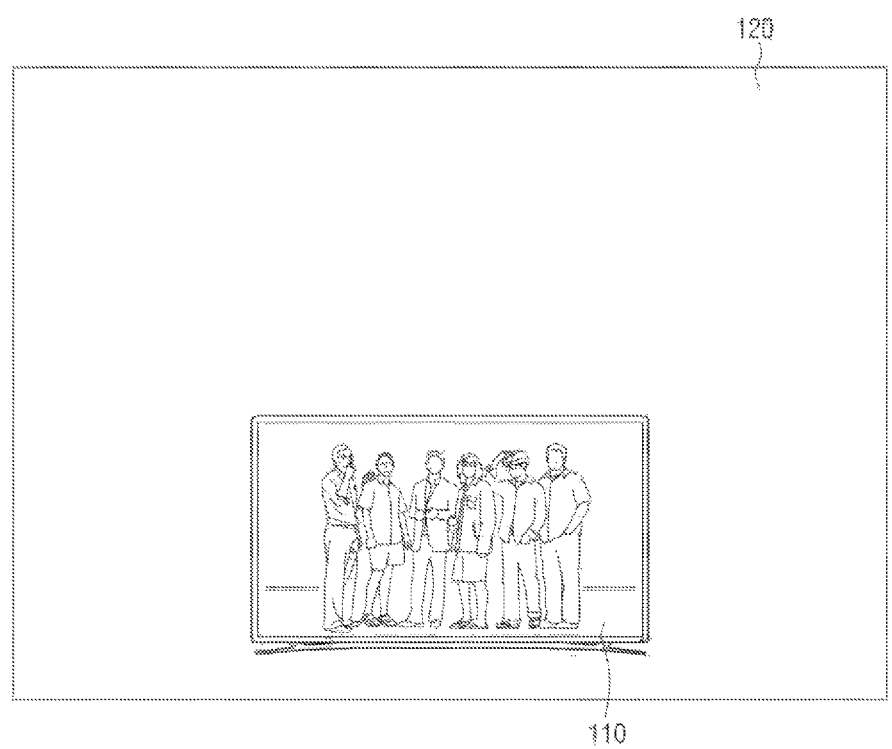
FIGS. 7A, 7B, 7C, 7D, 7E, 7F, 7G, 7H, 7I, 7J, 7K, 8A, 8B, 8C, 8D, 9A, 9B, 9C, 9D, 9E, 9F, 9G, 9H, 9I, 10A, 10B, 10C, 10D, 10E, 11A, 11B, 11C, 11D, 11E, 11F, 11G, 12A, 12B, 13A, 13B, 13C, 14A, 14B, 14C, 15A, 15B, 16A, 16B, 16C, 17A, 17B, 17C, 18A, 18B, and 18C are views to explain various embodiments of a User Interface (UI) to control a display apparatus displayed in the second display according to various embodiments of the present disclosure.
Figure 7B:
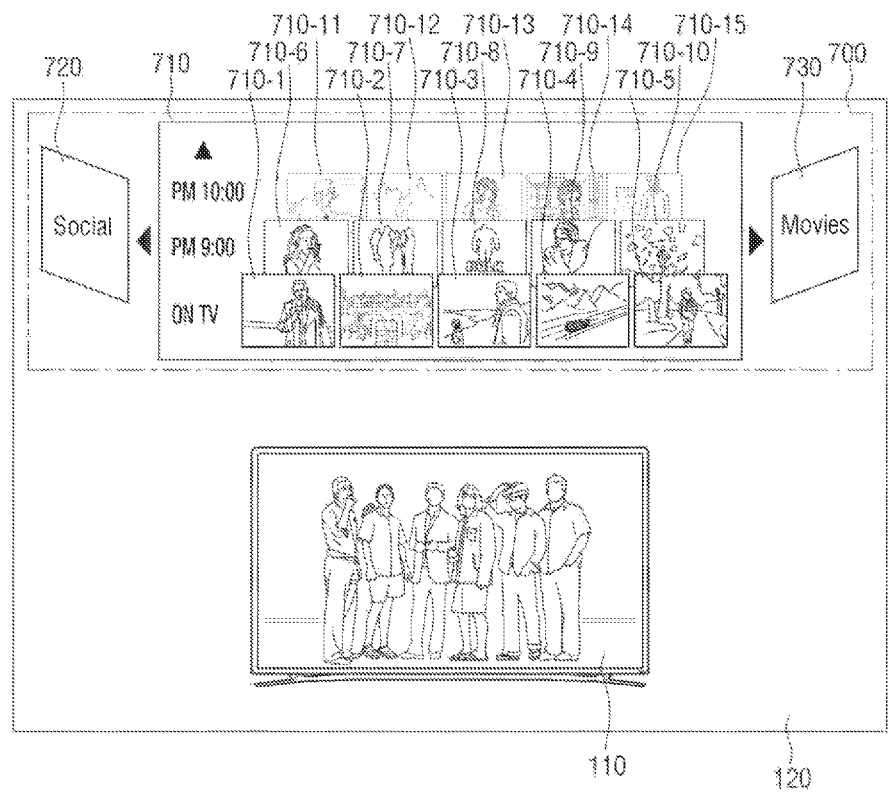

Referring to FIGS. 7A and 7B, when a command for generating a UI is input through the input unit 130 while an image content is displayed on the first display 110 (e.g., in response to input of the command for generating the UI), the controller 140 may control the second display 120 to display the content search UI 700 to search content on an upper area of the second display 120.

According to various embodiments of the present disclosure, the content search UI 700 may be categorized according to a content type. For example, as illustrated in FIG. 7B, the controller 140 may control the second display 120 to categorize and display a plurality of display items (710-1 to 710-15) corresponding to a broadcasting content 710. According to various embodiments of the present disclosure, as illustrated in FIG. 7B, a plurality of the broadcasting content may be listed up by times (e.g., scheduled broadcast times) and displayed. For example, in the first row, the display items (710-1 to 710-5) corresponding to a broadcasting content which is currently broadcasted, in the second row, the display items (710-6 to 710-10) which corresponding to a broadcasting content which is broadcasted at 9:00 p.m., and in the third row, the display items (710-111 to 710-15) corresponding to a broadcasting content which is broadcasted at 10:00 pm may be displayed.

According to various embodiments of the present disclosure, the controller 140 may control the second display 120 to display icons 720, 730 to display a display item corresponding to other content types. For example, the controller 140, as illustrated in FIG. 7B, may control the second display 120 to display an icon corresponding to SNS content 720 and an icon corresponding to movie content 730.

Figure 7C:
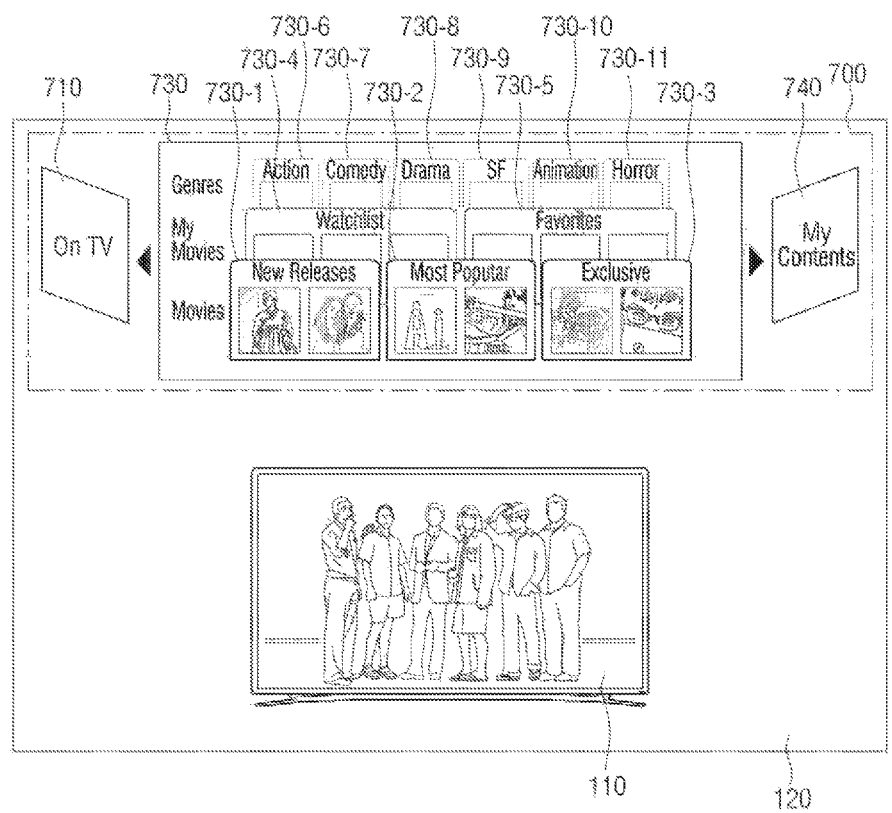

According to various embodiments of the present disclosure, when a certain user command is input (e.g., in response to input of the certain user command), the controller 140 may control the second display 120 to remove at least one display items corresponding to the first content type and display at least one display items corresponding to the second content on the content search UI 700. For example, as illustrated in FIG. 7C, when the icon corresponding to the movie content 730 is selected (e.g. in response to selection of icon for the movie content 730), the controller 140 may control the second display 120 to display a plurality of display items (730-1 to 730-11) corresponding to the movie content. As illustrated in FIG. 7C, the controller 1430 may control the second display 120 to display the icon corresponding to a broadcasting content 710 and the icon corresponding to My content stored by a user 740.

Figure 7D:
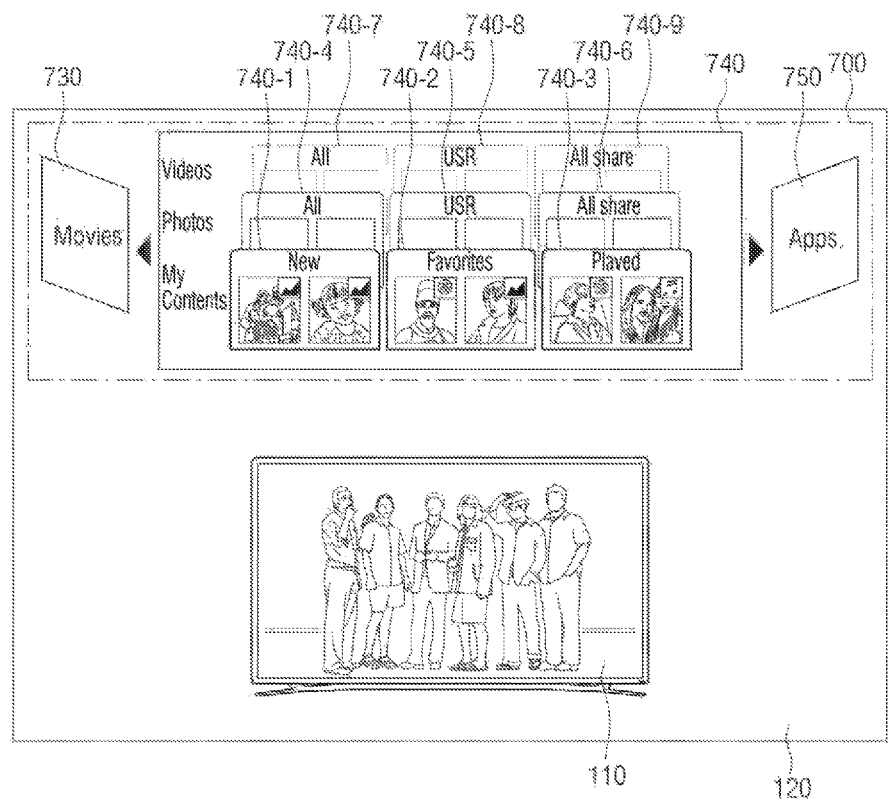
Figure 7E:
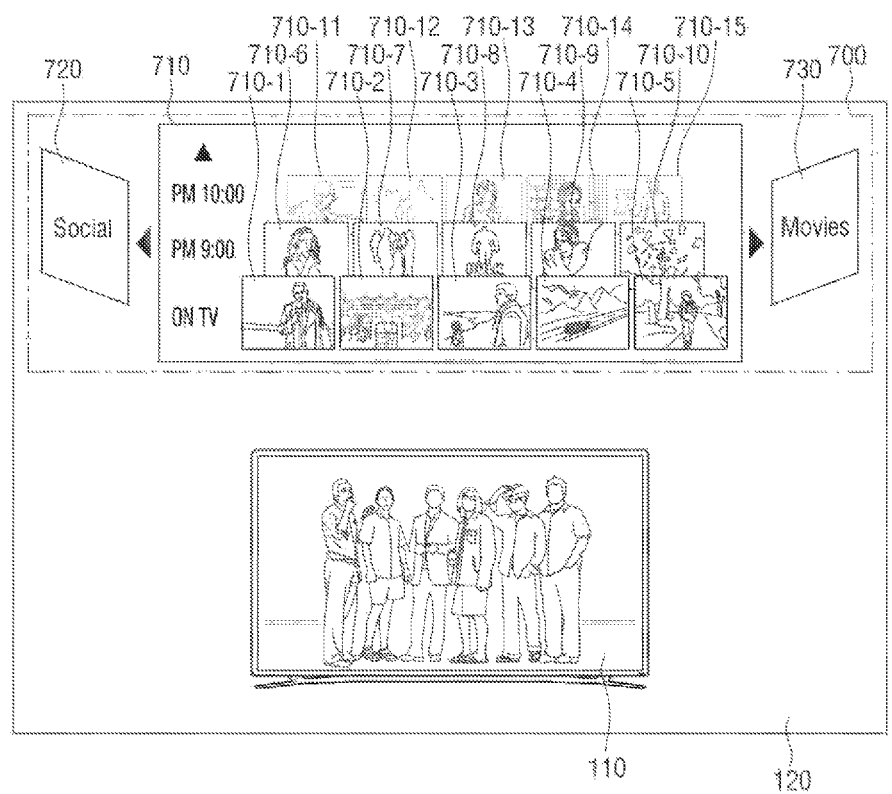

According to various embodiments of the present disclosure, as illustrated in FIG. 7D, when the icon corresponding to My content 740 is selected (e.g., in response to selection of the icon for My content 740), the controller 140 may display the second display 120 to display a plurality of items 740-1 to 740-9 corresponding to My content. In addition, as illustrated in FIG. 7D, when the icon corresponding to a movie content 730 is selected while the content search UI 700 is displayed (e.g., in response to the icon for the movie content 730), the controller 140 may control the second display to display the content search UI 700. According to various embodiments of the present disclosure, as illustrated in FIG. 7E, when the icon corresponding to a broadcasting content 710 is selected while the content search UI 700 is displayed (e.g., in response to selection of the icon for the broadcasting content 710), the controller 140 may control the second display 120 to display the content search UI 700.

According to various embodiments of the present disclosure, the various content types displayed on the second display (e.g., broadcasting content 710, SNS content 720, movie content 730, My content 740, application content 750, and/or the like) may be associated in a predetermined order such that in response to selection (e.g., by a user) of any one of the content types, icons for neighboring associated content types may be displayed. The various content types may be cyclically associated.

According to various embodiments of the present disclosure, when a certain user command is input thorough the input unit 130 while the content search UI is displayed (e.g., in response to input of the certain user command), the controller 140 may control the second display 120 to display highlight on one of the at least one display items displayed on the content search UI 700, and to display information on content corresponding to the highlighted display item nearby the highlighted display item. For example, as illustrated in FIG. 7F, when a user command for selecting a confirmation button of a remote controller is input while the content search UI 700 is displayed (e.g., in response to selection of the first display item 710-1), the controller 140 may control the second display 120 to display highlight on the first display item 710-1, and display, at a lower part of the first display item 710-1, information 711 (e.g., a broadcasting program name, broadcasting time, and/or the like) on a broadcasting content corresponding to the first display item 710-1.

Figure 7F:
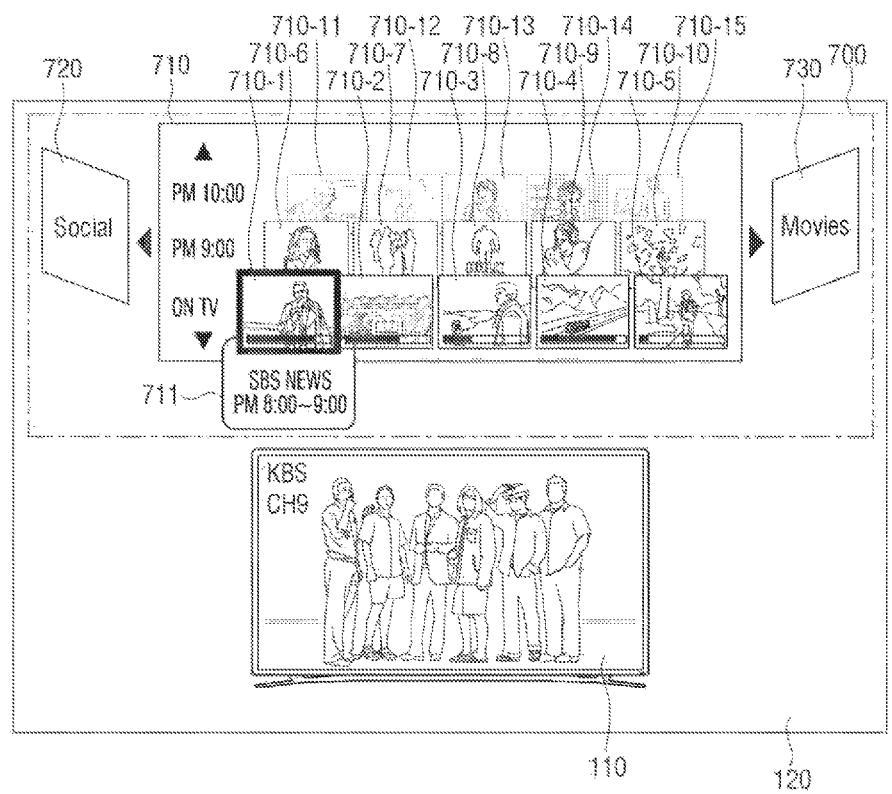
Figure 7G:
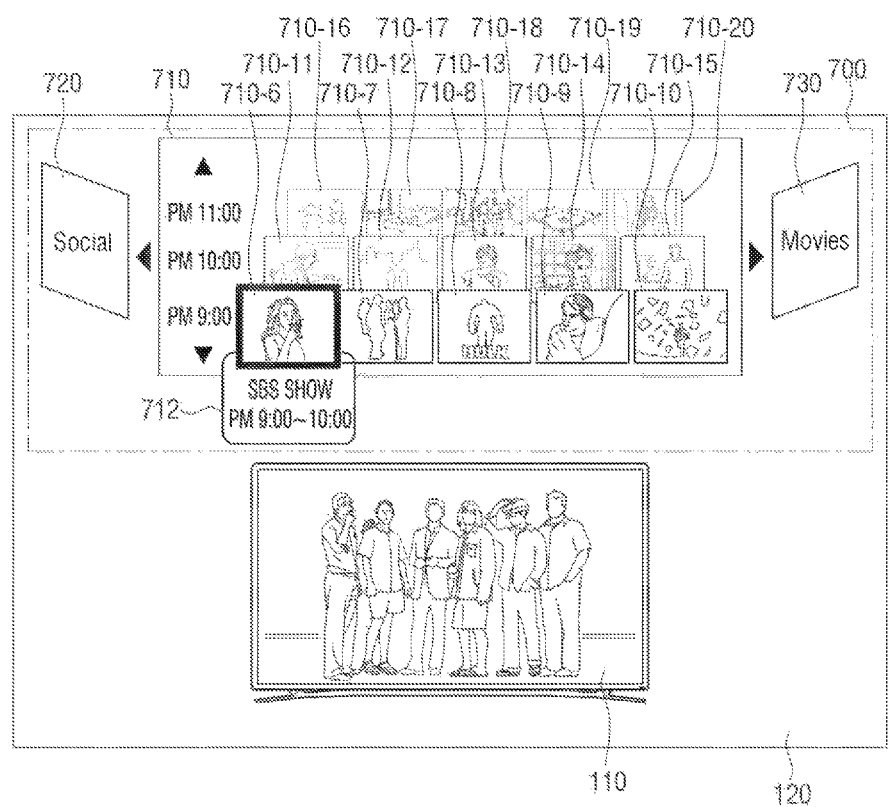

According to various embodiments of the present disclosure, as illustrated in FIGS. 7F and 7G, when a command for moving in a up direction (e.g., a command for selecting up button on a remote controller) is input while the content search UI 700 is displayed as illustrated in FIG. 7F (e.g., in response to input of the command for moving in an up direction), the controller 140 may control the second display 120 to display highlight on the sixth display item 710-6, and display information 7112 corresponding to the sixth display item 710-6 at a lower part of the sixth display item 710-6. The display items (710-1 to 710-5) corresponding to a broadcasting content which is currently broadcasted may be removed, and the display items (710-16 to 710-20) corresponding to a broadcasting content which is broadcasted at 11:00 pm may be displayed on the second display 120.

Figure 7H:
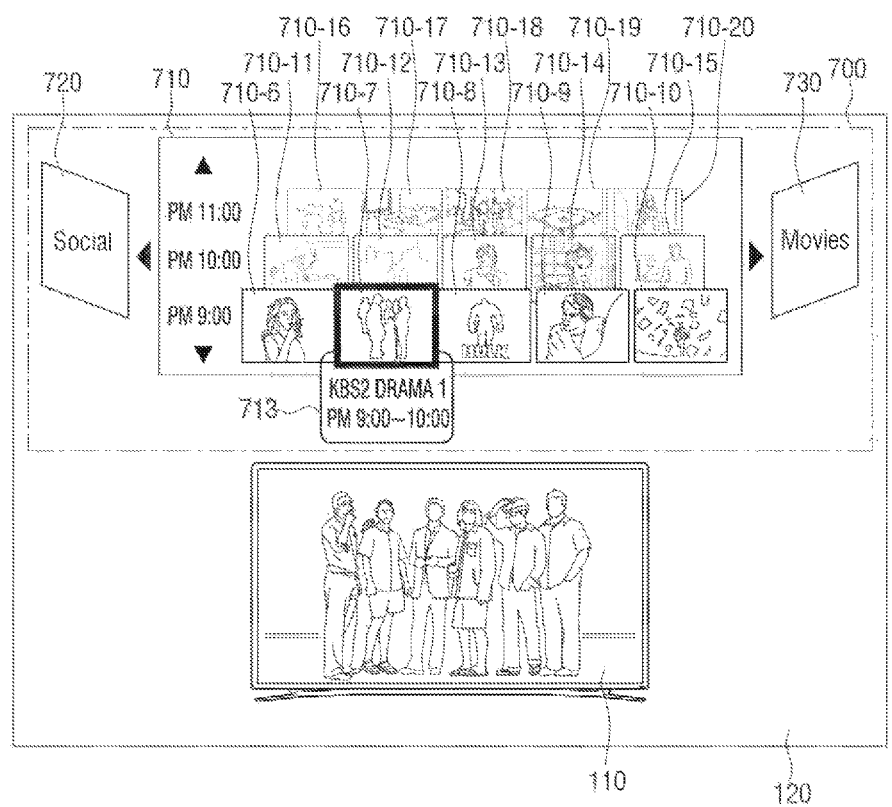

According to various embodiments of the present disclosure, as illustrated in FIGS. 7G and 7H, when a command for moving in a right direction (e.g., a command for selecting right button on a remote controller) is input while the content search 700 is displayed as illustrated in FIG. 7G (e.g., in response to input of the command for moving in a right direction), the controller 140 may control the second display 120 to display highlight on the sixth display item 710-7, and display information 713 corresponding to the sixth display item 710-7 at a lower part of the sixth display item 710-7. The display items (710-1 to 710-5) corresponding to a broadcasting content which is currently broadcasted may be removed (e.g., not displayed), and the display items (710-16 to 710-20) corresponding to a broadcasting content which is broadcasted at 11:00 pm may be displayed on the second display 120.

Figure 7I:
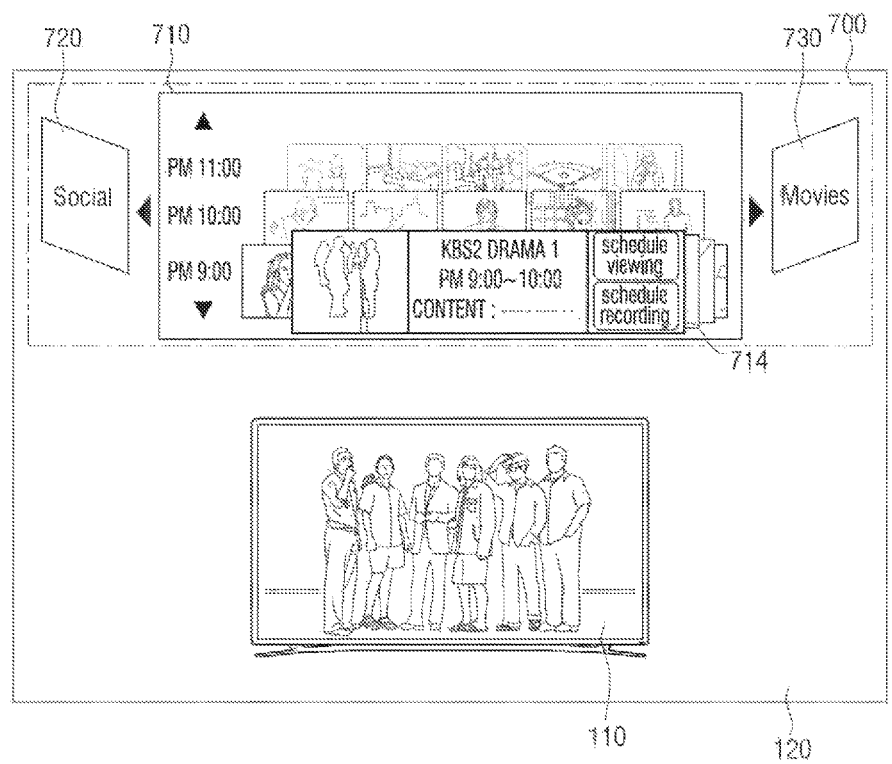

According to various embodiments of the present disclosure, referring to FIGS. 7H and 7I, while the content search UI 700 as illustrated in FIG. 7H is displayed, a command for selecting (e.g., a command for selecting a confirm button of a remote controller, the hand gesture of holding the hand of a user, and/or the like) is input (e.g., in response to selection of the confirmation button), the controller 140 may control the second display 120 to display detailed information on the display item 710-7 (e.g., channel name, program name, broadcasting time, synopsis, and/or the like), and the guide display item 714 including an icon for reserved watching and an icon for reserved recording.

Figure 7J:
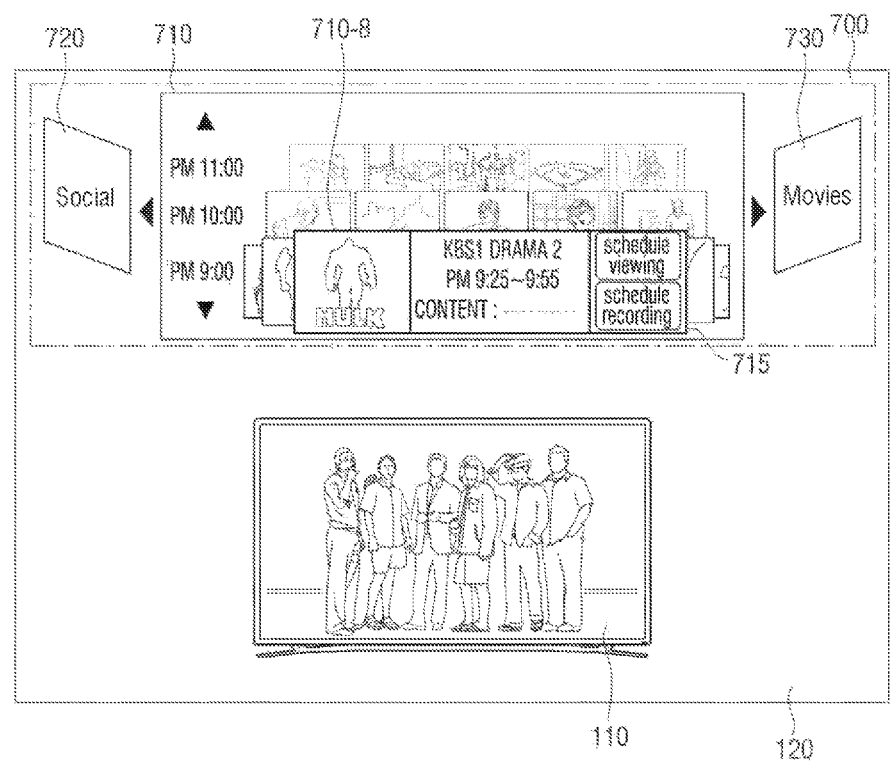

According to various embodiments of the present disclosure, as illustrated in FIGS. 7I and 7J, when a command for moving in a right direction (e.g., command for selecting a right button of a remote controller, and/or the like) is input while the content search UI 700 as illustrated in FIG. 7I is displayed (e.g., in response to selection of the right button), the controller 140 may control the second display 120 to display detailed information on the display item 710-8 (e.g., channel name, program name, broadcasting time, synopsis, and/or the like), and the guide display item 715 including an icon for reserved watching and an icon for reserved recording.

Figure 7K:
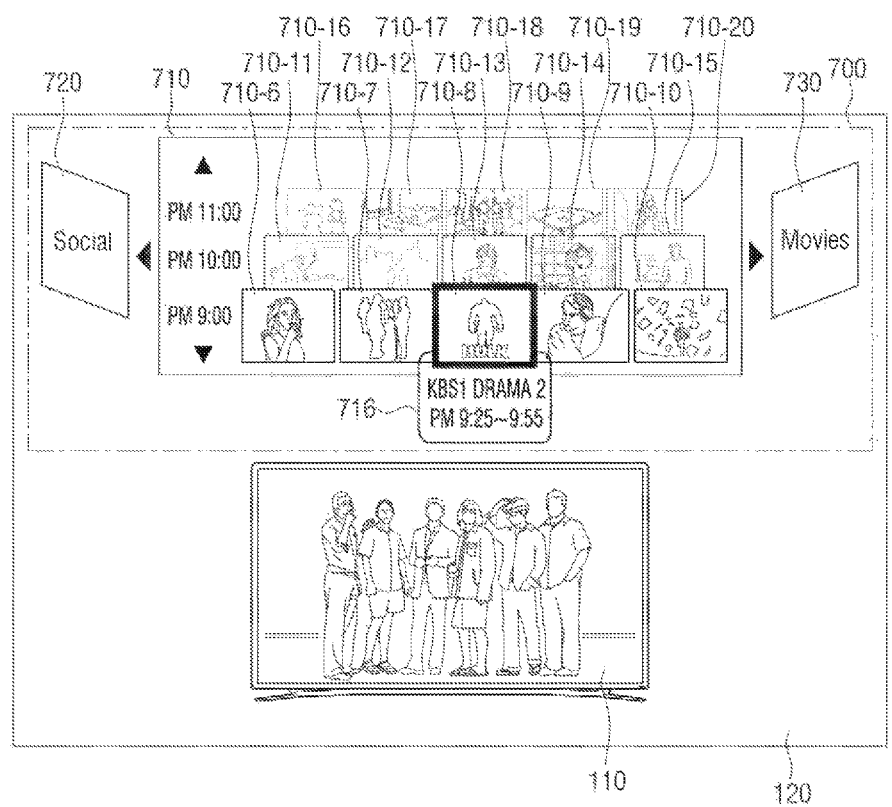

According to various embodiments of the present disclosure, as illustrated in FIGS. 7J and 7K, while the content search UI 700 as illustrated FIG. 7J is displayed, when the previous command (such as a command for selecting a previous button of a remote controller, the hand gesture of rotating the hand of a user, and/or the like) is input (e.g., in response to input of the previous command), the controller 140 may control the second display 120 to display highlight on the eight display item 710-8, and information 716 on a broadcasting content corresponding to the eighth display item 710-8 at a lower part of the eights display item 710-8.

According to various embodiments of the present disclosure, when a certain user command is input through the input unit 130 while a broadcasting content is displayed on the first display 110 (e.g., in response to input of the certain user command), the controller 140 may control the second display 120 to display the channel search UI to search other channels at a left or a right area of the second display 120. For example, referring to FIGS. 8A and 8B, when a channel search command (e.g., a command for selecting a channel search button of a remote controller) is input, while a broadcasting content is displayed on the first display 110 (e.g., in response to input of the channel search command), the controller 140 may control the second display 120 to display the channel search UI 800 to search a channel on a right area of the second display 120. The third display items 810,820,830 corresponding to a plurality of channels may be included in the channel search UI 800.

Figure 8A:
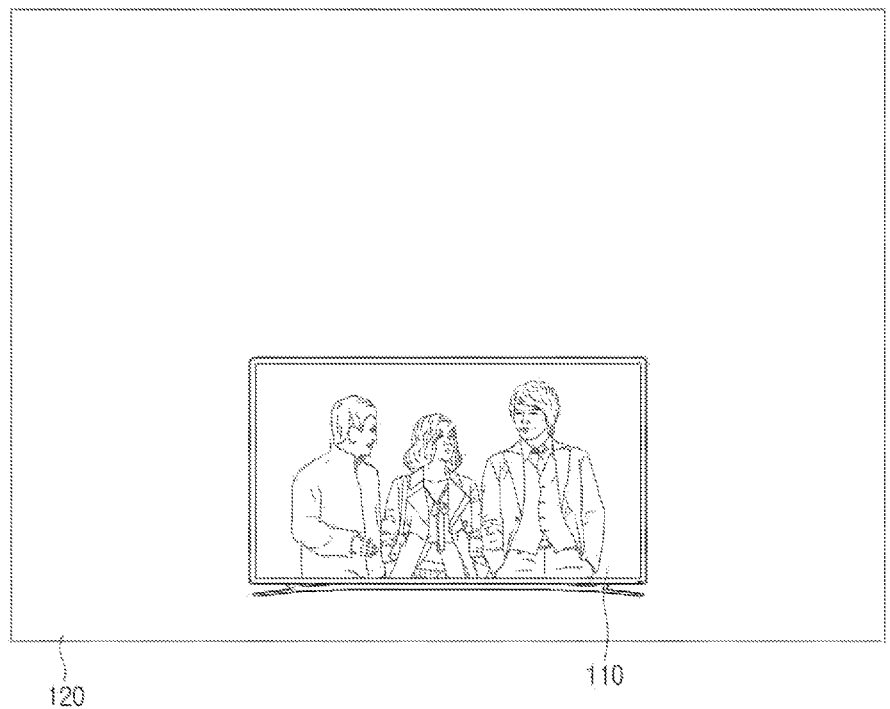
Figure 8B:
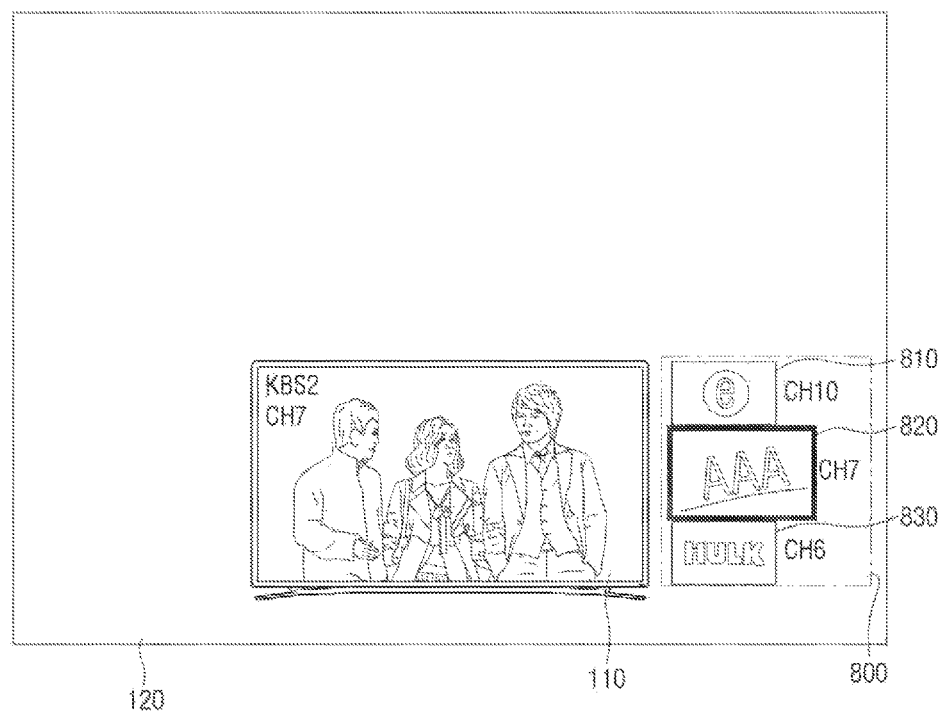
Figure 8C:
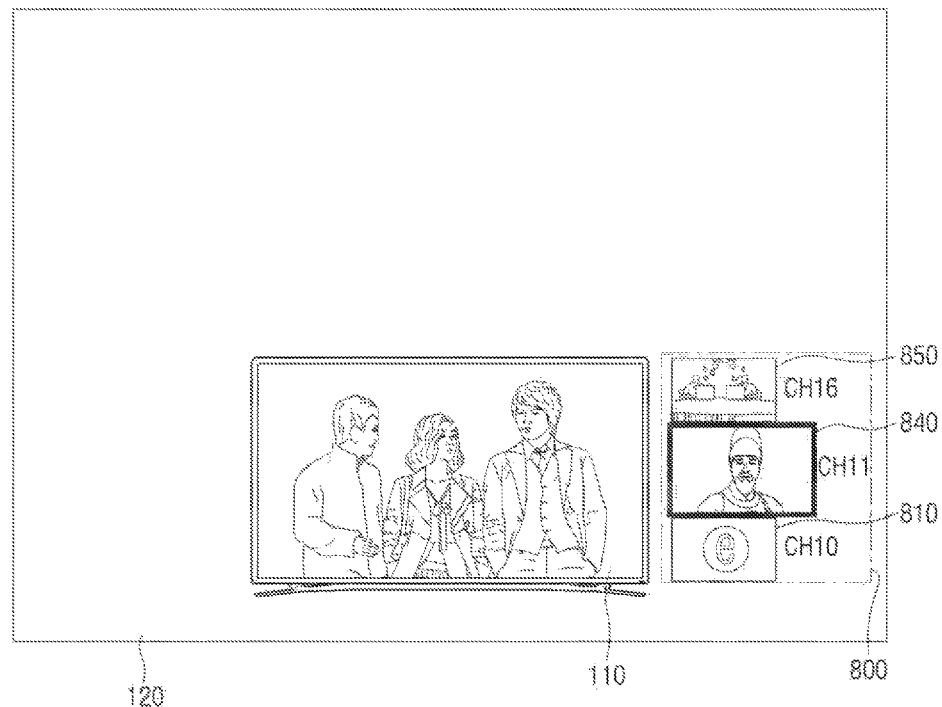

According to various embodiments of the present disclosure, as illustrated in FIGS. 8B and 8C, while the channel search UI 800 is displayed, when a command for moving in an up direction (e.g., a command for selecting a up button of a remote controller for two times, and/or the like) is input (e.g., in response to input of a command for increasing the channel number), the controller 140 may control the second display 120 to display the first, the fourth, and the fifth display items 810,840,850.

Figure 8D:
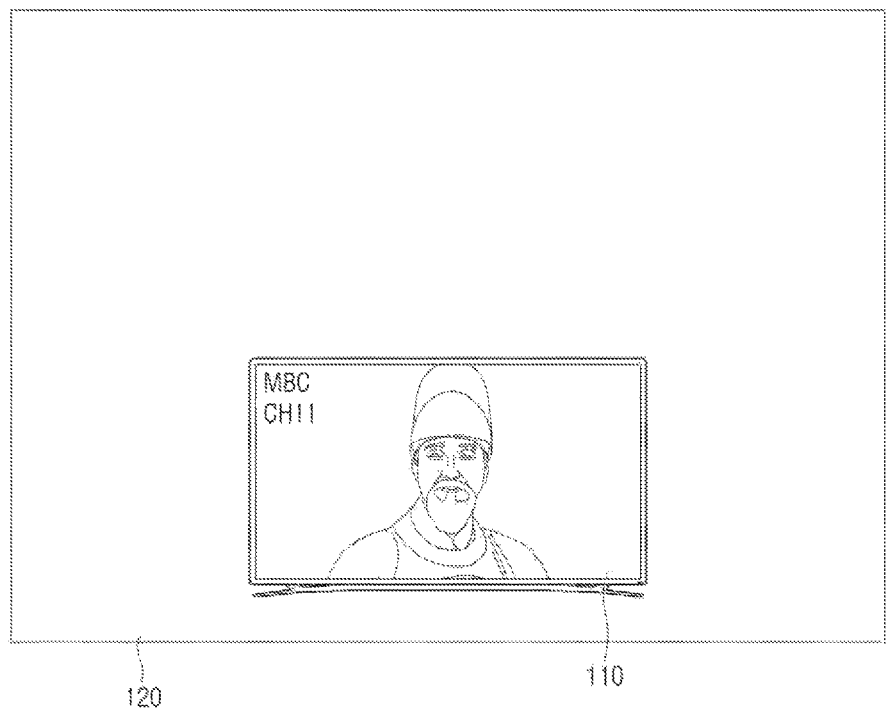

According to various embodiments of the present disclosure, as illustrated in FIGS. 8C and 8D, while the channel search UI 800 as illustrated in FIG. 8C is displayed, when a command for selecting (e.g., a command for selecting a confirm button) is input (e.g., in response to selecting the highlighted channel), the controller 140 may control the first display 110 to display a broadcasting channel corresponding to the highlighted fourth display item 840.

Figure 9A:
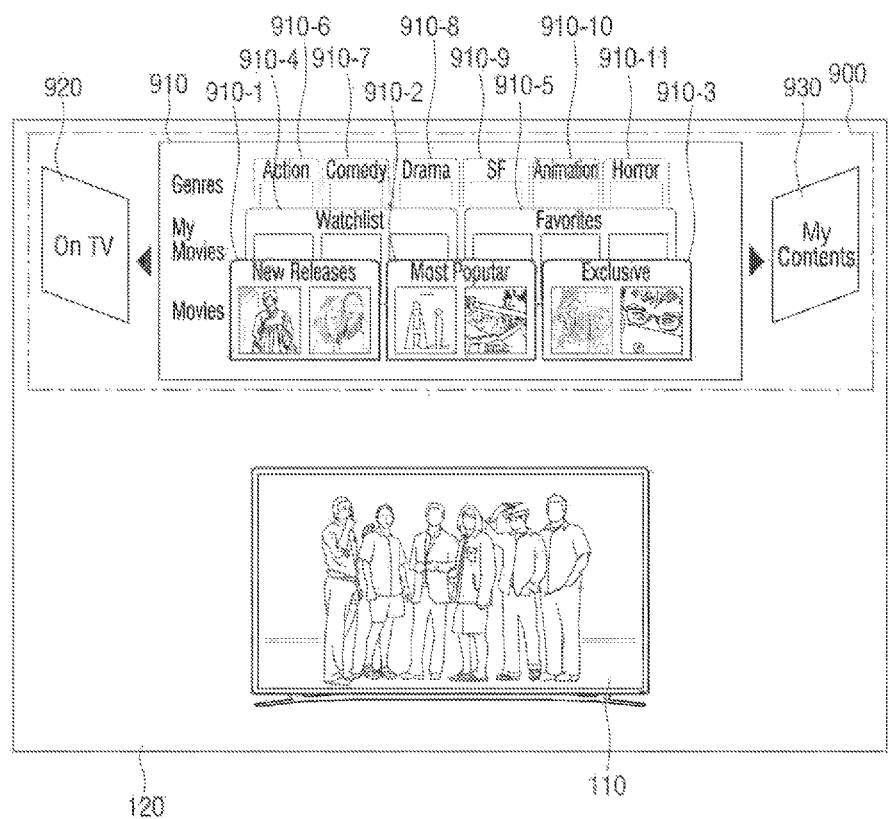

According to various embodiments of the present disclosure, as illustrated in FIG. 9A, in response to selection of a content type, the controller 140 may control the second display 120 to display at least one display item. For example, in response to selecting the movie content 910 (e.g., from among the movie content 910, the broadcast content 920, and the My contents 930), the controller 140 may control the second display 120 to display items 910-1 to 910-11.

According to various embodiments of the present disclosure, as illustrated in FIG. 9A, when one of the at least one display items 910-1 to 910-11 displayed on the content search UI 900 is selected through the input unit 130 (e.g., in response to selection of one of the at least one display items), the controller 140 may control the first display 110 to display a content list corresponding to the selected display item. For example, as illustrated in FIGS. 9A and 9B, when a command for selecting (e.g., a command for selecting a confirm button of a remote controller) is input while the content search UI 900 as illustrated in FIG. 9A is displayed (e.g., in response to selection of a display item), the controller 140 may control the second display 120 to display highlight on the first display item 910-1, and display information (e.g., the number of files, and/or the like) corresponding to the first display item 901-1 at a lower part of the first display item 910-1.

Figure 9B:
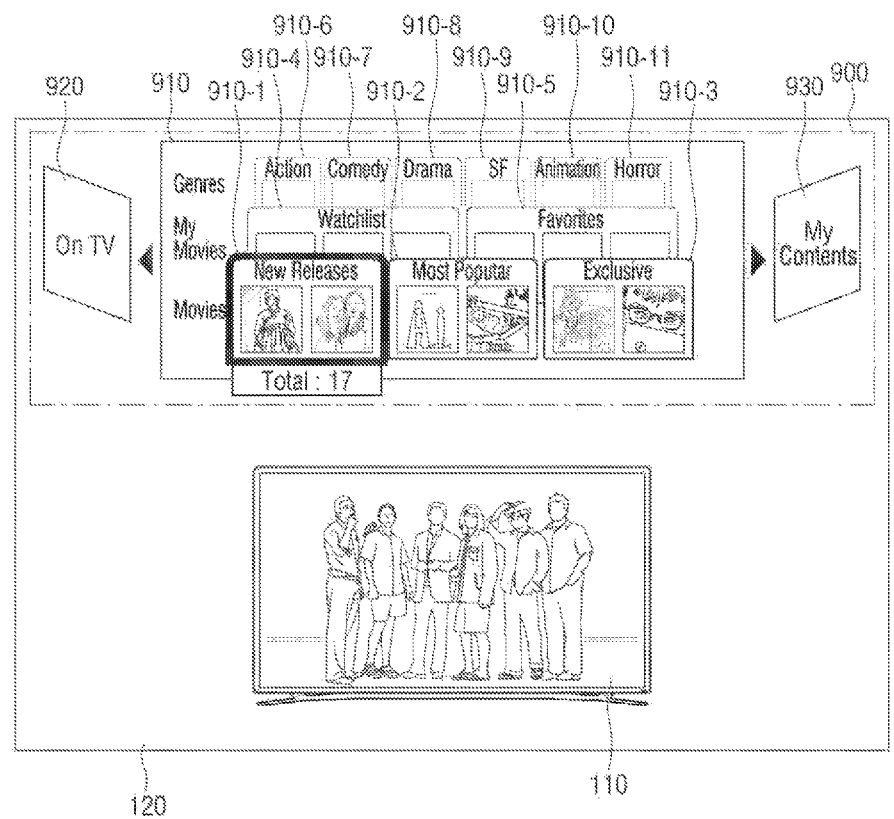
Figure 9C:
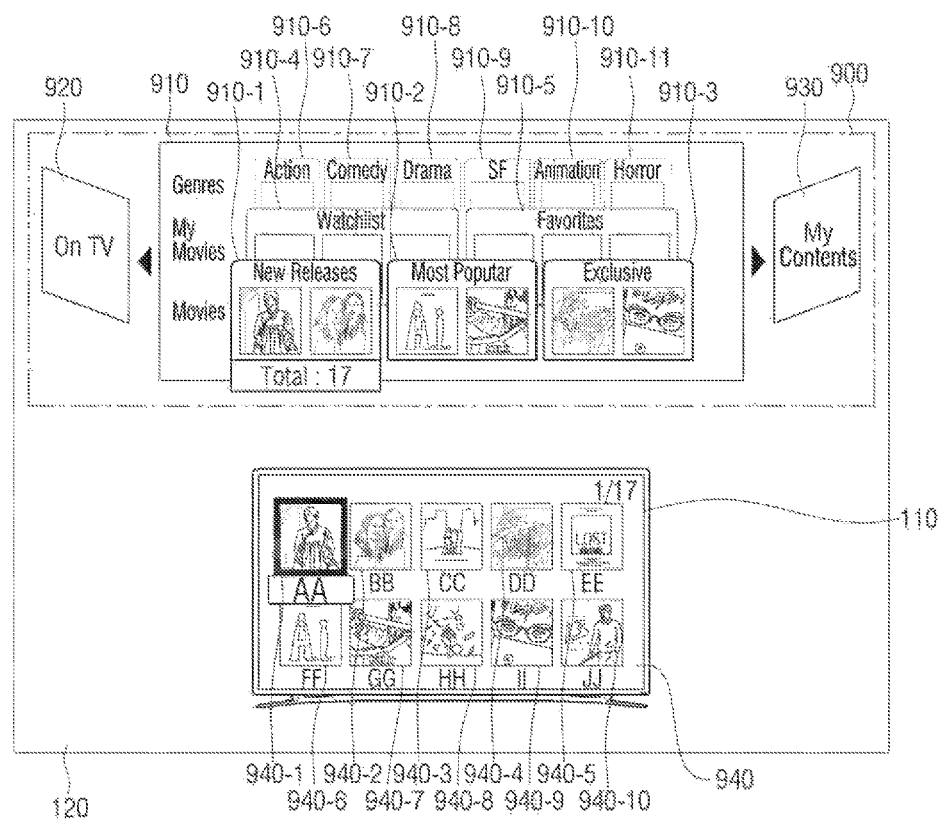

According to various embodiments of the present disclosure, as illustrated in FIGS. 9B and 9C, while the content search UI 900 is displayed, when a command for selecting (e.g., command for selecting a confirm button of a remote controller, and/or the like) is input (e.g., in response to input of the selection command), the controller 140 may control the first display 110 to display the latest movie list 940 including the latest movie content corresponding to the first display item 910-1. In this case, in the latest movie list 940, the first movie item to the tenth movie item (e.g., 940-1 to 940-10) are included, and highlight may be displayed on the first movie item 940-1.

Figure 9D:
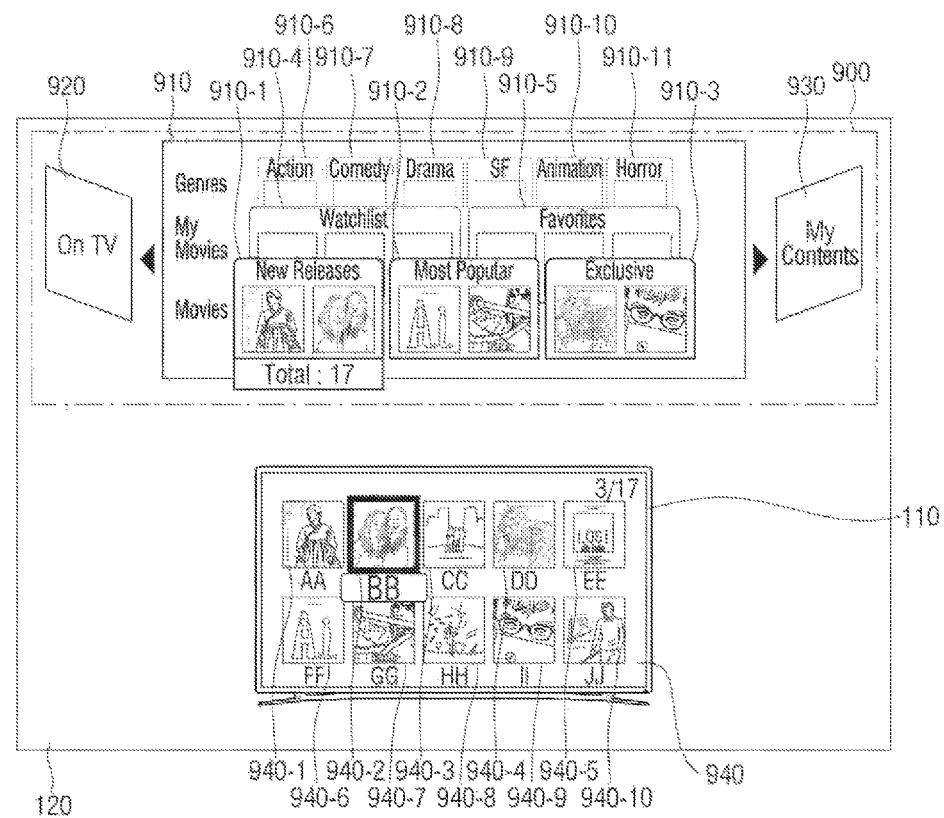

According to various embodiments of the present disclosure, as illustrated in FIGS. 9C and 9D, while the latest movie list 940 is displayed, when a command for moving in a right direction (e.g., a command for selecting a right button of a remote controller, and/or the like) is input (e.g., in response to input of a command for moving selection in a right direction), the controller 140 may control the first display 110 to move highlight to the second movie item 940-2.

Figure 9E:
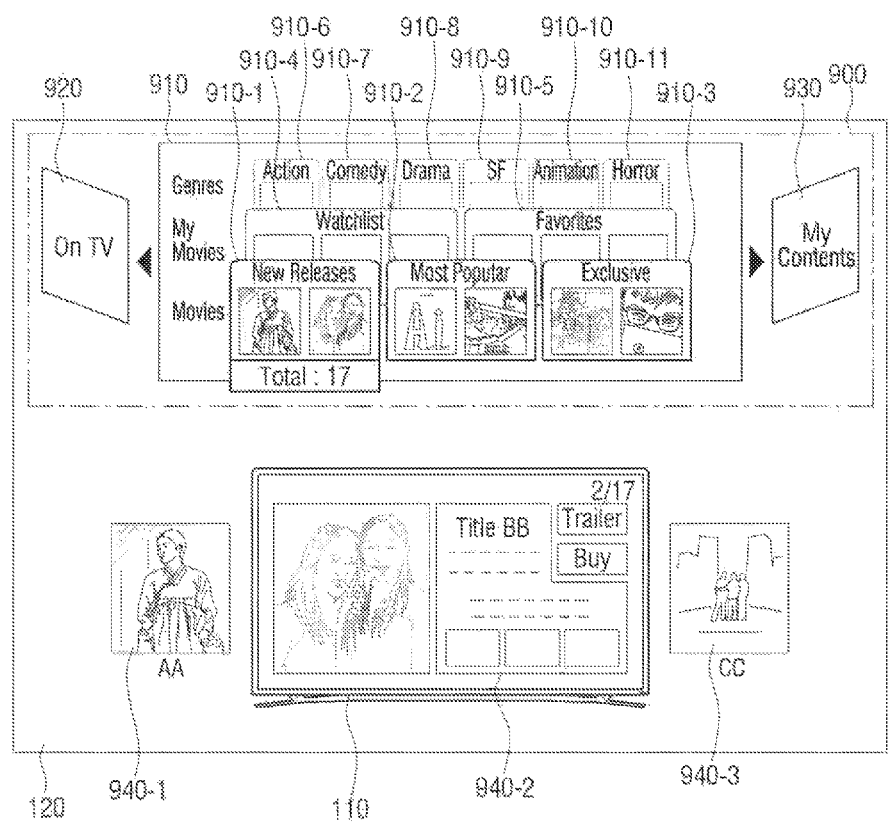

According to various embodiments of the present disclosure, if one of the plurality of content displayed on a content list is selected (e.g., in response to selection of one of the plurality of content), then the controller 140 may control to display a screen corresponding to the selected content on the first display 110, and display a screen corresponding to a part of the non-selected content on the second display 120. For example, as illustrated in FIGS. 9D and 9E, while the latest movie list 940 is displayed as illustrated in FIG. 9D, when a command for selecting (e.g., a command for selecting a confirm button of a remote controller, and/or the like) is input (e.g., in response to selection of an item), the controller 140 may control the first display 110 to display a detail information screen corresponding to the selected second movie item 940-2, and control the second display 120 to display a screen, from among the non-selected movie items, corresponding to the first movie item 940-1 at a left side of the second display 120, display a screen corresponding to the third movie item 940-3 at a right side of the second display 120. The controller 140 may control the second display 120 to display movie items neighboring the selected movie item being displayed on the first display 110, According to various embodiments of the present disclosure, a screen corresponding to the first movie item 940-1 and the third movie item 940-3 may be a poster screen of the first latest movie and the third latest movie, but this is merely an example, and also may be a screen of a detailed information as displayed on the first display 110. A movie item may correspond to a title screen, an image of the associated movie content, a video of the associated movie content, and/or the like.

Figure 9F:
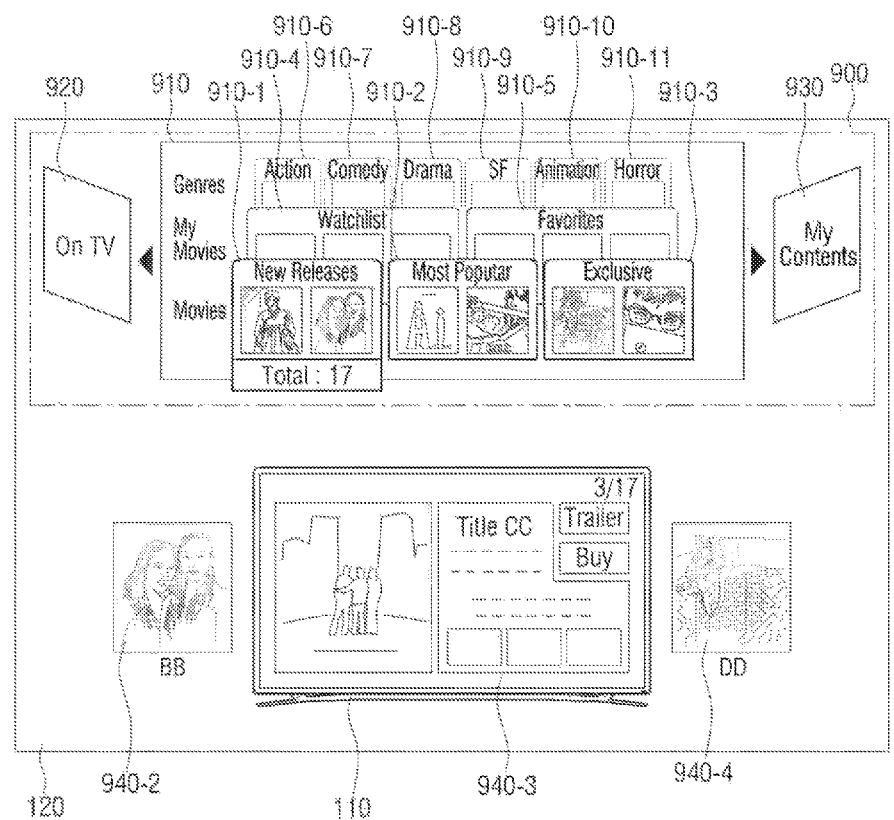

According to various embodiments of the present disclosure, as illustrated in FIGS. 9E and 9F, when a command for moving in a right direction (e.g., a command for selecting a right button of a remote controller) is input (e.g., in response to input of a command for moving the selection of the movie item in the right direction), the controller 140 may control the first display 110 to display a detail information screen corresponding to the third movie item 940-3, and control the second display 120 to display a screen corresponding to the second movie item 940-2 at a left side of the second display 120, and display a screen corresponding to the fourth movie item 940-4 at a right side of the second display 120. For example, the controller 140, when searching content, may interlink the first display 110 and the second display 120, and display content.

Figure 9G:
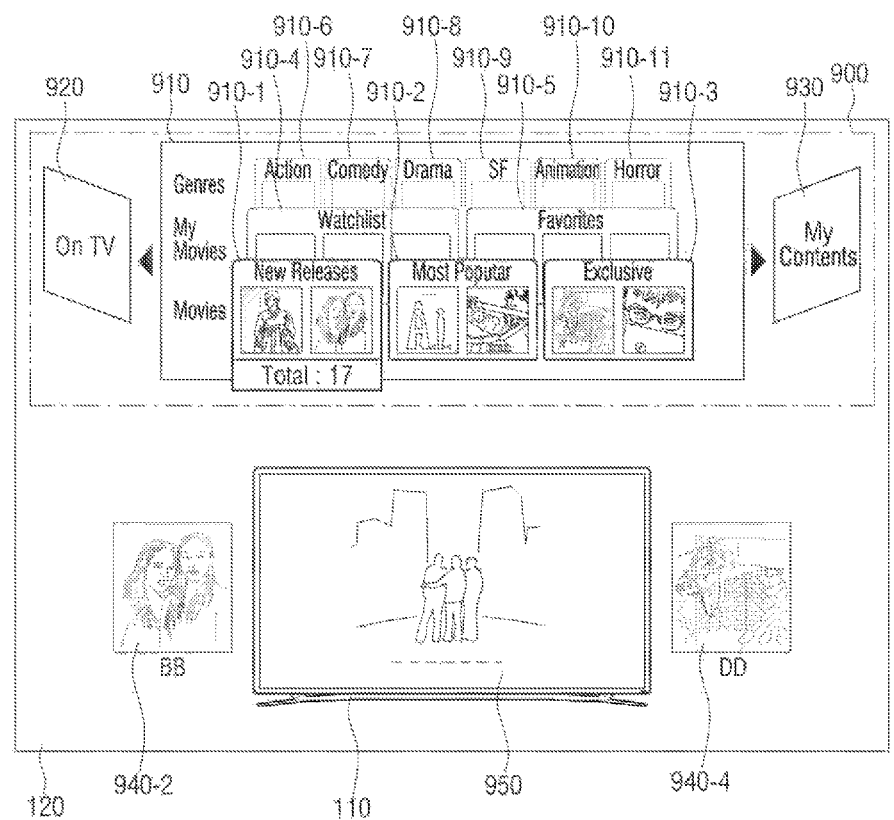

According to various embodiments of the present disclosure, as illustrated in FIGS. 9F and 9G, when a command for reproducing (e.g., when a reproducing icon is selected) is input while displayed as FIG. 9F (e.g., in response to input of a command to reproduce the selected item), the controller 140 may control the first display 110 to display a reproducing screen 950 of the third latest movie. For example, the content associated with the selected movie item may be reproduced at the reproducing screen 950.

Figure 9H:
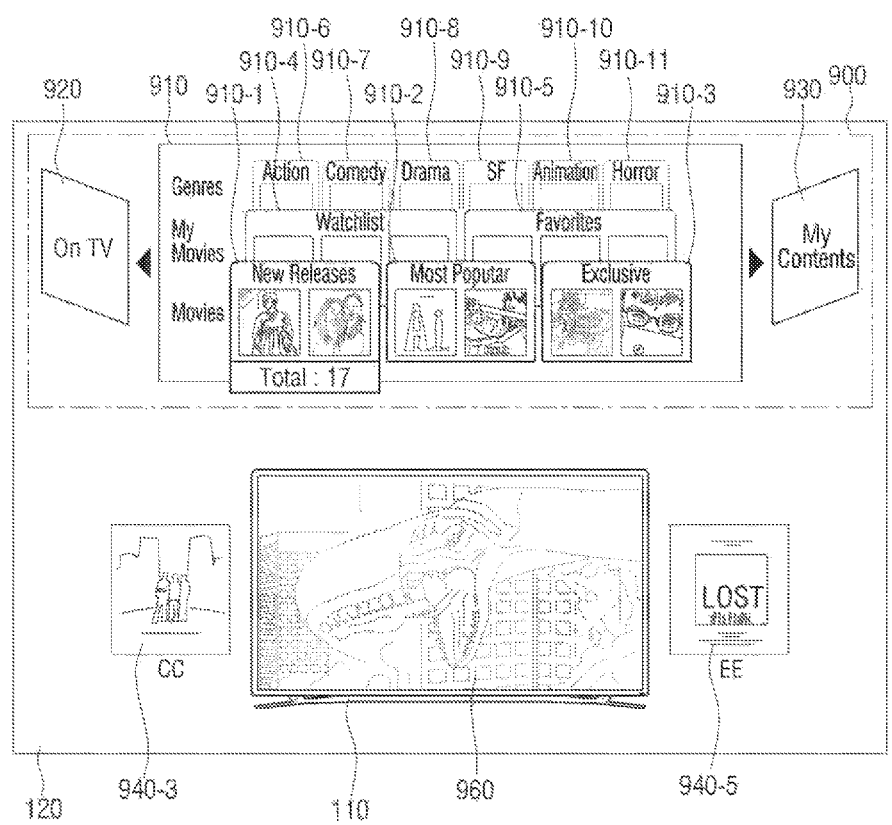

According to various embodiments of the present disclosure, as illustrated in FIGS. 9G and 9H, while the reproducing screen of the third latest movie 950 is displayed, when a button for command of moving in a right direction (e.g., a command for selecting a right button of a remote controller, and/or the like) is input (e.g., in response to input of a command for moving the selection of the movie item in the right direction), the controller 140 may control the first display 110 to display the reproducing screen of the fourth latest movie 960, and control the second display 120 to display a screen corresponding to the third movie item 940-3 at a left side of the second display 120, and display a screen corresponding to the fifth movie item 940-5 at a right side of the second display 120.

Figure 9I:
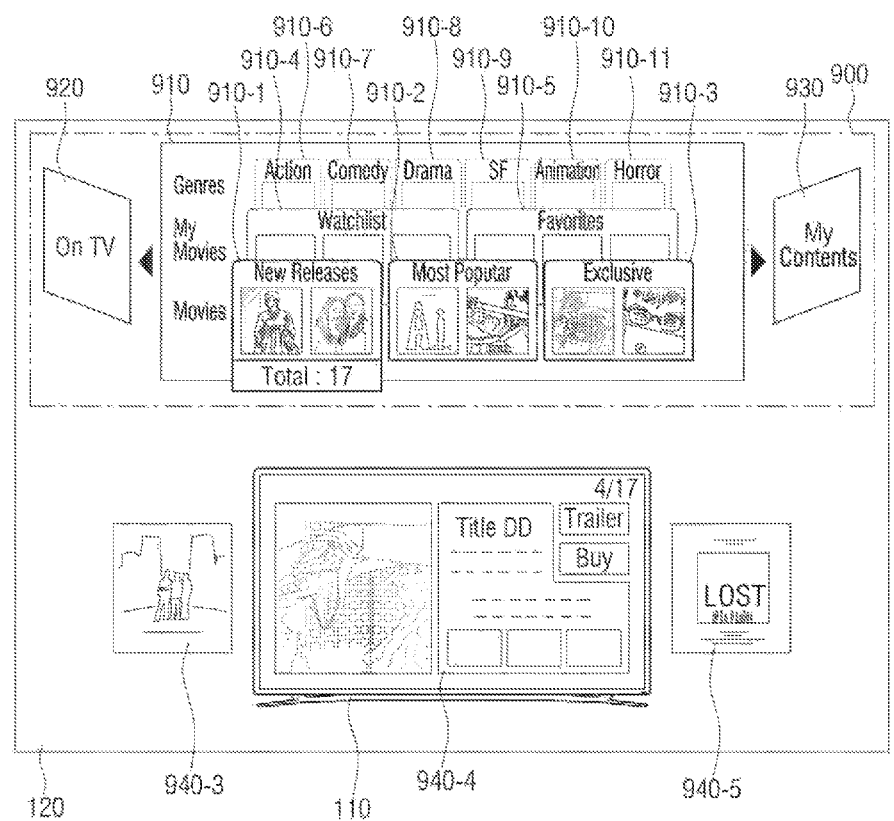

According to various embodiments of the present disclosure, as illustrated in FIGS. 9H and 9I, while the reproducing screen of the fourth latest movie 960 is displayed, when a return command (e.g., a command for selecting a previous button of a remote controller) is input (e.g., in response to input of a command to return to a previous state), the controller 140 may control the first display 110 to display the detailed information screen 940-4 corresponding to the fourth latest movie.

Figure 10A:
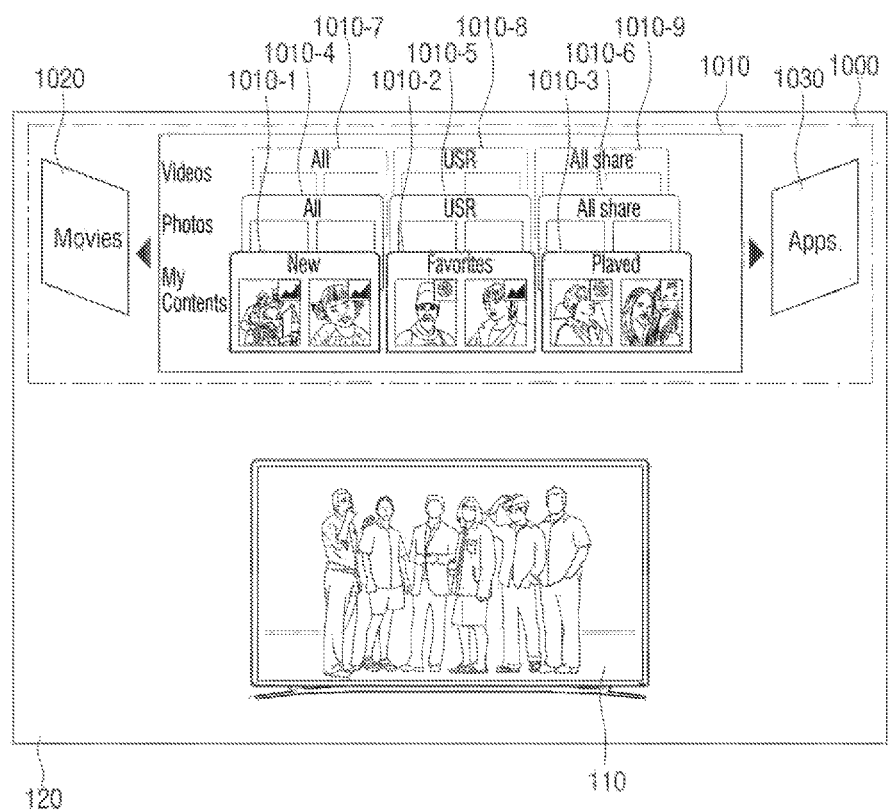
Figure 10B:
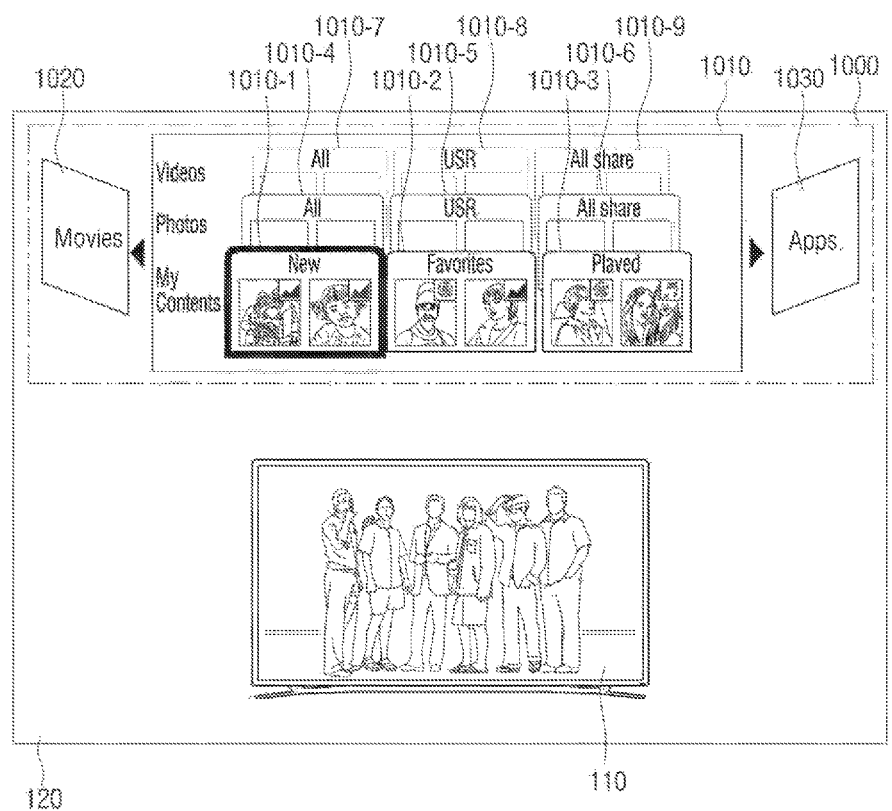

According to various embodiments of the present disclosure, as illustrated in FIGS. 10A and 10B, when a command for selecting (e.g., a command for selecting a confirm button of a remote controller) is input (e.g., in response to an input for selecting an item), while an image is displayed on the first display 110, and the content search UI 1000 is displayed on the second display 120, the controller 140 may control the second display 120 to display a highlight on the first display item 1010-1.

According to various embodiments of the present disclosure, as illustrated in FIG. 10A, in response to selection of a content type, the controller 140 may control the second display 120 to display at least one display item. For example, in response to selecting the My contents 1010 (e.g., from among the My contents 1010, the movie content 1020, and the application content 1030), the controller 140 may control the second display 120 to display items 1010-1 to 1010-9.

Figure 10C:
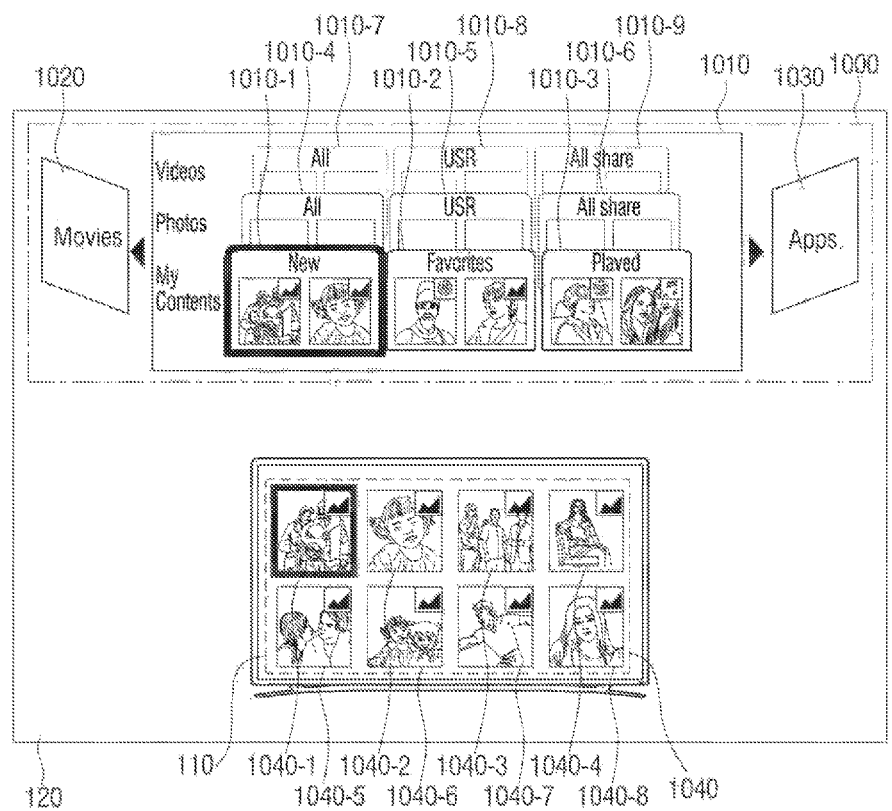

According to various embodiments of the present disclosure, as illustrated in FIGS. 10B and 10C, while the content search UI 1000 is displayed, when a command for selecting (e.g., a command for selecting a confirm button of a remote controller) is input (e.g., in response to selection of a content item), the controller 140 may control the first display 110 to display the latest content list 1040 including the latest My content corresponding to the first display item 1010-1. At this case, in the latest content list 1040, the first content item to the eighth content item (1040-1 to 1040-8) are included, and highlight may be displayed on the first content item 1040-1.

Figure 10D:
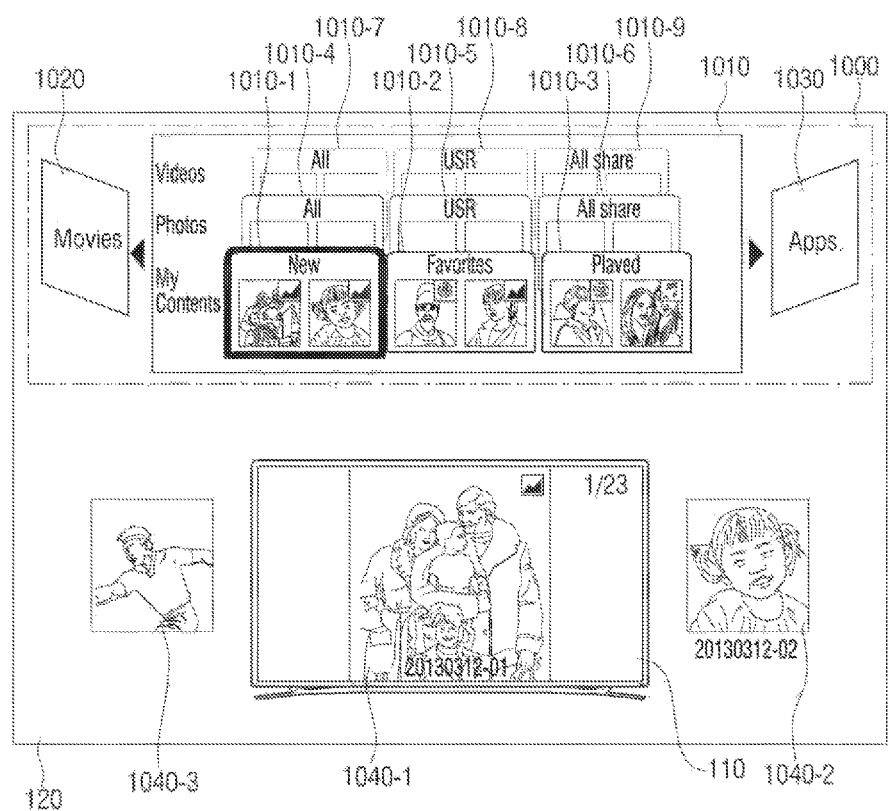

According to various embodiments of the present disclosure, as illustrated in FIGS. 10C and 10D, when a command for selecting (e.g., a command for selecting a confirm button of a remote controller) is input, while the latest content list 1040 as illustrated in FIG. 10C is displayed (e.g., in response to selection of a content item of the latest content list 1040), the controller 140 may control the first display 110 to display a screen corresponding to the selected first content item 1040-1, and control the second display 120 to display, from among non-selected content items, a screen corresponding to the 23rd content item 1040-23 at a left side of the second display 120, and display a screen corresponding to the second content item 1040-2 at a right side of the second display 120. At this time, at a lower part of a screen corresponding to the second content item 1040-2 and the $23^{rd}$ content item 1040-23, information such as title of content, time of generation, and/or the like may be displayed.

Figure 10E:
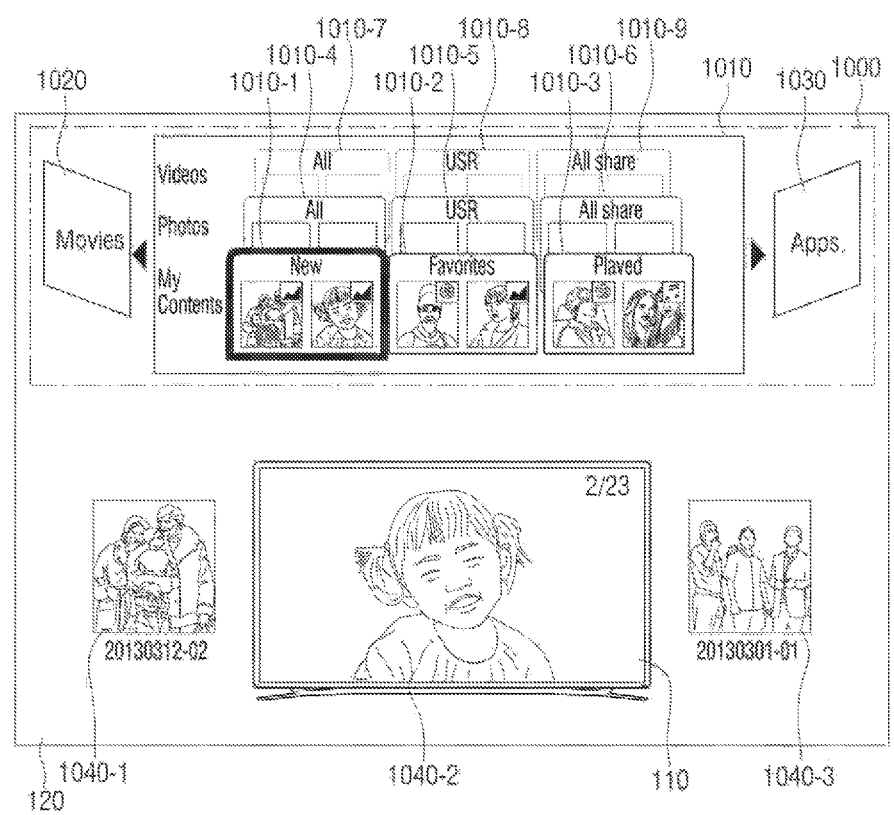

According to various embodiments of the present disclosure, as illustrated in FIGS. 10D and 10E, when a command for moving in a right direction (e.g., a command for selecting a right button of a remote controller) is input while being displayed as illustrated in FIG. 10D (e.g., in response to an input of a command for moving selection of an item in a right direction), the controller 140 may control the first display 110 to display a screen corresponding to the second content item 1040-2, and control the second display 120 to display a screen corresponding to the first content item 1040-1 at a left side of the second display 120, and display a screen corresponding to the third content item 1040-3 at a right side of the second display 120. For example, the eon roller 140, while searching content, may interlink the first display 110 and the second display 120, and display content.

According to various embodiments of the present disclosure, the controller 140, when a certain user command is input while content is displayed on the first display 110, may display a pointer on a display screen, and when a user command for moving the pointer to the second display 120 is input (e.g., in response to a command for moving the pointer to the second display 120), the controller 140 may provide a preview function which displays only an area at which the pointer is located from among to control the display apparatus 110.

Figure 11A:
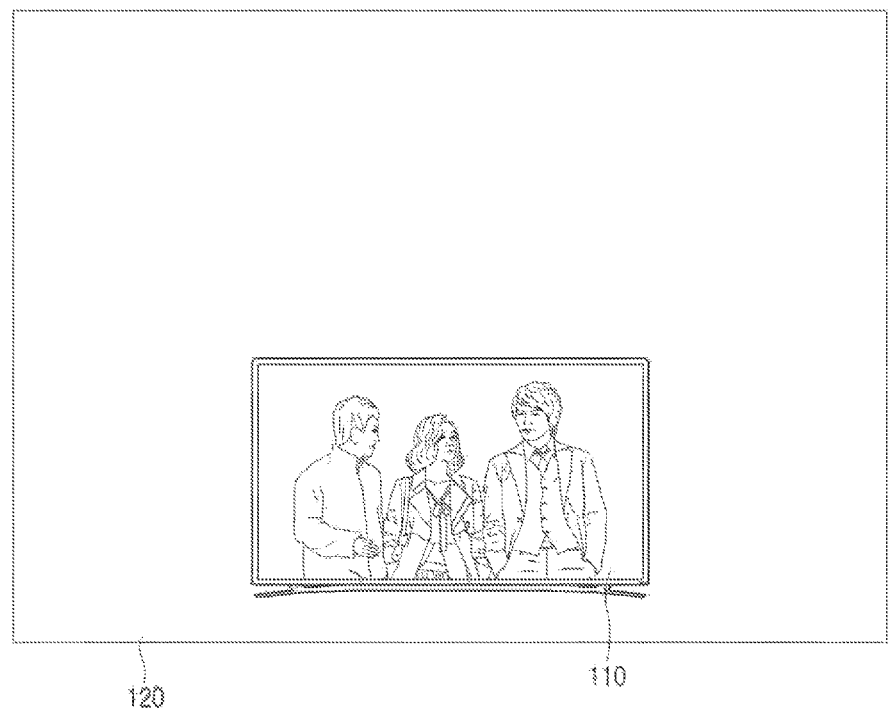
Figure 11B:
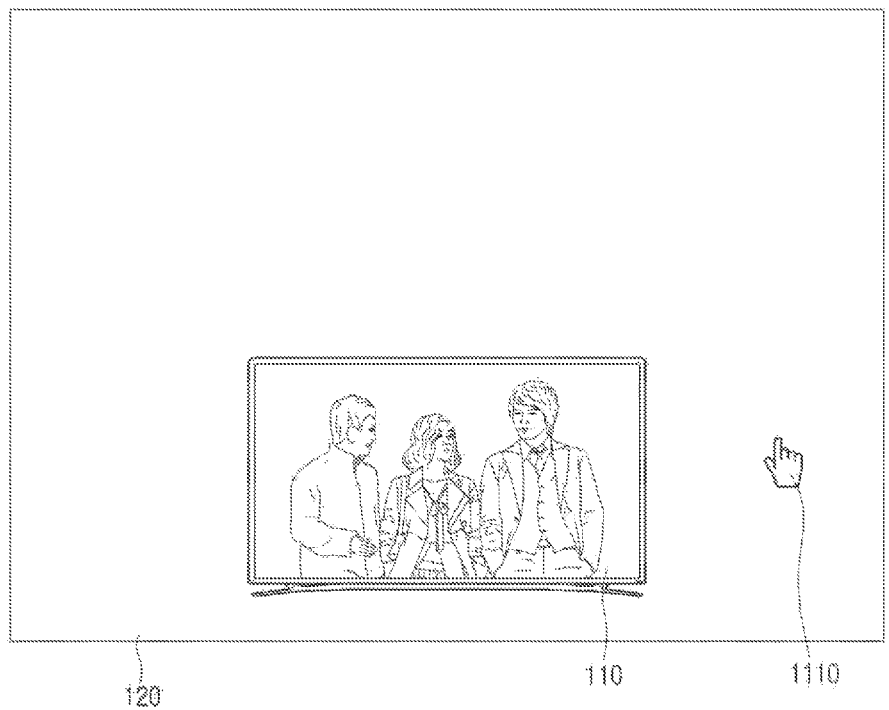

According to various embodiments of the present disclosure, as illustrated in FIGS. 11A and 11B, while an image content is displayed on the first display 110, when a user command (e.g., the hand gesture to shake the hand of a user in right and left directions) is input (e.g., in response to an input for displaying or otherwise moving a pointer), the controller 140 may control the second display 120 to display the pointer 1110. In this case, displaying the pointer 1110 on the second display 120 is merely an example and it may also be displayed at an arbitrary area among the first display 110 and the second display 120.

Figure 11C:
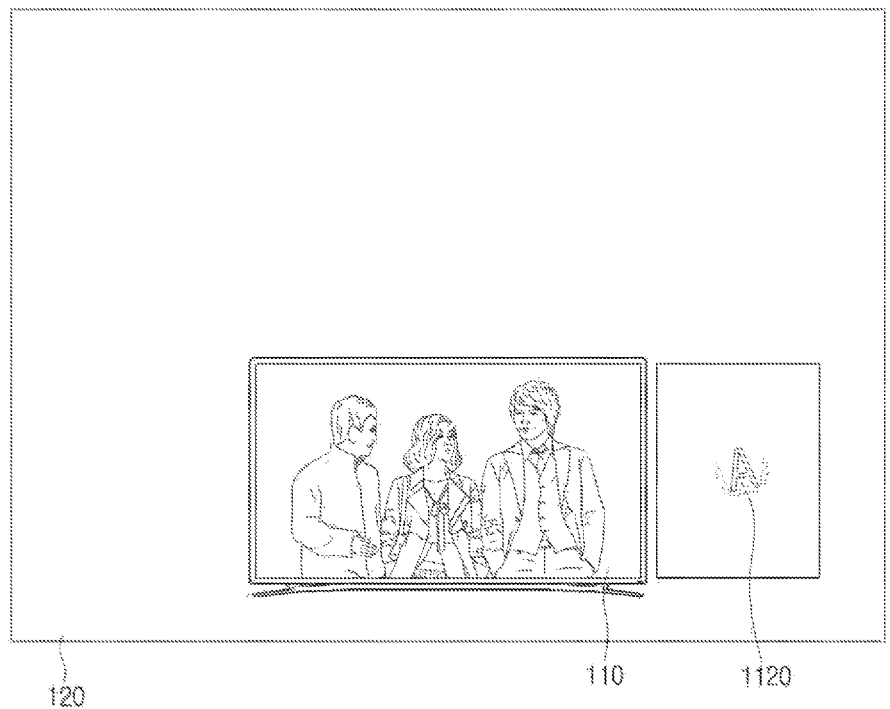

According to various embodiments of the present disclosure, as illustrated in FIGS. 11B and 11C, while the pointer 1110 is displayed on the second display 120, when a user's preset command (e.g., the hand gesture of folding the hand by a user, and/or the like) is input (e.g. in response to input of a preset command), the controller 140 may control the second display 120 to display only an area 1120 at which pointer 1110 among the channel search is located. In addition, if a user command is input while a user is folding the hand, the controller 140 may control the second display 120 to display only an area at which the pointer 1110 is located according to location of the pointer 1110.

Figure 11D:
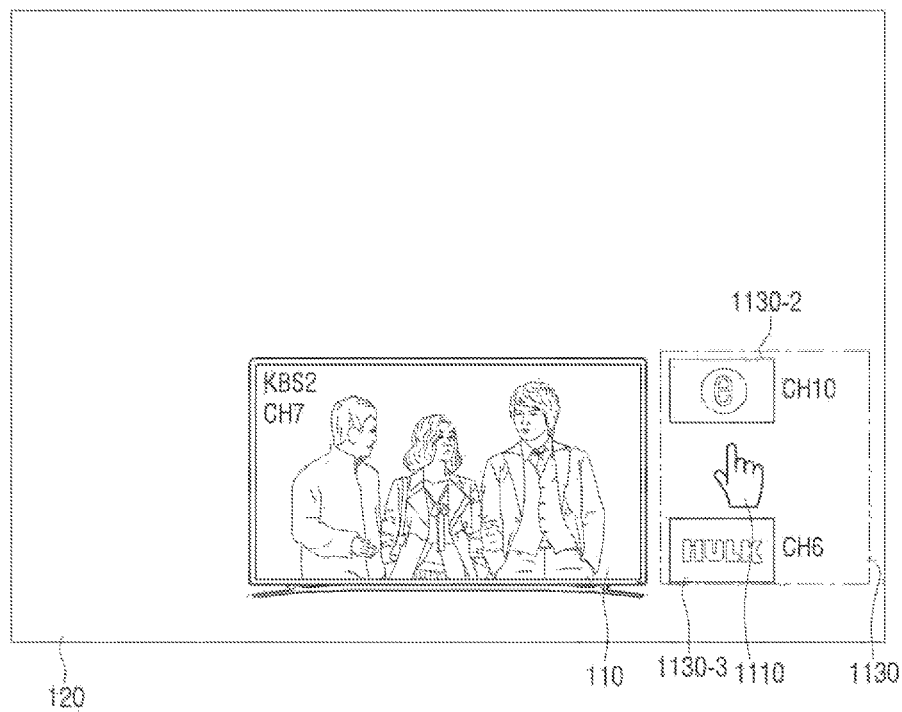
Figure 11E:
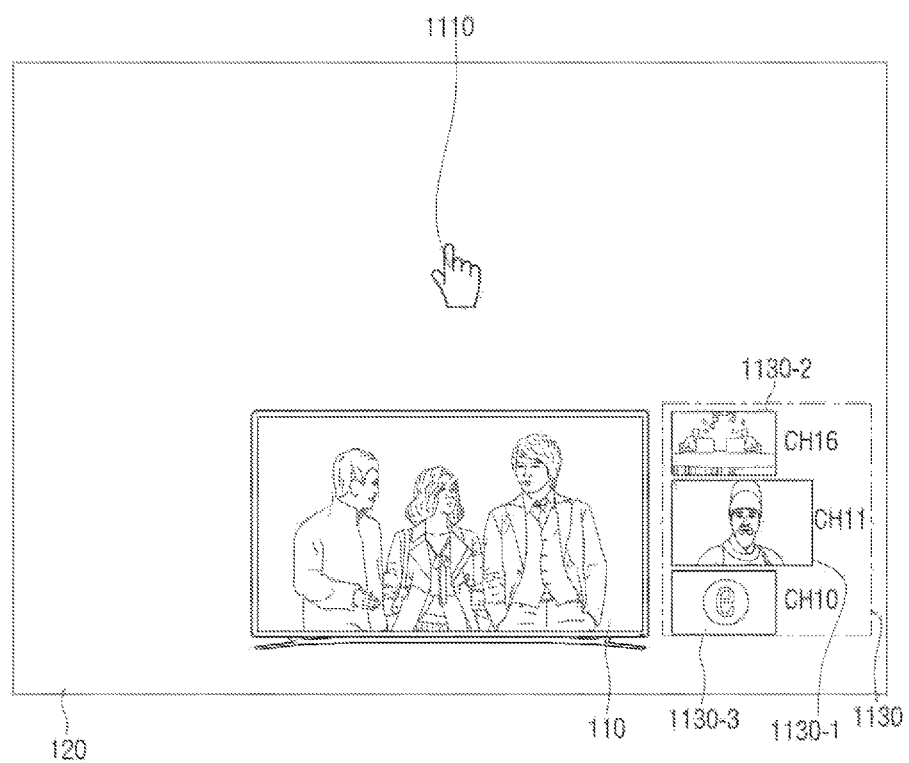

According to various embodiments of the present disclosure, as illustrated in FIGS. 11C and 11D, while an area 11120 at which the pointer 1110 is located among the second display 120 is displayed, when a command for selecting (e.g., the hand gesture of unfolding the hand and then folding the hand, and/or the like) is input (e.g., in response to selection of the area 1120), the controller 140 may control the second display 120 to display the channel search UI 1130 at a right area of the second display 120. As illustrated in FIGS. 11D and 11E, the channel search UI 1130 may include channel search (e.g., 1130-1, 1130-2 and 1130-3) corresponding to channels (that may be selected/viewed).

According to various embodiments of the present disclosure, as illustrated in FIGS. 11D and 11E, while the channel search UI 1130 is displayed, when a user command for moving the pointer 1110 to an upper area of the second display 120 is input (e.g., in response to an input for moving the pointer), the controller 140 may control the second display 120 to display the pointer 1110 at an upper area of the second display 120 according to a user command.

Figure 11F:
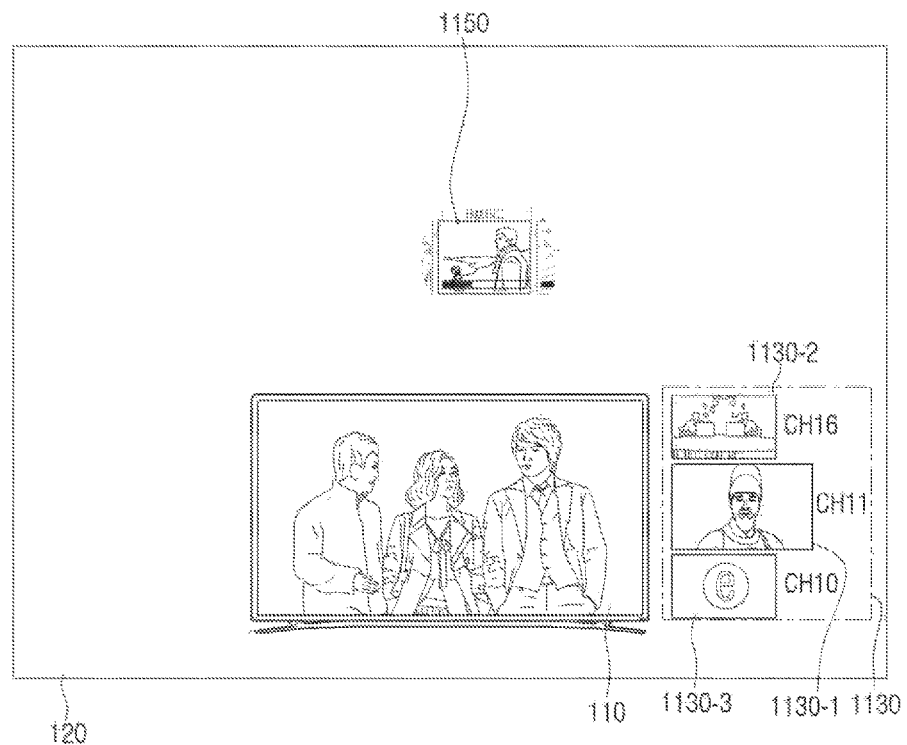

According to various embodiments of the present disclosure, as illustrated in FIGS. 11E and 11F, while the pointer 1110 is displayed at an upper area of the second display 120, when a user's preset command (e.g., the hand gesture of a user of folding the hand, and/or the like) is input (e.g., in response to input a preset command), the controller 140 control the second display 120 to display only an area 1150 at which the pointer 1110 is located from among the content search UI.

Figure 11G:
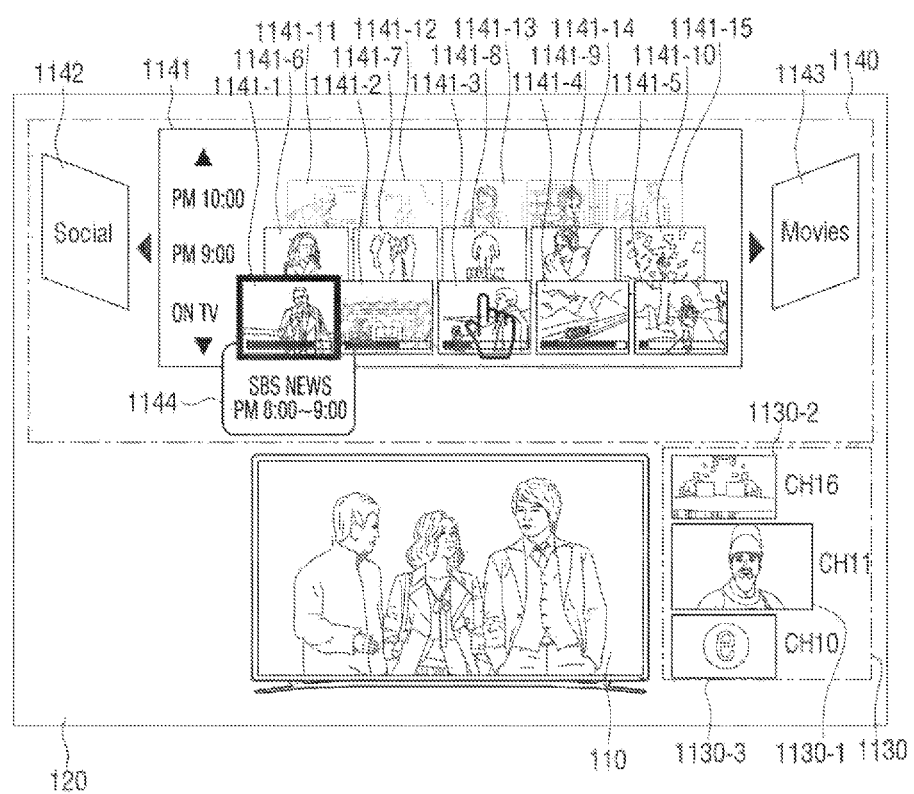

According to various embodiments of the present disclosure, as illustrated in FIGS. 11F and 11G, while an area at which the pointer 1110 is located is displayed from among an upper area of the second display 120, when a command for selecting (e.g., the hand gesture of a user of unfolding the hand and then folding the hand, and/or the like) is input (e.g., in response to an input of a preset command), the controller 140 may control the second display 120 to display the content search UI 1140 at an upper area of the second display 120.

According to various embodiments of the present disclosure, as illustrated in FIG. 11G, the controller 140 may control the second display 120 to display at least one display item in the content search UI 1140. For example, in response to selecting the broadcast content 1141 (e.g., from among the broadcast content 1141, the SNS content 1142, and the movie content 1143), the controller 140 may control the second display 120 to display items 1141-1 to 1141-15. The controller 140 may control the second display 120 to display information item 1144 corresponding to broadcast item 114-1 that is highlighted or otherwise selected.

Figure 12A:
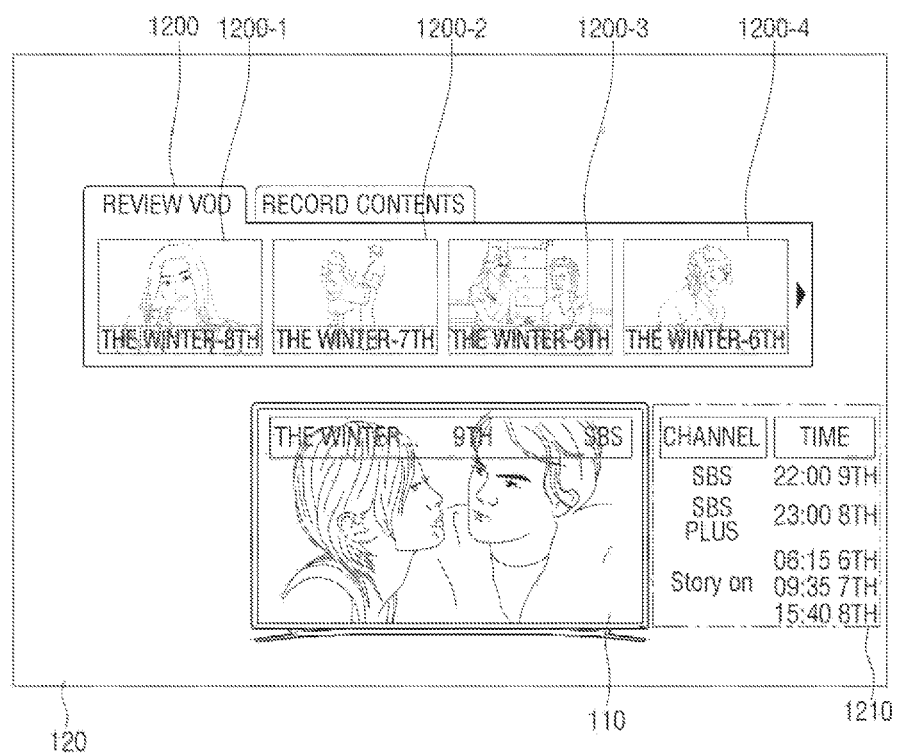

According to various embodiments of the present disclosure, while an image content is displayed on the first display 110, when a preset user command is input (e.g., in response to input of a preset user command), the controller 140 may control the second display 120 to display an image content (e.g., an image content of the previous episode, and/or the like) related to an image content displayed on the first display 110. For example, as illustrated in FIG. 12A, while the 9$^{th}$ episode of an image content of "The Winter" is displayed on the first display 110, when a user's preset command (e.g., a command for selecting a review button in a remote controller, and/or the like) is input (e.g., in response to an input for selecting a review), the controller 140 may control the second display 120 to display the content search UI 1200 including the previous episode of an image content (1200-1 to 1200-4) of "The Winter" which is displayed at an upper area of the second display 120, and display broadcasting information 1210 from which a user may watch an image content related to "The Winter" which is displayed at a right area of the second display.

Figure 12B:
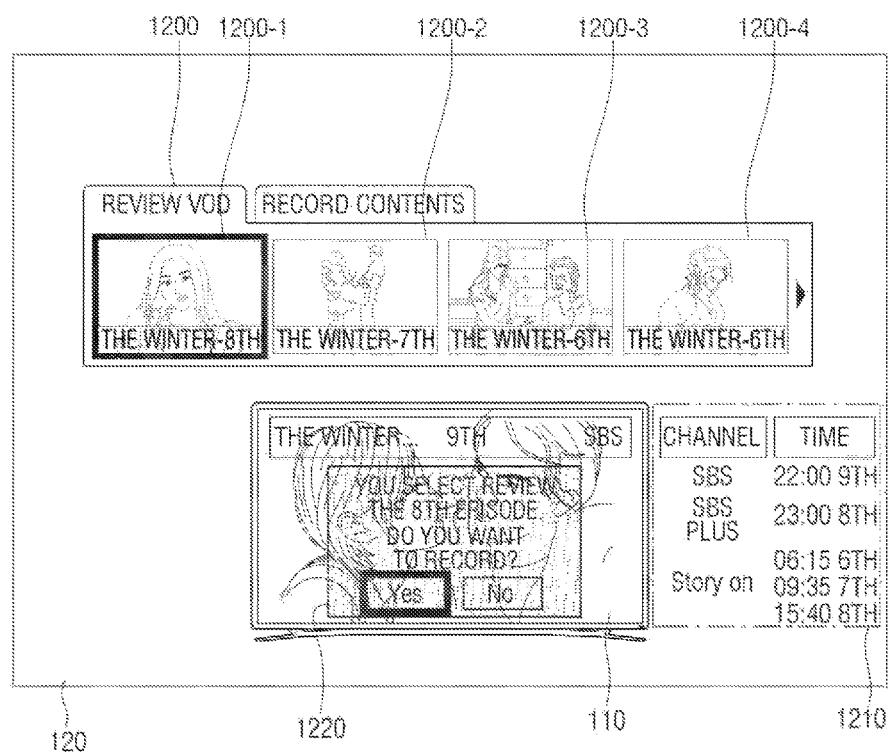

According to various embodiments of the present disclosure, as illustrated in FIG. 12B, while highlight is displayed on the first previous episode of an image content 1200-1, when a command for selecting (e.g., a command for selecting a confirm button of a remote controller, and/or the like) is input (e.g., in response to an input for recording content), the controller 140 may control the first display 110 to display an inquiry message 1220 to ask whether to record an image content which is being displayed. In addition, when a user command is input through the inquiry message 1220 (e.g., in response to a user input in response to the query of whether to record the content), the controller 140 may control the first display 110 to display content (e.g., the controller 140 may control the first display 11 to display the selected first previous episode of the image content 1200-1). Meanwhile, in the above-specified embodiment of the present disclosure, it has been described that a UI which may search an image content that is related to an image content which is being displayed, but this is merely an example and thus an embodiment of a UI which may search content recorded by a user also may be included in the technical features of the present disclosure.

Figure 13A:
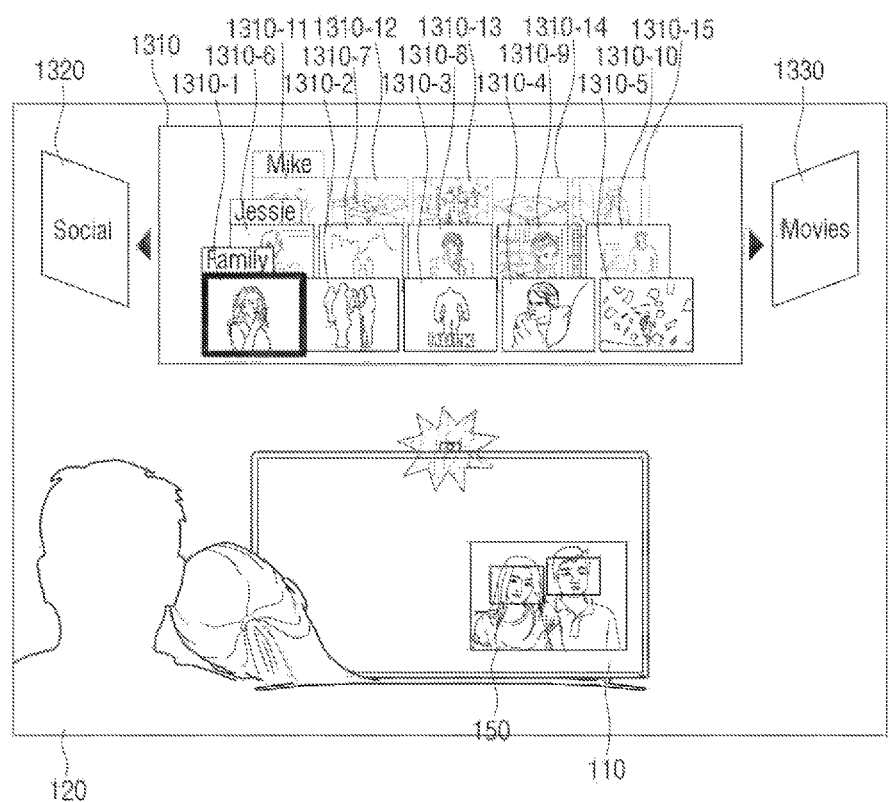

According to various embodiments of the present disclosure, the controller 140 may control the first display 120 to provide the content search UI corresponding to a user by recognizing a user. For example, as illustrated in FIG. 13A, when the first user (Jessie) and the second user (Mike) are recognized by a camera (e.g., in response to the controller 140 recognizing specific users that are using or are otherwise in proximity to the display apparatus 100), the controller 140, as illustrated in FIG. 13, may control the second display 120 to divide and display items corresponding to entire family (1319-1 to 1310-5), the display items corresponding to the first user (1310-6 to 1310-10), and the display items corresponding to the second user (1310-11 to 1310-15). For example, as illustrated in FIG. 13A, the controller 140 may control the second display 120 to display at least one display item in the content search UI associated with content 1310. For example, in response to recognizing a user, the controller 140 may select user content 1310 (e.g., from among the user content 1310, the SNS content 1320, and the movies content 1330).

Figure 13B:
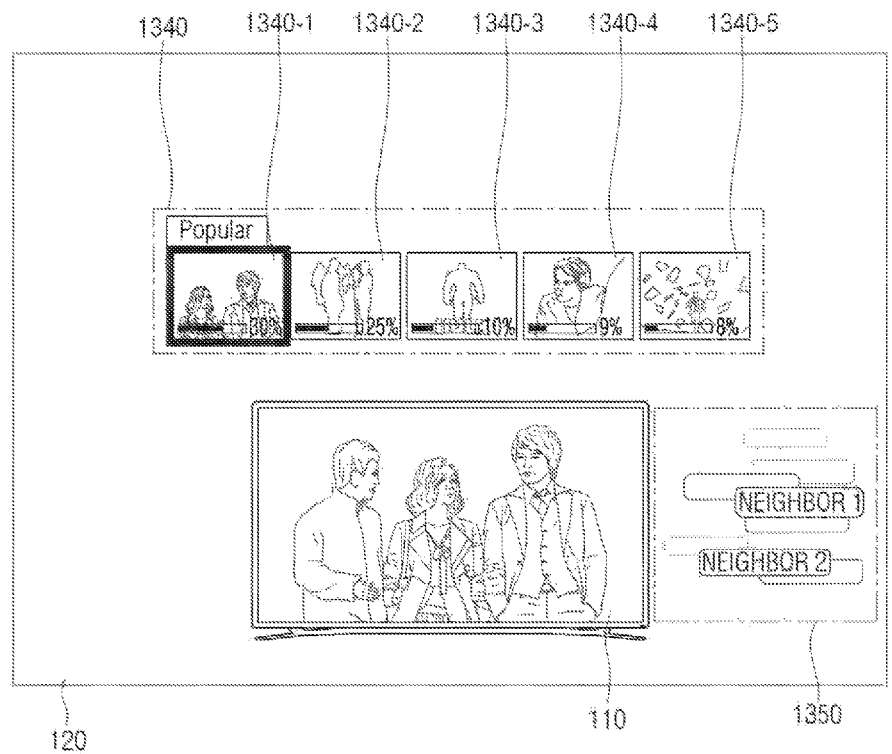

According to various embodiments of the present disclosure, the controller 140 may control the second display 120 to display a recommendation list which lists up a broadcasting content of the same time slot in an order of high watching ratio. For example, as illustrated in FIG. 13B, the controller 140 may control the second display 120 to display the recommendation list 1340 which lists up a broadcasting content (e.g., content items 1340-1 to 1340-5) of the same time slot in an order of high watching ratio an upper area of the second display 120. The controller 140 may also control the second display 120 to display a UI 1350 including a relevant keyword on the selected first broadcasting content 13401 at a right area of the second display 120.

Figure 13C:
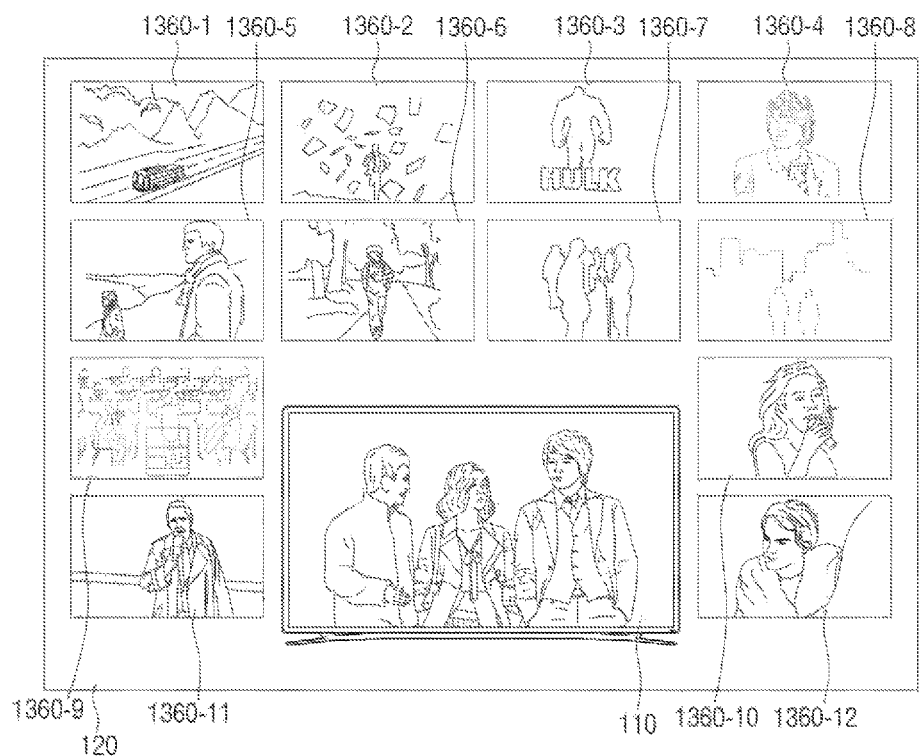

According to various embodiments of the present disclosure, as illustrated in FIG. 13C, the controller 140 may control the second display 120 to display a plurality of display items (1360-1 to 1360-12) corresponding to a channel which is broadcasted on the overall area of the second display 120.

As described above, by displaying the content search UI by the display apparatus 100 through the second display 120, a user may search a new content without obstruction to watching an image content (e.g., an image, a video, and/or the like) a user watches through the first display 110.

According to various embodiments of the present disclosure, while content is displayed on the first display 110, when a user command is input through the input unit 130 (e.g., in response to an input for changing a setting), the controller 140 may control the second display 120 to display a UI for changing setting to change setting of the display apparatus 100.

Figure 14A:
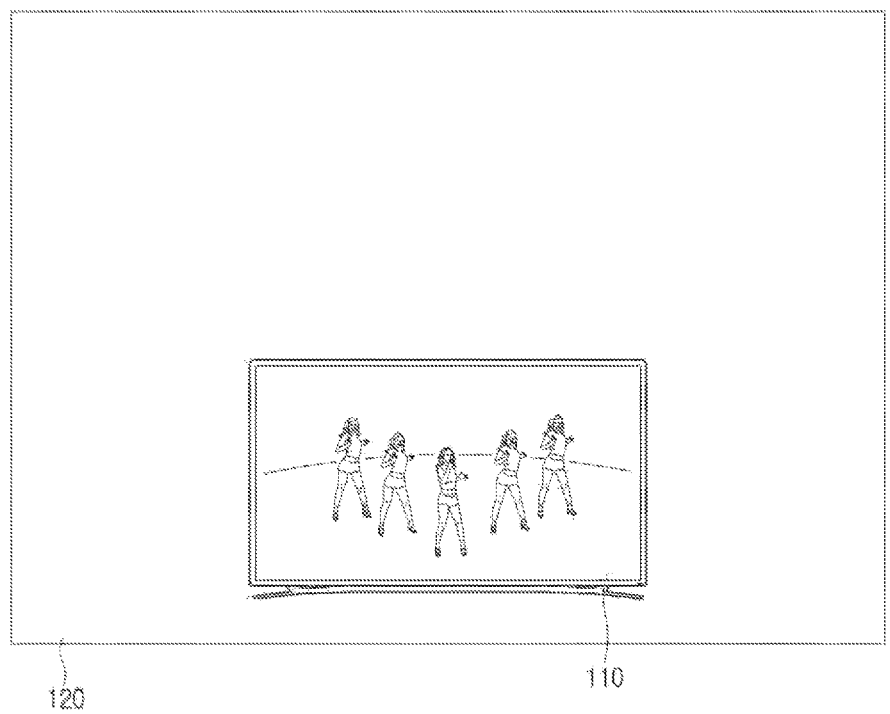
Figure 14B:
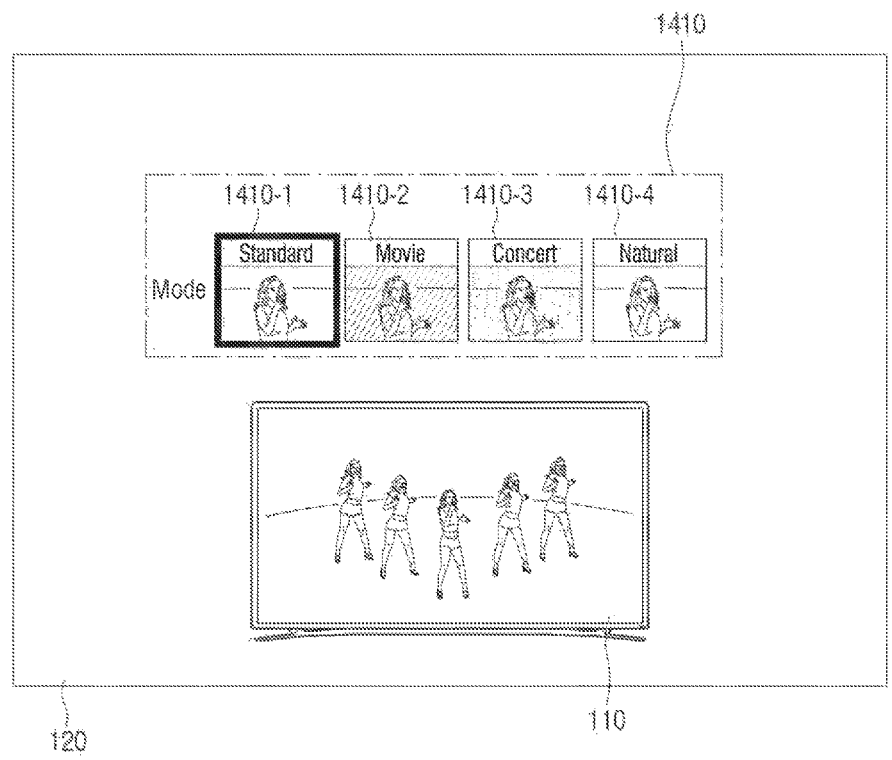

According to various embodiments of the present disclosure, as illustrated in FIGS. 14A and 14B, while an image content is displayed on the first display 110, when a command for changing an image setting is input (e.g., in response to an input for changing a setting), the controller 140 may control the second display 120 to display a UI for changing an image setting including the display items (1410-1 to 1410-4) corresponding to a plurality of image modes at an upper part of the second display 120.

According to various embodiments of the present disclosure, as illustrated in FIG. 14B, if an image mode of the display apparatus 100 is a standard mode, the controller 140 may control the second display 120 to display highlight on the display item 1410-1 corresponding to a standard mode.

Figure 14C:
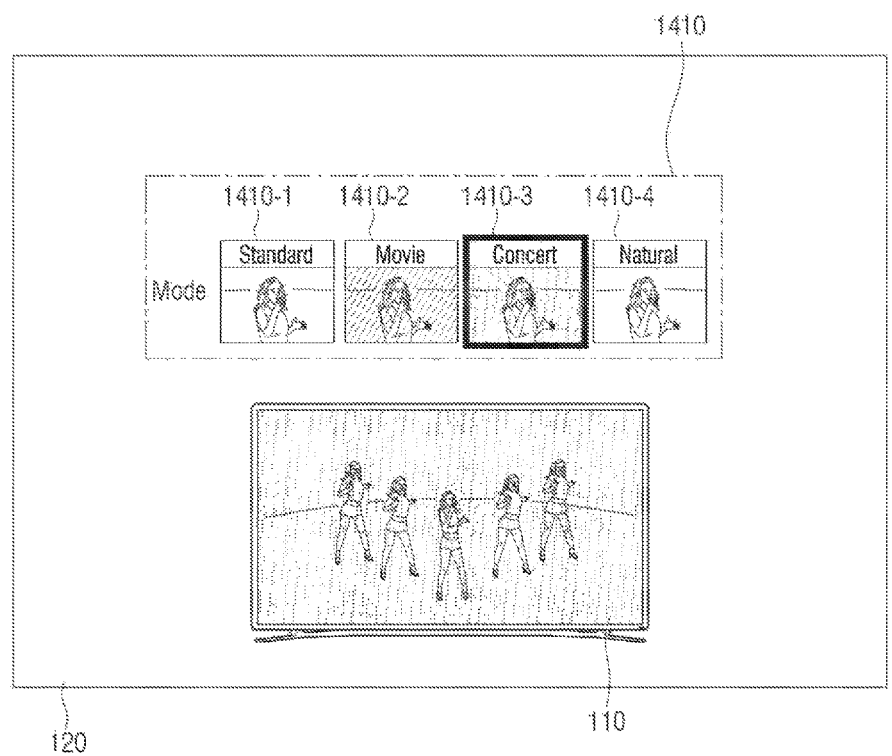

According to various embodiments of the present disclosure, as illustrated in FIGS. 14B and 14C, while the UI for changing setting of an image 1410 is displayed, when a command for moving in a right direction for two times is input (e.g., in response to an input for selecting a different display item), the controller 140 may control the second display 120 to display highlight on the display item corresponding to a concert mode 1410-3, and control the first display 110 to proceed with and display the image content being displayed as a concert mode.

According to various embodiments of the present disclosure, as illustrated in FIG. 14C, while a UI for setting an image mode 1410 is displayed, when a command for selecting is input (e.g., in response to an input for selecting a different display item), the controller 140 may control the first display 110 to display an image content processed as a concert mode, and control the second display 120 to remove a UI for setting an image mode displayed on the second display 120.

Figure 15A:
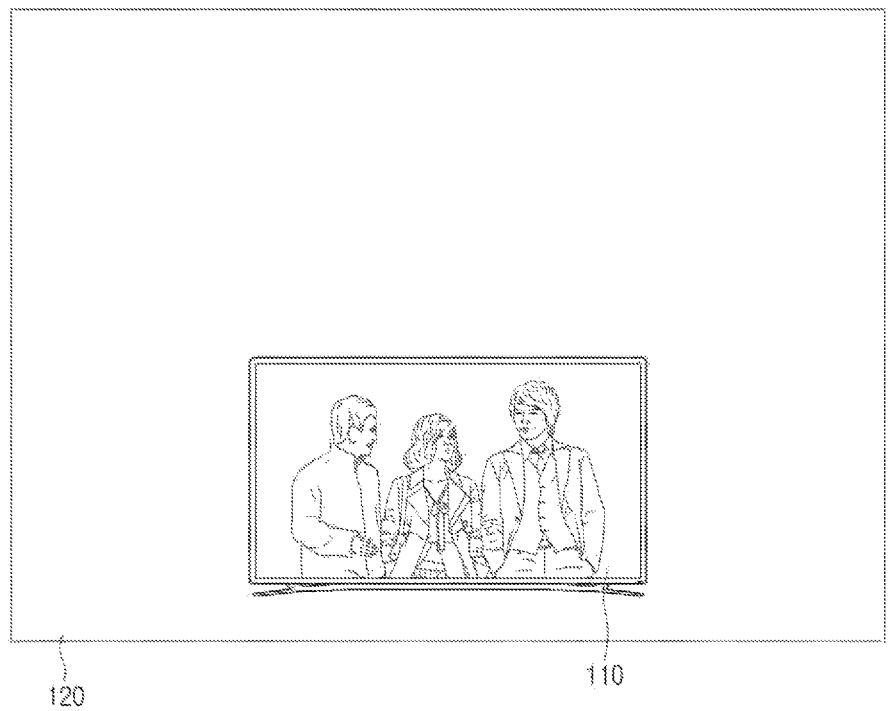
Figure 15B:
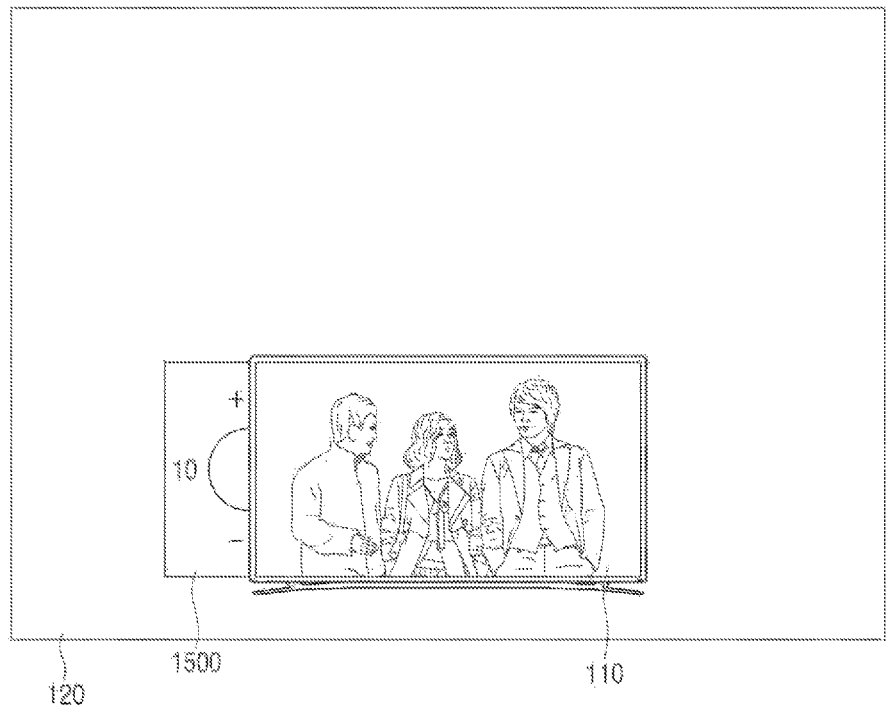

According to various embodiments of the present disclosure, as illustrated in FIGS. 15A and 15B, while an image content is displayed, when a command for adjusting volume is input (e.g., in response to an input for adjusting a volume), the controller 140 may control the second display 120 to display the UI for adjusting volume 1500 at a left area of the second display 120.

Figure 16A:
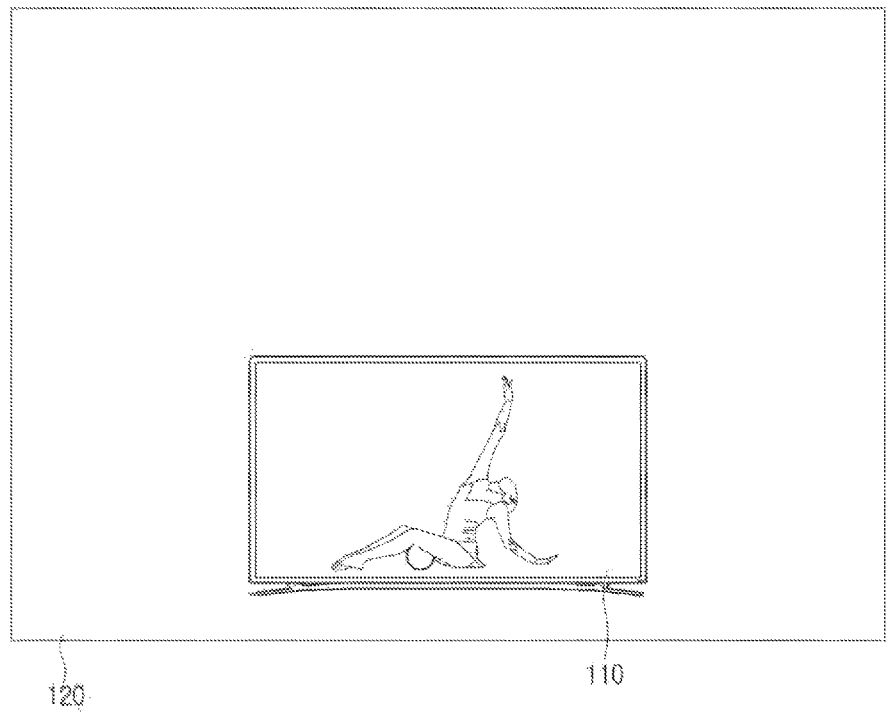
Figure 16B:
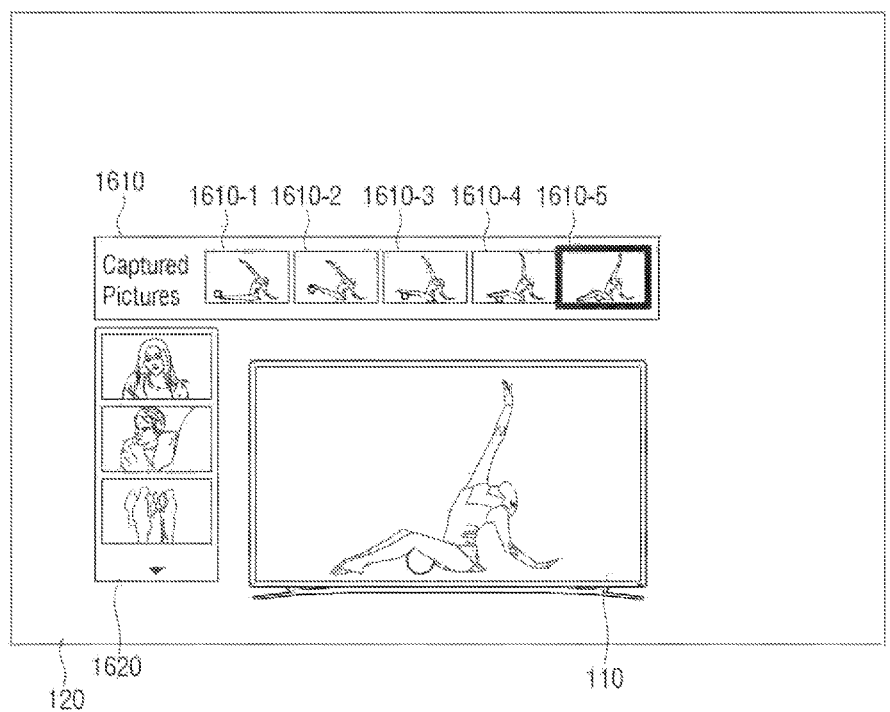

According to various embodiments of the present disclosure, as illustrated in FIGS. 16A and 16B, while an image content is displayed, when a command for capturing is input (e.g., in response to an input for image capture), the controller 140 may control the second display 120 to display a capture screen UI 1610 which includes a plurality of capture images (1610-1 to 1610-5) stored in a buffer (not illustrated) in a preset interval from preset time before a command for capturing is input at an upper area of the second display 120, and display an image storing list 1620 including the previously-stored capture image at a left area of the second display 120.

Figure 16C:
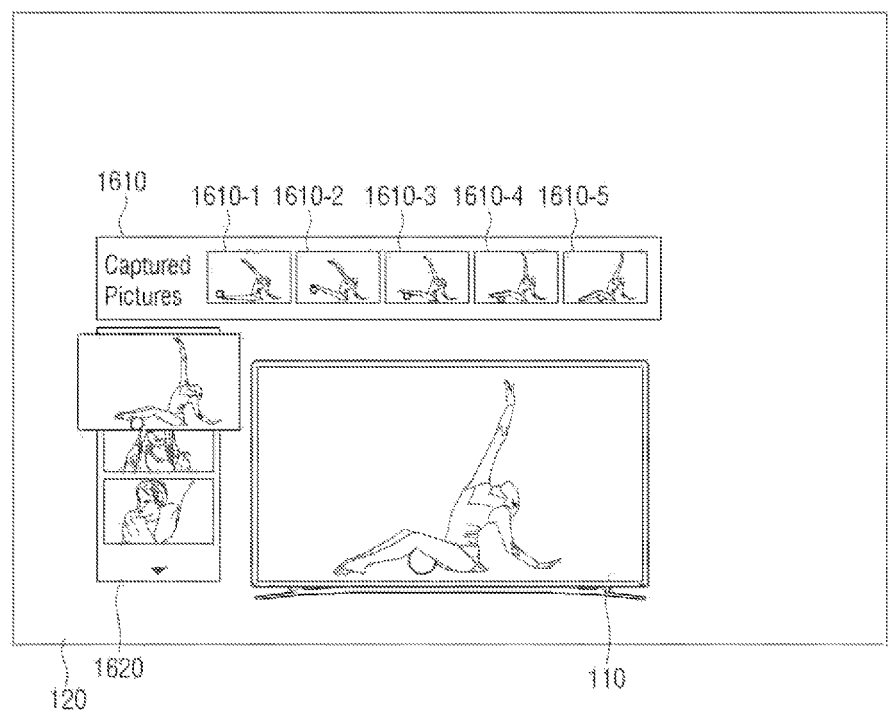

According to various embodiments of the present disclosure, as illustrated in FIGS. 16B and 16C, while highlight is displayed on the fifth capture image 1610-5, when a command for selecting is input (e.g., in response to an input for selecting an image), the controller 140 may control the storage 180 to store the fifth capture image 1610-5 at the capture image list 1620 and may control the second display 120 to display the fifth capture image 1610-5 which is displayed on the capture screen UI 1610 in the image storage list 1620. Accordingly, a user may confirm a capture image previously stored through the capture image storage list 1620 as a big image through the first display 110.

Figure 17A:
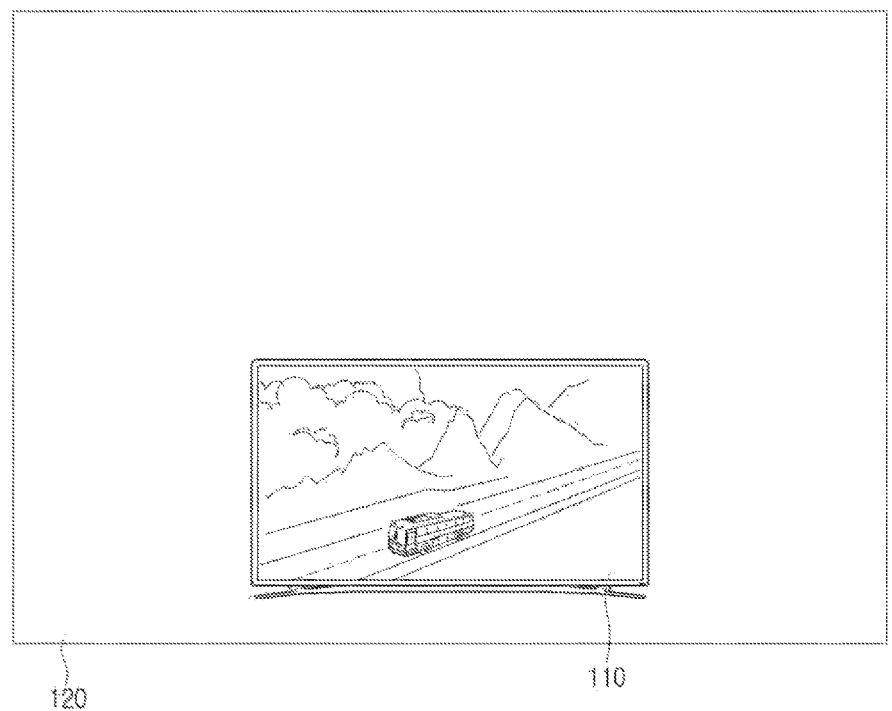
Figure 17B:
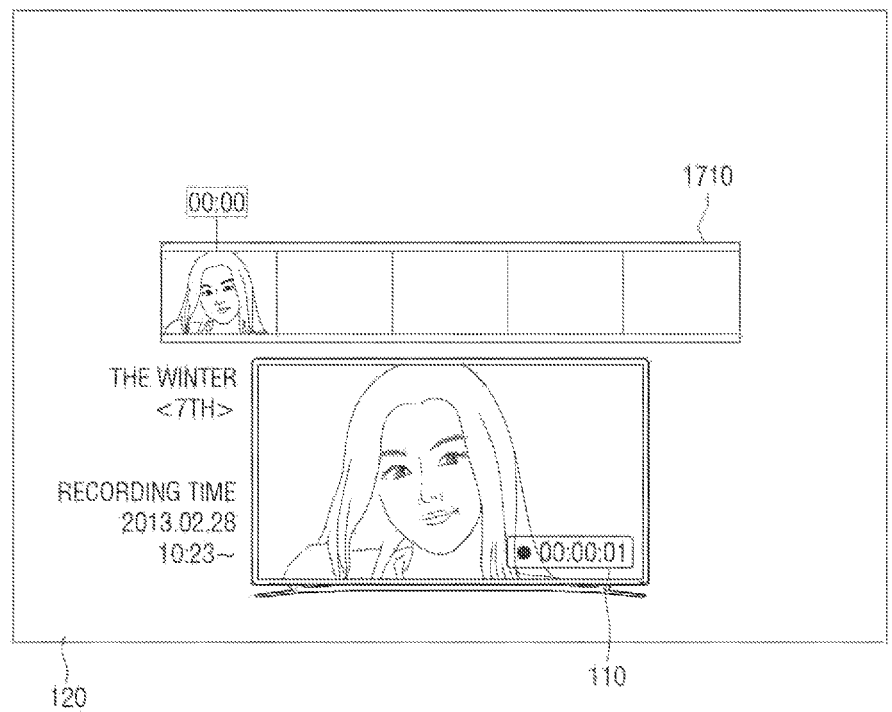
Figure 17C:
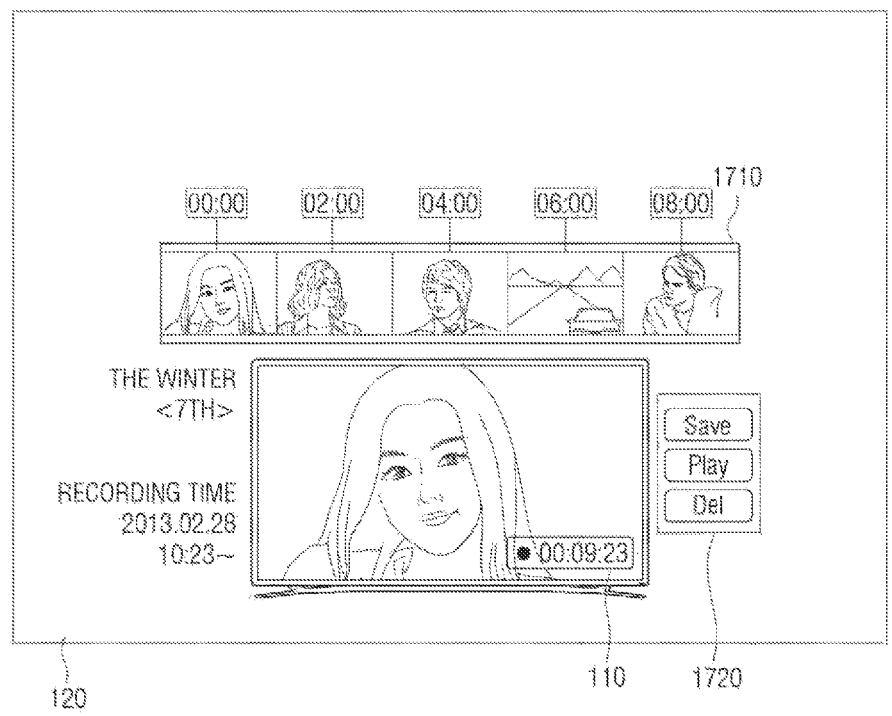

According to various embodiments of the present disclosure, as illustrated in FIGS. 17A and 17B, while an image content is displayed on the first display 110, when a user departs from the original place to watch the display apparatus 100, and thus the detector 105 cannot detect a user (e.g., in response to detecting that a user is no longer using the display apparatus 100 or in proximity to the display apparatus 100, or otherwise detecting that the user has exited an environment near the display apparatus 100), the controller 140 may control the second display 120 to start automatic recording, and display a UI for automatic recording 1710. The controller 140 may automatically record an image content before detecting a user through the detector 105.

When a user returns to the place to watch the display apparatus 100, and the detector 105 may detect a user (e.g., in response to detecting the user, detecting that the user is using the display apparatus 100, or otherwise detecting that the user has entered or re-entered an environment near the display apparatus 100), the controller 140 may control the second display 120 to display the UI for automatic recording 1710 including a thumbnail image with a preset interval at an upper area of the second display 120, display the UI for setting for storing, reproducing, and deleting the recorded image 1720 at a right area of the second display 120, and display information of the recorded image at a left area of the second display 10. While highlight is displayed on one of a plurality of thumbnails, when a storage icon is selected (e.g., in response to an input for storing the recorded image), the controller 140 may store an image from the timing of following the selected thumbnail image on the storage 180 and suspend automatic recording (or the controller 140 may continue recording the associated content until the user stops recording or until a content is complete). In addition, while highlight is displayed on one of the plurality of thumbnails, when a reproducing icon is selected (e.g., in response to an input for reproducing the recorded image), the controller 140 may control the first display 110 to reproduce the recorded image from the selected image. In addition, when a deleting icon is selected (e.g., in response to an input for deleting the recorded image), the controller 140 may delete an image content automatically recorded.

Figure 18A:
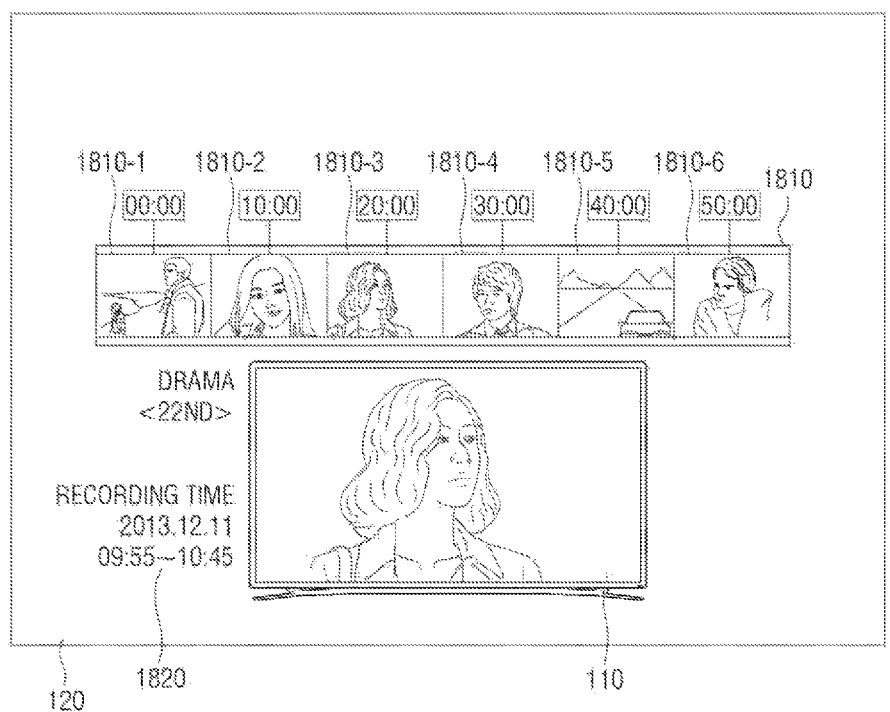

According to various embodiments of the present disclosure, the controller 140 may control the first display 110 to reproduce a recorded content according to a user command. For example, as illustrated in FIG. 18A, the controller 140 may control the second display 120 to display a UI for recorded image 1810 including a plurality of thumbnail images (1810-1 to 1810-6) with a preset interval at an upper area of the second display 120, and display information on the recorded image content 1820 at a left area of the second display 120. In this case, a user may detect a recorded image content by using the UI for recorded image 1810.

Figure 18B:
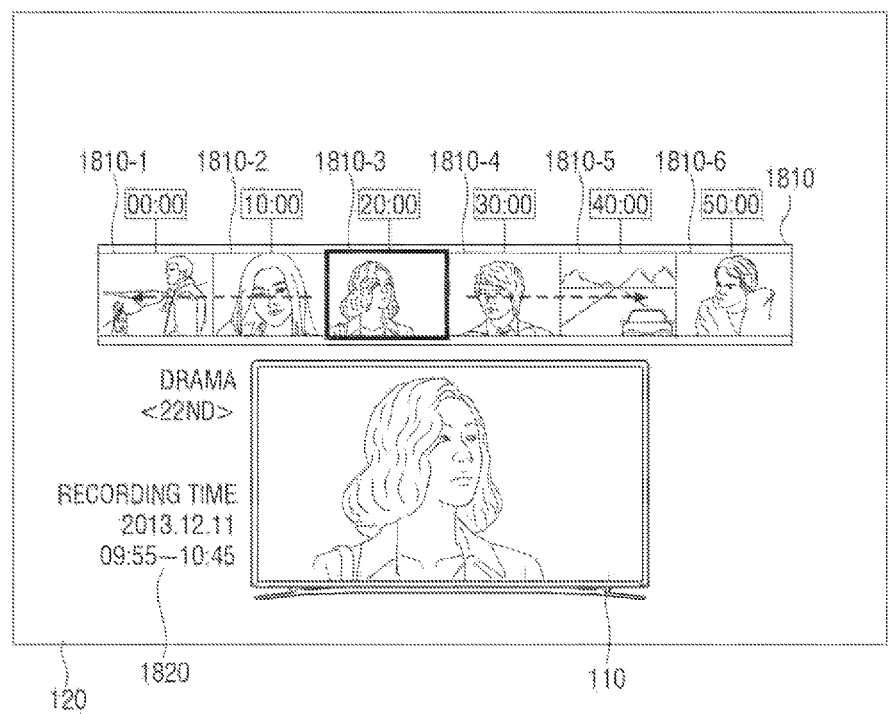
Figure 18C:
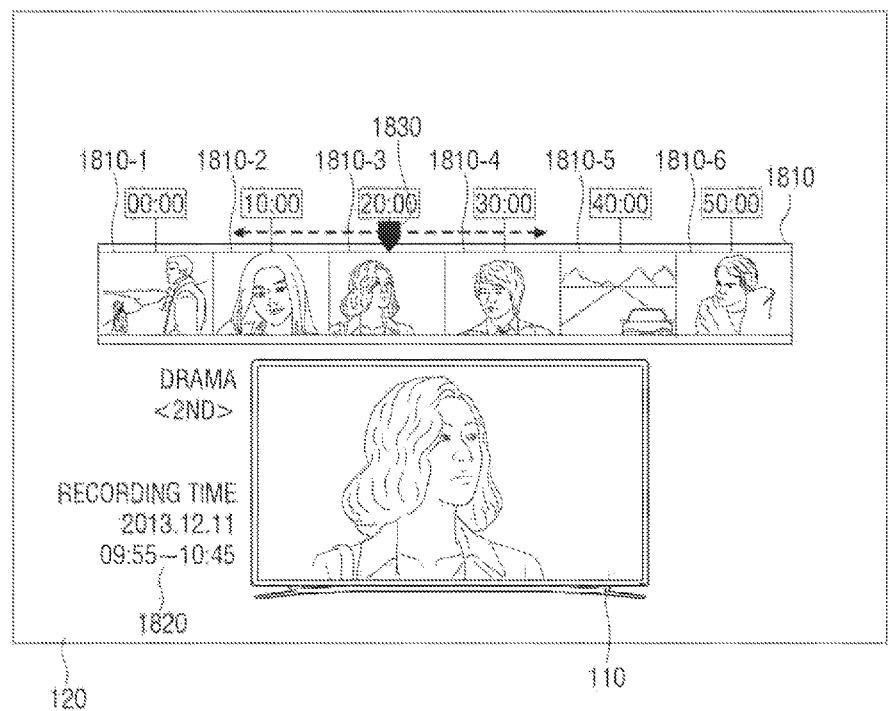

According to various embodiments of the present disclosure, as illustrated in FIG. 18B, the controller 140 may control the first display 110 to display the recorded image content from the selected thumbnail image by using highlight. For example, thumbnail image 1810-3 corresponding to the content being reproduced on the first display 110 may be highlighted. According to various embodiments of the present disclosure, as illustrated in FIG. 18C, the controller 140 may control the first display 110 to display the recorded image content from the selected timing by using a progress bar 1830.

By the afore-described display apparatus 100, a user while keeping watching content which the user was watching, may perform various functions (e.g., searching of content, changing setting, and/or the like) of the display apparatus 100 through the second display 120.

Figure 19:
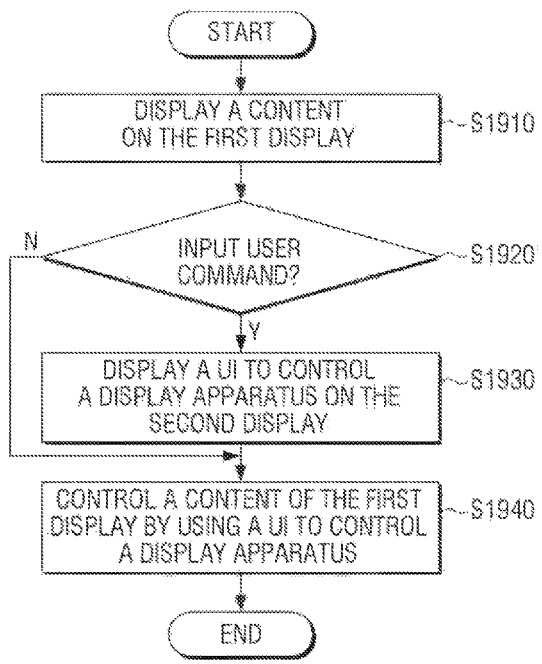
FIG. 19 is a flow chart to explain a method for controlling a display apparatus according to an embodiment of the present disclosure.

FIG. 19 is a flow chart to explain a method for controlling a display apparatus according to an embodiment of the present disclosure. Hereinbelow, a method for controlling the display apparatus 100 will be explained with reference to FIG. 19.

Referring to FIG. 19, at operation S1910, the display apparatus 100 displays content on the first display 110. At this time, the first display 110 may be a general stand type display apparatus such as LCD, OLED, PDP, and/or the like.

At operation S1920, the display apparatus 100 determines whether a user command is input. As an example, the user command may be a user command to generate a UI to control the display apparatus 100.

If the display apparatus 100 determines that a user command is not input at operation S1920, then the display apparatus may proceed to operation S1940. Alternatively, the display apparatus may poll at operation S1920 for detection of an input command.

In contrast, if the display apparatus determines that a user command is input at operation S1920, then the display apparatus may proceed to operation S1930 at which the display apparatus 100 displays a UI to control the display apparatus 100 on the second display 120. At this time, the second display 120 displays an image at an outer area of the first display 110, and may be a display apparatus with projection type such as a projector display. The UI for controlling the display apparatus 100 may be a UI for searching content or a UI for changing setting, but this is merely an example, and other UIs as well may be applied to the technical idea of the present disclosure.

At operation S1940, the display apparatus 100 controls content of the first display 110 according to a user command input through a UI to control the display apparatus 100. For example, the display apparatus 100 may change content of the first display 100 to another content by using the content search UI.

In addition, the display apparatus 100 may change setting of content of the first display 110 by using the UI for changing setting.

FIGS. 20A, 20B, 20C, 20D, 20E, and 20F are views to explain various embodiments of a projector display according to various embodiments of the present disclosure. For example, FIGS. 20A-20F are views according to various embodiments to explain location of a projector apparatus which realizes the second display 120.

Figure 20A:
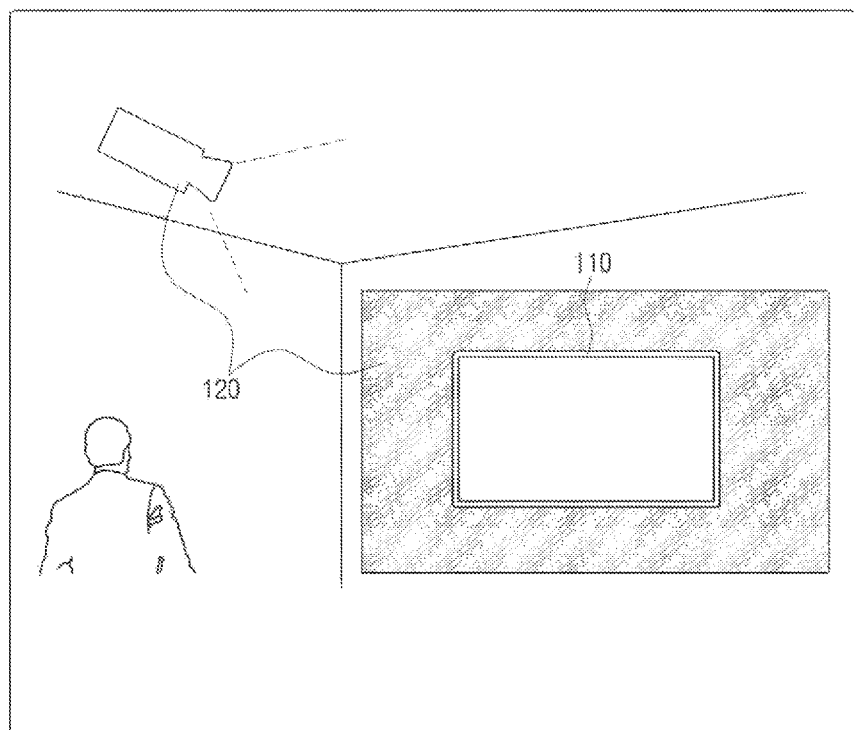
FIGS. 20A, 20B, 20C, 20D, 20E, and 20F are views to explain various embodiments of a projector display according to various embodiments of the present disclosure.

Referring to FIG. 20A, the projector apparatus 120 may be located at ceiling which is distant from the first display 110. For example, the projector apparatus 120 may be positioned on a ceiling that is at a relatively long distance from the first display 110. The projector apparatus 120 may be positioned on a ceiling of a same room in which the first display 110 is installed.

Figure 20B:
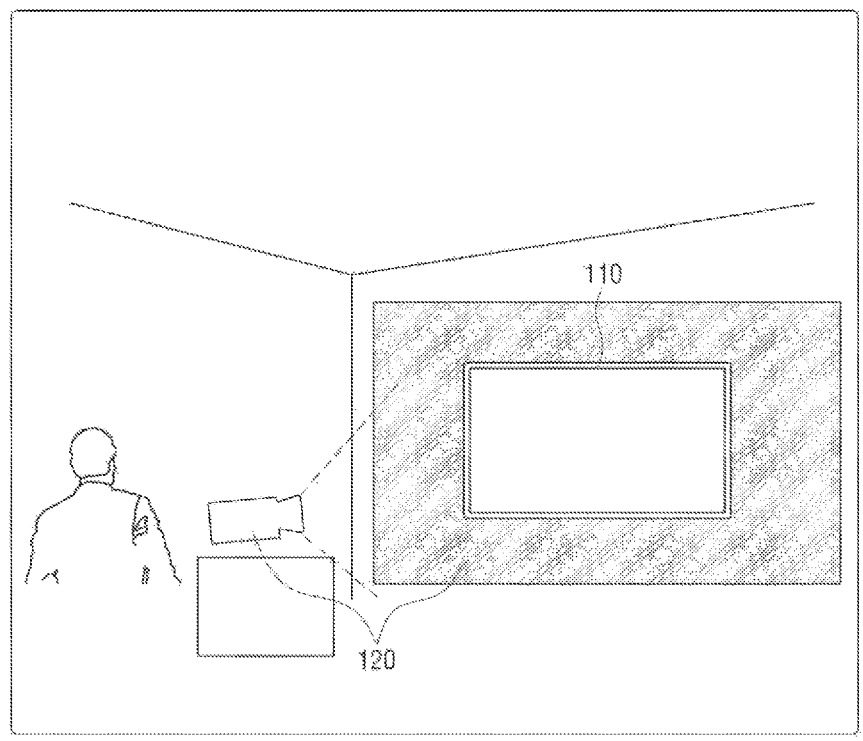

Referring to FIG. 20B, the projector apparatus 120 may be located on a table which is distant from the first display 110. For example, the projector apparatus 120 may be positioned on a table that is at a relatively long distance from the first display 110. The projector apparatus may be positioned on a table in a same room in which the first display 110 is installed.

Figure 20C:
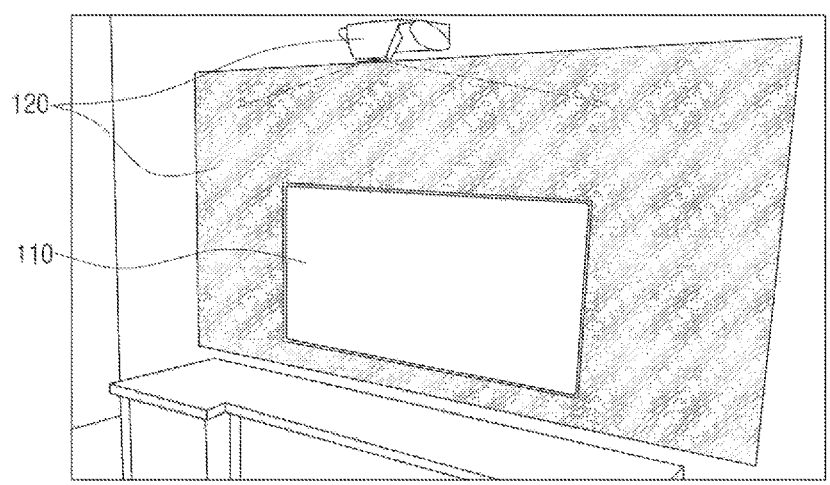

Referring to FIG. 20C, the projector apparatus 120 may be located at a wall which is near the first display 110. For example, the projector apparatus 120 may be positioned on a wall at a relatively short distance from the first display 110. The projector apparatus 120 may be positioned on a wall in a same room in which the first display 110 is installed. The projector apparatus 120 may be positioned on the same wall on which the first display 110 is installed.

Figure 20D:
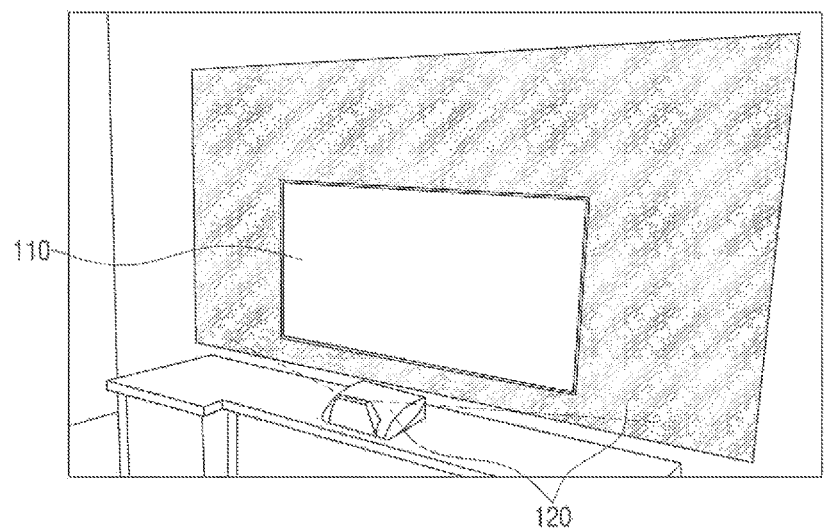

Referring to FIG. 20D, the projector apparatus may be located on a short distance table of the first display 110. For example, the projector apparatus 120 may be positioned on a table that is at a relatively short distance from the first display 110. The projector apparatus 120 may be positioned on a table in a same room in which the first display 110 is installed.

Figure 20E:
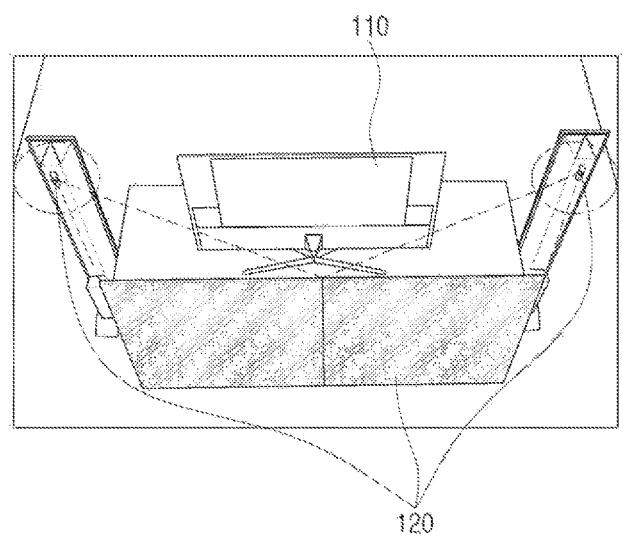

Referring to FIG. 20E, the projector apparatus may be located at an accessory (e.g., a speaker, and/or the like) of the display apparatus 100.

Figure 20F:
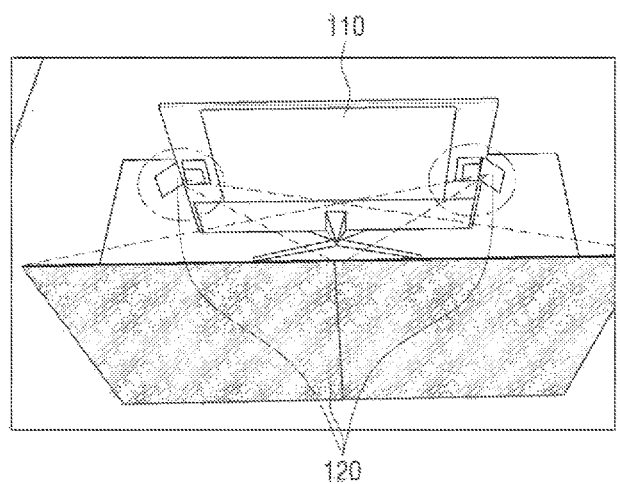

Referring to FIG. 20F, the projector apparatus may be attached on a back part of the display apparatus 100. Meanwhile, the projector apparatus in the above-described embodiment may be connected to the display apparatus 100 with or without a wire, and may be controlled by the controller 140 of the display apparatus 100.

Meanwhile, in the above-described embodiments of the present disclosure, it is explained that the second display 120 is a projector display, but this is merely an example. In addition, the technical idea of the present disclosure may be applied to a display which displays an image to an outer area of the first display 110. For example, the second display 120 may be embodied as at least one transparent display panel which is disposed at an outer area of the first display 110, and as at least one sub display panel which is disposed at an outer area of the first display 110. In addition, when the display is an ultra wide display, the display apparatus 100 may operate a central area of the display with the first display 110, and operate a side area excluding the central area with the second display 120. In addition, when the display is embodied as a multi LED array, the display apparatus 100 may operate the central area of the display with the first display 110, and operate the outer area excluding the central area of the display with the second display 120.

FIGS. 21, 22A, 22B, 22C, 23A, 23B, 23C, 24A, and 24B are views to explain an embodiment of providing content stored in at least one mobile terminal connected to a display apparatus using the second display according to another embodiment of the present disclosure.

Hereinbelow, referring to FIGS. 21-24B, various embodiments of the present disclosure of providing content stored in at least one mobile terminal connected to a display apparatus using the second display, according to another embodiment will be described.

Figure 21:
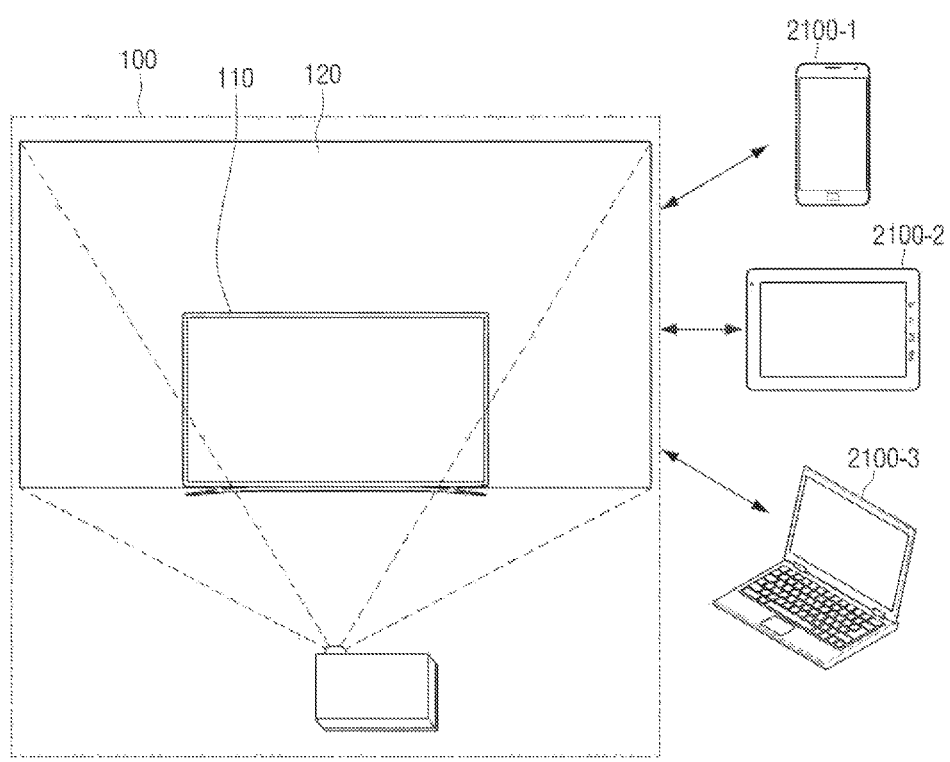
FIGS. 21, 22A, 22B, 22C, 23A, 23B, 23C, 24A, and 24B are views to explain an embodiment of providing content stored in at least one mobile terminal connected to a display apparatus using the second display according to another embodiment of the present disclosure.

Referring to FIG. 21, the display apparatus 100 may perform communication with an external first mobile terminal 2100-1, a second mobile terminal 2100-2, and a third mobile terminal 2100-3. In this case, the first through the third mobile terminals 2100-1 through 2100-3, as illustrated in FIG. 21, may be smartphone or a tablet PC, but this is merely an example, and may be realized as various mobile terminals such as a notebook PC, PDA, smart watch, and/or the like.

In this case, the display apparatus 100 may provide various content provided by mobile terminals through the first display unit 110 and the second display unit 120. In particular, while the display apparatus 100 displays image content through the first display 110, when connected with at least one external mobile terminal, the display apparatus 100 may provide various content stored in at least one mobile terminal which is connected through the second display unit 120

Figure 22A:
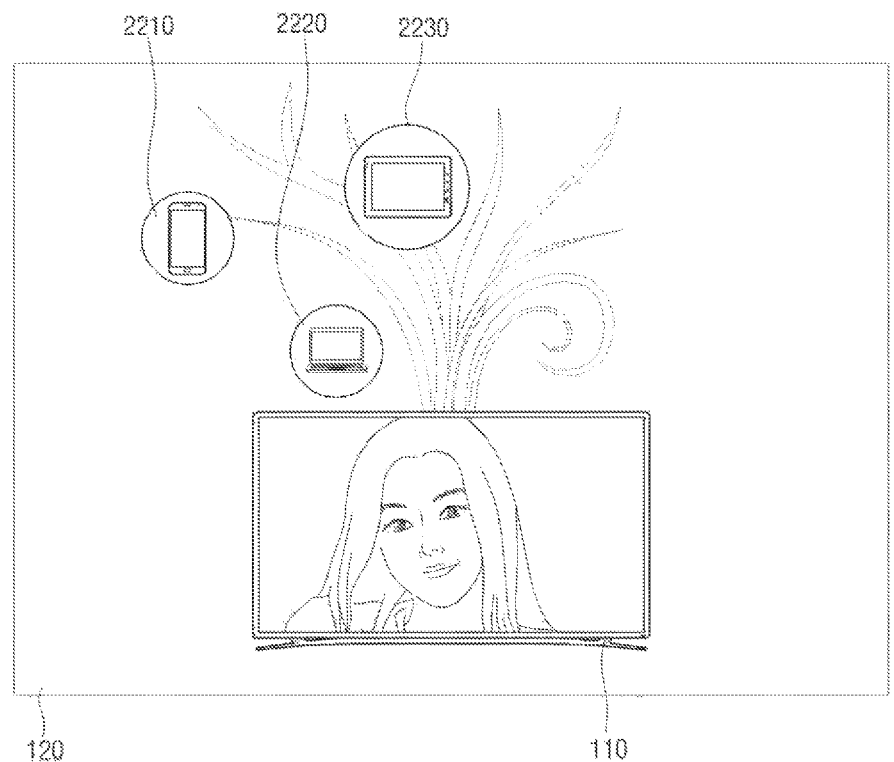

According to various embodiments of the present disclosure, as illustrated in FIG. 22A, when the first mobile terminal 2100-1 to the third mobile terminal 2100-3 are connected to the display apparatus 100 while the display apparatus 100 displays image content through the first display 110, the controller 140 may control the second display unit 120 so as to display a plurality of mobile terminal icons 2210-2230 corresponding to the first mobile terminal 2100-1 to the third mobile terminal 2100-3. The mobile terminal icons 2210-2230 may include an image which corresponds to type of the corresponding first mobile terminal, but this is merely an example, and may include various information such as user information of the first mobile terminal.

Figure 22B:
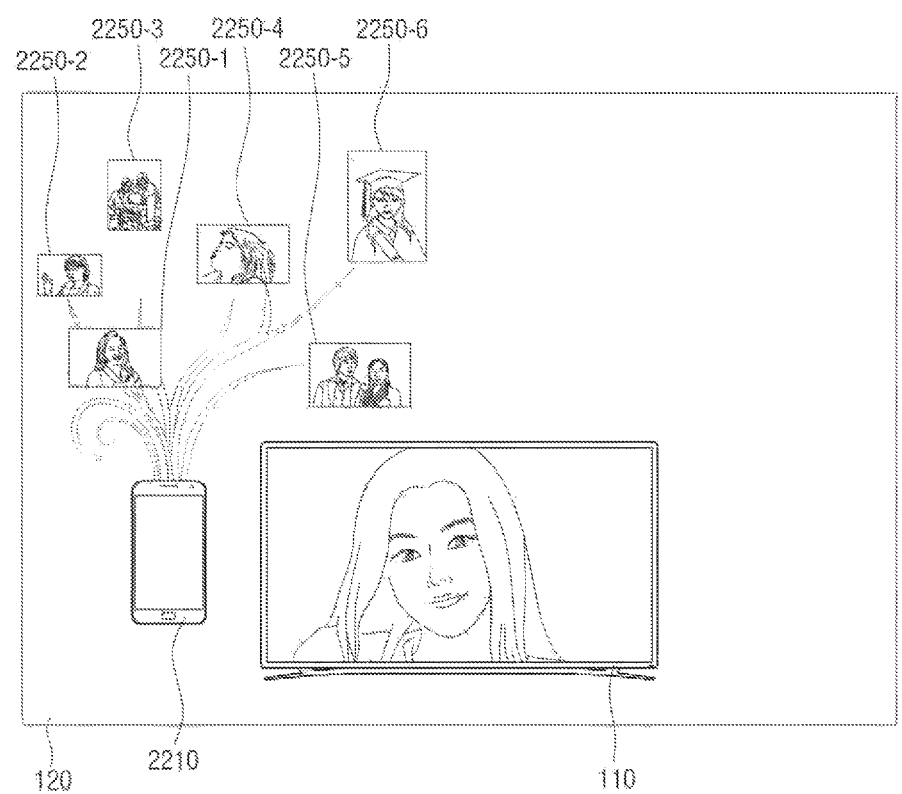

According to various embodiments of the present disclosure, as illustrated in FIGS. 22A and 22B, when a user command to select the first mobile terminal icon 2210 is input through the input unit 130, from among the plurality of mobile terminal icons 2210-2230 (e.g., in response to selecting the first mobile terminal icon 2210), the controller 140 may control the communicator 160 to transmit to the first mobile terminal 2100-1 a request signal requesting image content information, and receive image content information (e.g., thumbnail image information, and/or the like) in response to the request signal. As illustrated in FIG. 22B, the controller 140, based on the received image content may control the second display unit 120 to display the first mobile terminal icon 2210 at side of the second display unit 120, and display thumbnail images 2250-1 to 2250-6 of the image content stored in the first mobile terminal 2100-1 corresponding to the first mobile terminal icon 2210.

Figure 22C:
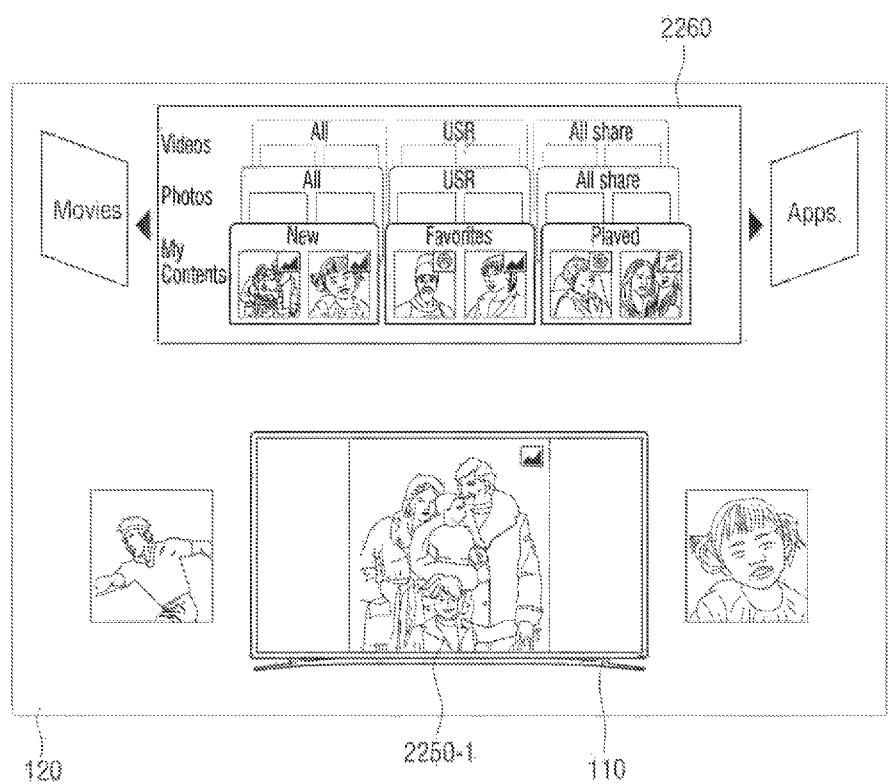

According to various embodiments of the present disclosure, as illustrated in FIGS. 22B and 22C, when a user command to select the first thumbnail image 2250-1 from among the thumbnail images 2250-1 to 2250-6 stored in the first mobile terminal 2100-1 is input through the input unit 130 (e.g., in response to an input for selecting a thumbnail image), the controller 140 may control the first display unit 110 to display the first thumbnail image 2250-1 on the first display 110. The controller 140 may control the second display 120 to display the display item 2260 including my content folder on top of the second display unit 120.

Figure 23A:
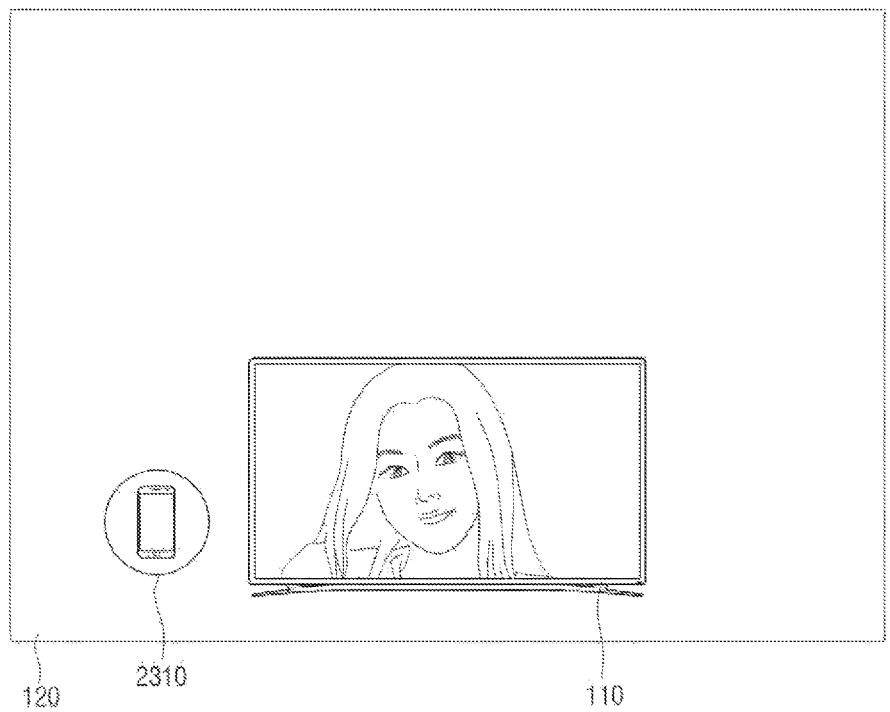

According to various embodiments of the present disclosure, as illustrated in FIG. 23A, while the display apparatus 100 displays image content through the first display 110, when one mobile terminals 2100-1 is connected to the display apparatus 100 (e.g., in response to one or more mobile terminals or other devices being connected to the display apparatus), the controller 140 may control the second display unit 120 to display the mobile terminal icon 2310 which corresponds to the first mobile terminal 21001. The mobile terminal icon 2310 may include an image corresponding to type of the first mobile terminal, but this is merely an example and may include various information such as user information of the first mobile terminal.

Figure 23B:
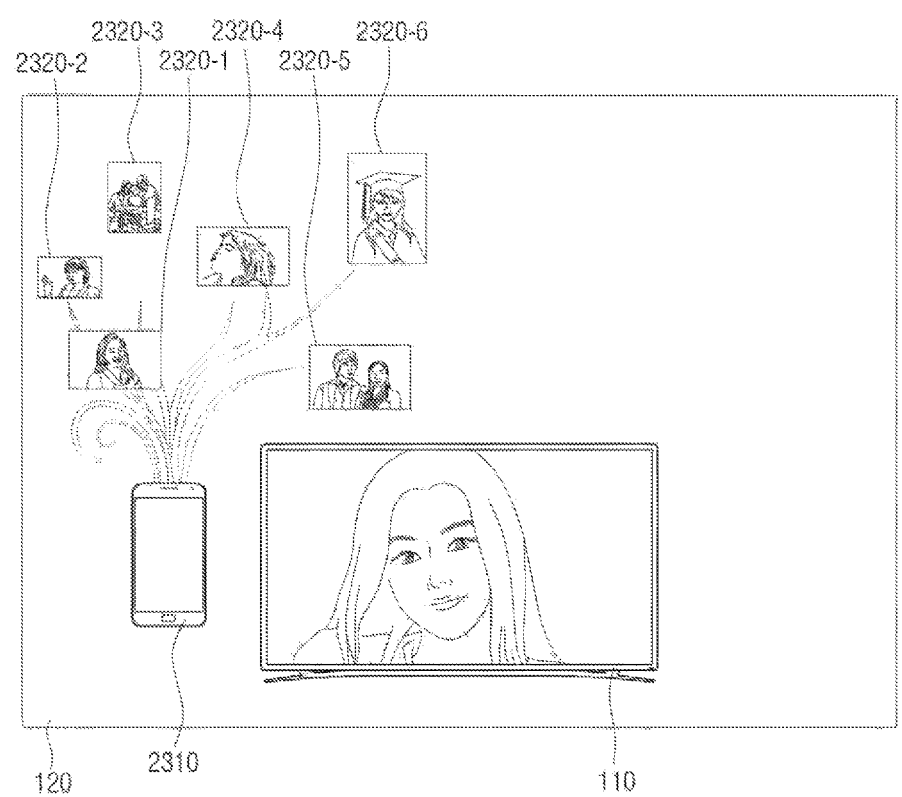

According to various embodiments of the present disclosure, as illustrated in FIGS. 23A and 23B, when a user command to select the first mobile terminal icon 2310 is selected through the input unit 130 (e.g., in response to selection of the first mobile terminal icon 2310), the controller 140 may control the communicator 160 to transmit to the first mobile terminal 2100-1 a request signal requesting image content information, and receive image content information (e.g., thumbnail image information) responding to the request signal. As illustrated in FIG. 23B, the controller 140, based on the received image content information may control the second display unit 120 to display the first mobile terminal icon 2310 at a side of the second display unit 120, and display the thumbnail images 2320-1 to 2320-6 of the image content stored in the first mobile terminal 2100-11 corresponding to the first mobile terminal icon 2310.

Figure 23C:
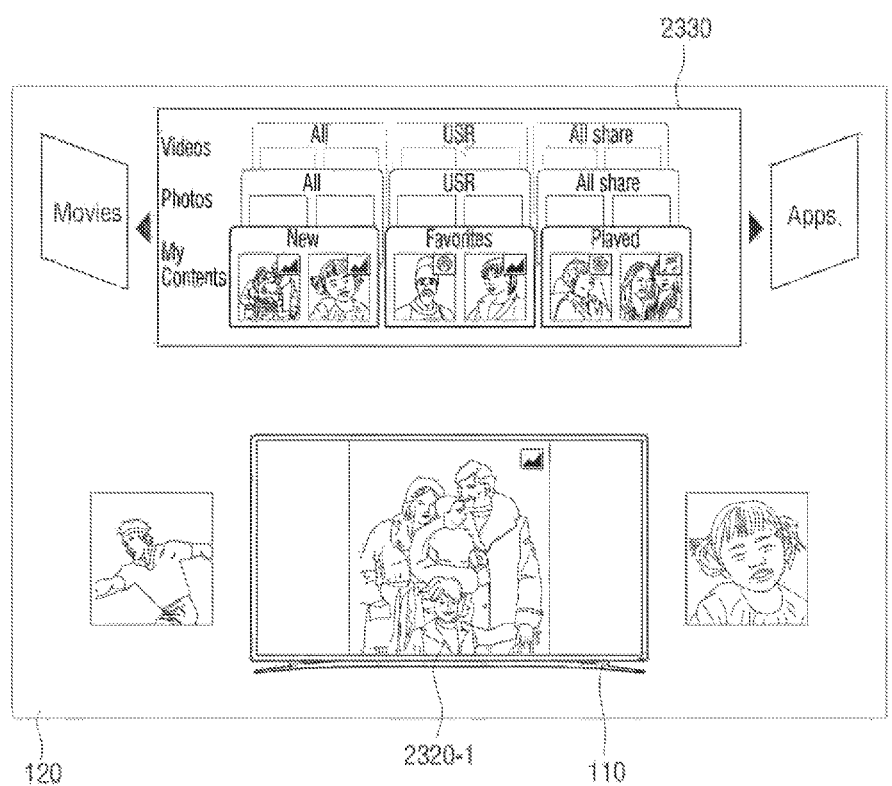

According to various embodiments of the present disclosure, as illustrated in FIG. 23C, when a user command to select the first thumbnail image 2320-1 from among the thumbnail images 2320-1 to 2320-6 of an image content stored in the first mobile terminal 2100-1 is input through the input unit 130 (e.g., in response to selection of a thumbnail image), the controller 140 may control the first display unit 110 to display the first thumbnail image 2320-1 on the first display unit 110. The controller 140 may control the second display unit 120 to display the display item 2330 including my content folder at top of the second display unit 120.

In the afore-mentioned embodiment, various embodiments of the present disclosure of providing an image content stored in the mobile terminal have been described, but this is merely an example, and the display apparatus 100 may provide various content stored in the mobile terminal through the second display unit 120.

Figure 24A:
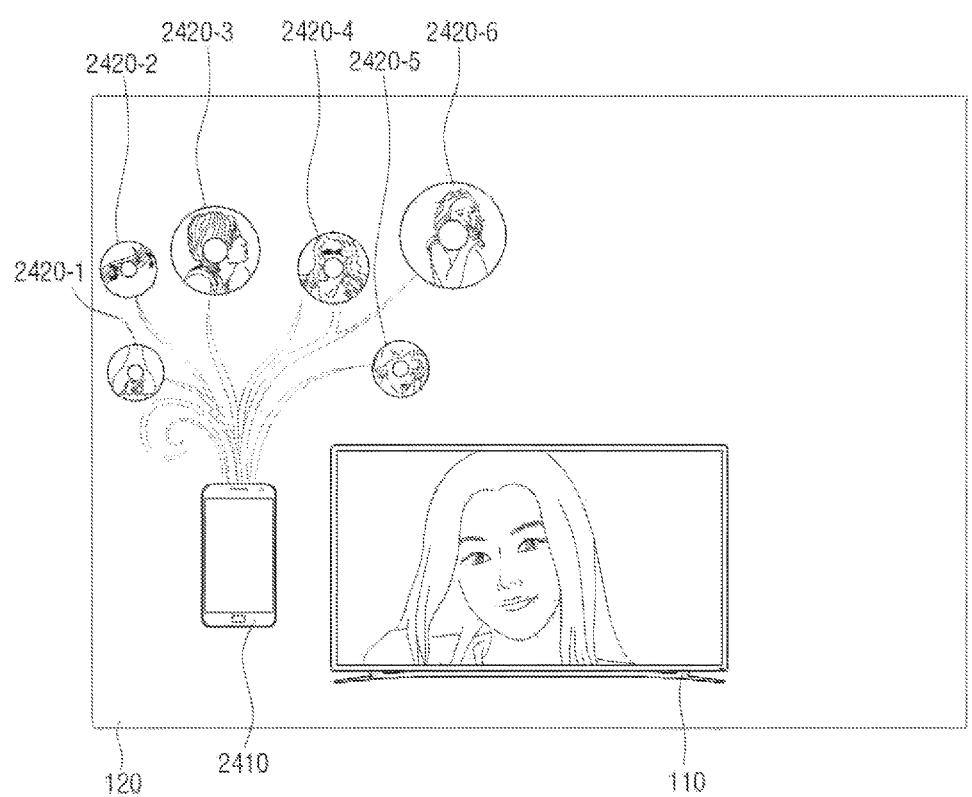

According to various embodiments of the present disclosure, as illustrated in FIG. 24A, when a plurality of music content are stored in the connected mobile terminal, the controller 140 may control the second display unit 120 to display a plurality of music icons 2420-1 to 2420-6 corresponding to music content stored in the mobile terminal corresponding to the mobile terminal icon 2410.

Figure 24B:
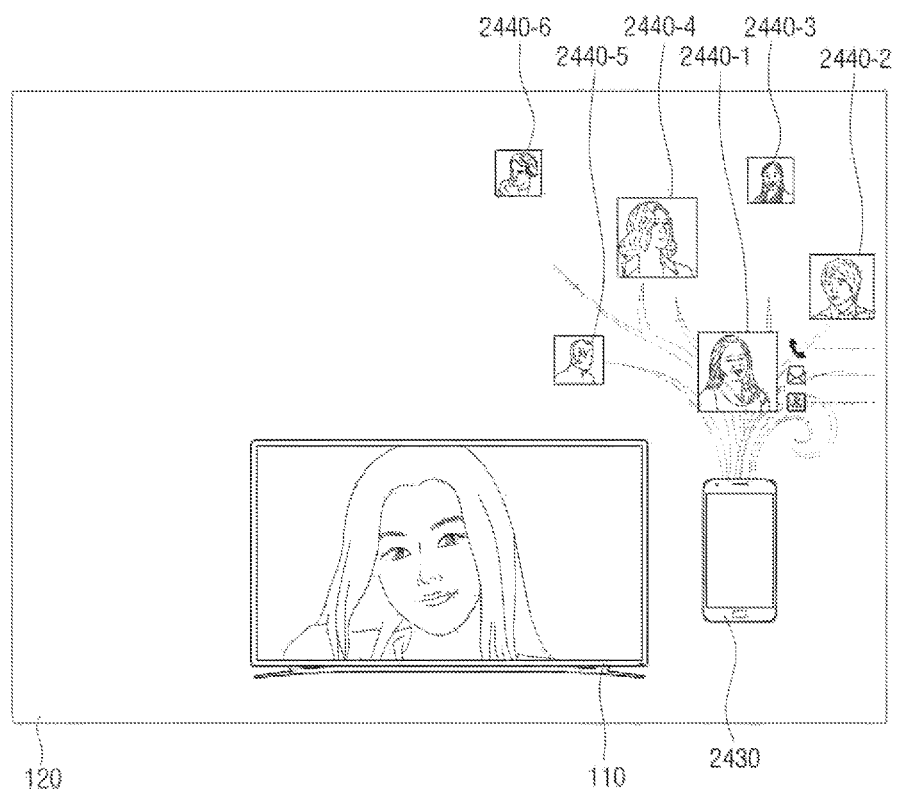

According to various embodiments of the present disclosure, as illustrated in FIG. 24B, when a plurality of SNS messages are received from the connected mobile terminal (e.g., in response to one or more messages being received for the connected mobile terminal or other device), the controller 140 may control the second display unit 120 to display a plurality of music icons 2440-1 to 2440-6 corresponding to the received SNS messages. According to various embodiments of the present disclosure, when a plurality of SNS messages are received to the connected mobile terminal, the controller 140 may control the second display 120 to display a plurality of icons which correspond to the received SNS content.

By the above-described embodiments of the present disclosure, a user may receive content stored in an external mobile terminal even while the display apparatus 100 displays image content more easily.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

The method for controlling the display apparatus according to various embodiments may be embodied as a program and provided to the display apparatus. In this case, a program including the method for controlling the display apparatus may be provided through a stored non-transitory computer readable medium.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, ROM, and/or the like and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a first display device configured to display content;
   a second display device configured to display an image at an outer area encompassing the first display device; and
   at least one processor configured to:
      display, in response to an input of a first user command while content is displayed on the first display device, a user interface (UI) to control the display apparatus and a pointer on a first area of the second display device while a size of the content displayed on the first display device is maintained,
      change, in response to an input of a second user command through the UI displayed on the first area of the second display device using the pointer, the content displayed on the first display device to another content according to a user command input, and
      display information related to another content on a second area of the second display device while another content is displayed on the first display device and the UI is displayed on the first area of the second display device,
   wherein the pointer is movable on the first display device and the second display device according to a user input.

2. The apparatus of claim 1, wherein the at least one processor is further configured to control the second display device to display, in response to an input of a user command while content is displayed on the first display device, a content search UI to search content on an upper area of the second display device.

3. The apparatus of claim 2,
   wherein the content search UI comprises at least one display item corresponding to a first content type,
   wherein the content search UI comprises at least one display item corresponding to a first content type, and
   wherein the at least one processor is further configured to control the second display device to display, in response to an input of a certain user command while at least one display item corresponding to the first content type is displayed, at least one display item corresponding to a second content type on the content search UI.

4. The apparatus of claim 2, wherein the at least one processor is further configured, in response to an input of a certain user command while the content search UI is displayed, to:
   control the second display device to display a highlight on one of the at least one display item displayed on the content search UI; and
   display information on content corresponding to the highlighted display item nearby the highlighted display item.

5. The apparatus of claim 2, wherein the at least one processor is further configured to control the first display device to display, in response to a selection of one of the at least one display item displayed on the content search UI, a content list corresponding to the selected display item.

6. The apparatus of claim 5, wherein the at least one processor is further configured to:
   control to display, in response to a selection of one of a plurality of content displayed on the content list, a screen corresponding to the selected content on the first display device; and
   display a screen corresponding to a part of a non-selected content on the second display device.

7. The apparatus of claim 6, wherein the at least one processor is further configured to:
   control to move, in response to an input of a certain user command while the screen corresponding to the selected content is displayed on the first display device and the screen corresponding to a part of the non-selected content is displayed on the second display device, a screen corresponding to one of the content displayed on the second display device to the first display device, and
   move a screen corresponding to content displayed on the first display device to the second display device.

8. The apparatus of claim 1, wherein the at least one processor is further configured to control the second display device to display, in response to an input of a user command while a broadcasting content is displayed on the first display device, a channel search UI to search another channel on a left or right area of the second display device.

9. The apparatus of claim 8,
   wherein the channel search UI comprises at least one display item corresponding to at least one channel, and
   wherein the at least one processor is further configured to control the second display device to display a broadcasting program respectively corresponding to at least one display item.

10. The apparatus of claim 1, wherein the at least one processor is further configured to:
    display, in response to an input of a certain user command while content is displayed on the first display device, a pointer on a display screen, and
    provide, in response to an input of a user command for moving the pointer to the second display device, a preview function which displays only an area at which the pointer is located from among UIs to control the display apparatus.

11. The apparatus of claim 1, wherein the at least one processor is further configured to control the second display device to display, in response to an input of a user command while content is displayed on the first display device, a UI for changing setting to change setting of the display apparatus.

12. The apparatus of claim 1, wherein the second display device comprises a projector display.

13. The apparatus of claim 1, further comprising:
    a sensor configured to detect a user,
    wherein the at least one processor is further configured to control display of content on one or more of the first display device and the second display device according to whether a user is detected.

14. A method for controlling a display apparatus, the method comprising:

displaying content on a first display device;

displaying, in response to receiving a first user command while content is displayed on the first display device, a user interface (UI) to control the display apparatus and a pointer on a first area of a second display device which displays an image at an outer area encompassing the first display device while a size of the content displayed on the first display device is maintained;

changing, in response to an input of a second user command through the UI displayed on the first area of the second display device using the pointer, the content displayed on the first display device to another content according to a user command input; and displaying information related to another content on a second area of the second display device while another content is displayed on the first display device and the UI is displayed on the first area of the second display device, wherein the pointer is movable on the first display device and the second display device according to a user input.

15. The method of claim 14, wherein the second displaying comprises, in response to receiving the user command, displaying a content search UI to search content on an upper area of the second display device.

16. The method of claim 15, wherein the content search UI comprises at least one display item corresponding to a first content type, and wherein the second displaying comprises, in response to receiving a certain user command while at least one display item corresponding to the first content type is displayed, displaying at least one display item corresponding to a second content type on the content search UI of the second display device.

17. The method of claim 15, wherein the second displaying, in response to receiving a certain user command while the content search UI is displayed, comprises:

displaying a highlight on one of the at least one display item displayed on the content search UI; and displaying information on content corresponding to the highlighted display item nearby the highlighted display item.

18. The method of claim 15, further comprising:

selecting one of the at least one display item displayed on the content search UI, wherein the second displaying comprises, in response to the selecting of the one of the at least one display item displayed on the content search UI, displaying a content list corresponding to the selected display item on the first display device.

19. The method of claim 18, further comprising:

selecting one of a plurality of content displayed on the content list, wherein the second displaying comprises:

displaying, in response to the selecting of the one of a plurality of content displayed on the content list, a screen corresponding to the selected content on the first display device; and displaying a screen corresponding to a part of a non-selected content on the second display device.

20. The method of claim 19, wherein the second displaying comprises:

moving, in response to receiving a certain user command while a screen corresponding to the selected content is displayed on the first display device, and a screen corresponding to a part of the non-selected content is displayed on the second screen, a screen corresponding to one of content displayed on the second display device to the first display device; and moving a screen corresponding to content displayed on the first display device to the second display device.

21. The method of claim 14, wherein the second displaying comprises, in response to receiving a user command while a broadcasting content is displayed on the first display device, displaying a channel search UI to search another channel on a left or right area of the second display device.

22. The method of claim 21, wherein the channel search UI comprises at least one display item corresponding to at least one channel, and wherein the second displaying comprises displaying a broadcasting program respectively corresponding to at least one display item on the second display device.

23. The method of claim 14, wherein the second displaying comprises:

displaying, in response to receiving a certain user command while content is displayed on the first display device, a pointer on a display screen; and providing, in response to receiving a user command for moving the pointer to the second display device, a preview function which displays only an area at which the pointer is located from among UIs to control the display apparatus.

24. The method of claim 14, wherein the second displaying comprises displaying, in response to receiving a user command while content is displayed on the first display device, a UI for changing setting to change setting of the display apparatus on the second display device.

25. The method of claim 14, wherein the second display device comprises a projector display.

26. The method of claim 14, further comprising:

determining whether a user is detected; and controlling display of content on one or more of the first display device and the second display device according to whether a user is detected.

27. A non-transitory computer-readable storage medium storing instructions that, when executed, cause at least one processor to perform the method of claim 14.

* * * * *